(12) United States Patent
Charisius et al.

(10) Patent No.: US 7,793,256 B2
(45) Date of Patent: *Sep. 7, 2010

(54) METHODS AND SYSTEMS FOR SUPPORTING AND DEPLOYING DISTRIBUTED COMPUTING COMPONENTS

(75) Inventors: Dietrich Charisius, Stuttgart (DE); Alexander Aptus, Esslingen (DE)

(73) Assignee: Borland Software Corporation, Rockville, MD (US)

( * ) Notice: Subject to any disclaimer, the term of this patent is extended or adjusted under 35 U.S.C. 154(b) by 1004 days.

This patent is subject to a terminal disclaimer.

(21) Appl. No.: 11/257,724

(22) Filed: Oct. 25, 2005

(65) Prior Publication Data

US 2006/0053410 A1   Mar. 9, 2006

Related U.S. Application Data

(60) Division of application No. 09/838,646, filed on Apr. 20, 2001, now Pat. No. 7,051,316, and a continuation-in-part of application No. 09/680,063, filed on Oct. 4, 2000, now Pat. No. 6,851,107.

(60) Provisional application No. 60/199,046, filed on Apr. 21, 2000, provisional application No. 60/157,826, filed on Oct. 5, 1999.

(51) Int. Cl.
G06F 9/44 (2006.01)
(52) U.S. Cl. ........................ 717/103; 717/106
(58) Field of Classification Search ................ 717/103, 717/109
See application file for complete search history.

(56) References Cited

U.S. PATENT DOCUMENTS

| | | | |
|---|---|---|---|
| 5,448,740 A * | 9/1995 | Kiri et al. | 717/155 |
| 5,819,092 A | 10/1998 | Ferguson et al. | |
| 5,881,230 A | 3/1999 | Christensen et al. | |
| 5,915,113 A | 6/1999 | McDonald et al. | |
| 5,966,707 A | 10/1999 | Van Huben et al. | |
| 6,269,373 B1 | 7/2001 | Apte et al. | 707/10 |
| 6,298,478 B1 | 10/2001 | Nally et al. | 717/6 |
| 6,597,366 B1 * | 7/2003 | Bennett et al. | 345/619 |
| 6,836,889 B1 * | 12/2004 | Chan et al. | 719/310 |
| 6,862,711 B1 | 3/2005 | Bahrs et al. | 715/526 |
| 6,880,126 B1 | 4/2005 | Bahrs et al. | 715/526 |
| 7,051,316 B2 * | 5/2006 | Charisius et al. | 717/103 |
| 2002/0049788 A1 * | 4/2002 | Lipkin et al. | 707/513 |
| 2002/0095655 A1 * | 7/2002 | Kim et al. | 717/107 |
| 2002/0147763 A1 * | 10/2002 | Lee et al. | 709/202 |

OTHER PUBLICATIONS

Wikipedia, "Definition of Diagram".*
Unified Modeling Languaug (UML) UML Booch & OMT Quick Reference for Rational Rose 4.0 copyright 1996.

(Continued)

Primary Examiner—Wei Y Zhen
Assistant Examiner—Lanny Ung
(74) Attorney, Agent, or Firm—Kokka & Backus, PC

(57) ABSTRACT

Methods and systems consistent with the present invention provide an improved software development tool that generates code corresponding to a distributed computing component that contains methods of a plurality of types and that displays a graphical representation of the code with a separately delineated display area for each type. The improved software development tool also compiles, deploys, and debugs the distributed computing component with a client software component using methods and systems consistent with the present invention.

26 Claims, 56 Drawing Sheets

OTHER PUBLICATIONS

Rational Rose Using ational Rose 4.0; Rational Software Corp. pp. 11-219 copyright 1996.

Object-Oriented Software Engineering, A Use Case Driven Approach Jan. 1992; pp. 1-500.

UML Distilled, Applying the Standard Object Modeling Language, 1997, Fowler with Scott, pp. 1-173.

Factoring Javabeans in the Enterprise, IMB, Dec. 1997; Whole Bood.

Enterprise JAVABeans Development Using VisualAge of JAVA, IBM, Jun. 1999, Whole Book.

Client/Server Porgramming with JAVA and Corba, Orfail et al., Chapters 32-34; Jan. 30, 1997.

* cited by examiner

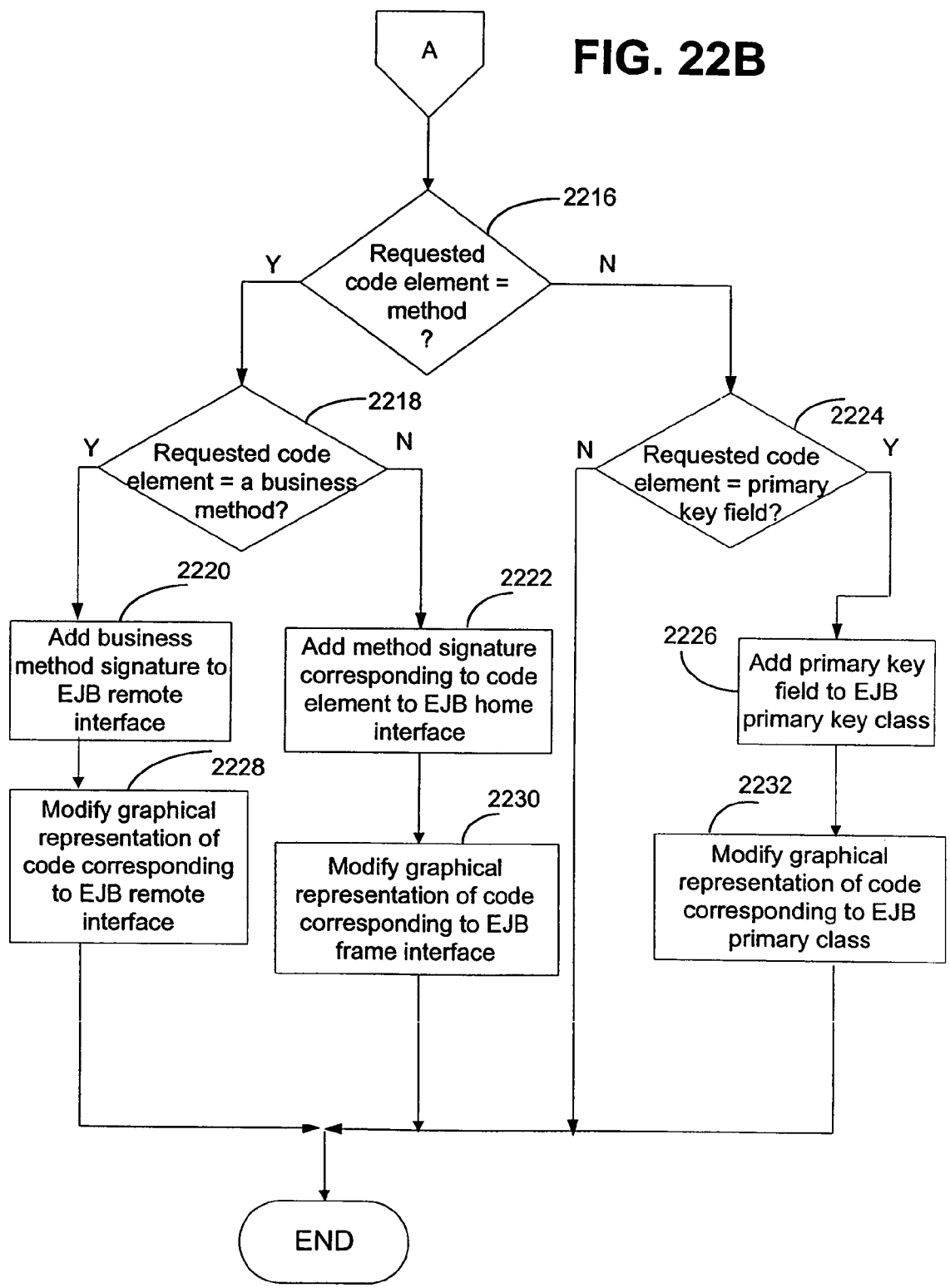

FIG. 42
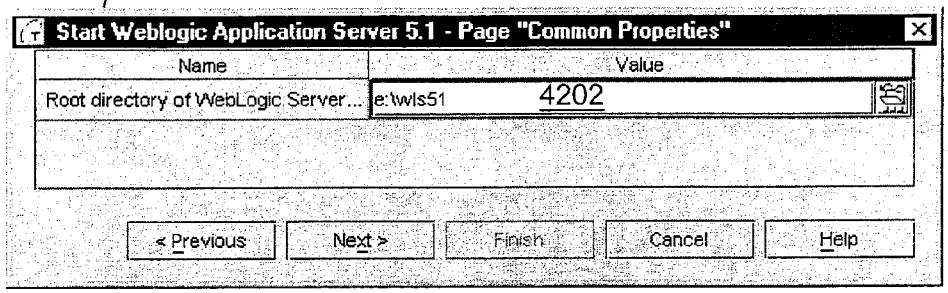
FIG. 43
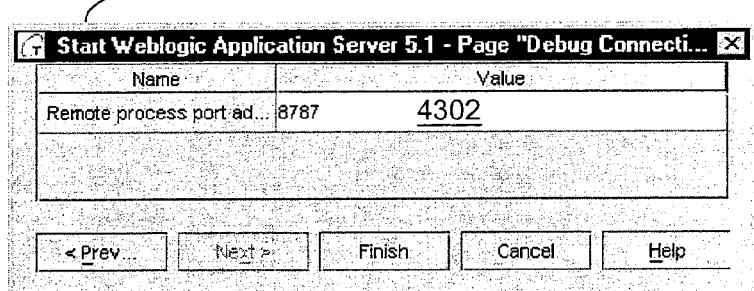
FIG. 44
```
Thu Dec 14 15:40:27 EST 2000:<I> <EJB> 0 deployed, 0 failed to deploy.
Thu Dec 14 15:40:28 EST 2000:<I> <ZAC> ZAC ACLs initialized
Thu Dec 14 15:40:28 EST 2000:<I> <ZAC> ZAC packages stored in local directory ex
ports
Thu Dec 14 15:40:28 EST 2000:<I> <ListenThread> Listening on port: 7001
<NT Performance Pack> NATIVE: created IoCompletionPort successfully. IoPort=0x00
0002a4
Thu Dec 14 15:40:29 EST 2000:<I> <WebLogicServer> WebLogic Server started
```

Weblogic Application Server 5.1 - Page "Common Properties"

| Name | Value |
|---|---|
| Folder for the temporary files | c:\temp |
| Folder for the generated JAR file | c:\temp |
| JDK 1.2 root directory | e:\jdk1.2  4702 |
| Root directory of WebLogic Server... | e:\wls5_1 |
| Short name of EJB JAR file | togetherEJB.jar |
| Directory to compile Servlet | e:\wls5_1\myserver\servletclasses |

[ < Previous ] [ Next > ] [ Finish ] [ Cancel ] [ Help ]

Weblogic Application Server 5.1 - Page "Run-time deploy"

| Name | Value |
|---|---|
| System password | ******** 4804 |
| Server port  4802 | 7001  4806 |
| Server host | localhost  4808 |

[ < Previous ] [ Next > ] [ Finish ] [ Cancel ] [ Help ]

Weblogic Application Server 5.1 - Page "Simple JSP client generation"

| Name | Value |
|---|---|
| WebLogic public directory | e:\wls5_1\myserver\public_html  4902 |
| Subdirectory for placing JSP files | myJSP  4904 |
| Base URL for browsing JSP | http://localhost:7001/  4906 |
| Show result after generation | ☑ |

[ < Previous ] [ Next > ] [ Finish ] [ Cancel ] [ Help ]

FIG. 51

```
<?xml version="1.0"?>

<!DOCTYPE ejb-jar PUBLIC '-//Sun Microsystems, Inc.//DTD Enterprise
JavaBeans 1.1//EN' 'http://java.sun.com/j2ee/dtds/ejb-jar_1_1.dtd'>

<ejb-jar>
    <enterprise-beans>
        <session>
            <ejb-name>HelloBean</ejb-name>
            <home>hello.HelloHome</home>
            <remote>hello.Hello</remote>
            <ejb-class>hello.HelloBean</ejb-class>
            <session-type>Stateful</session-type>
            <transaction-type>Container</transaction-
type></session></enterprise-beans>
    <assembly-descriptor>
        <container-transaction>
        <method>
            <ejb-name>HelloBean</ejb-name>
            <method-name>*</method-name></method>
        <method>
            <ejb-name>HelloBean</ejb-name>
            <method-intf>Home</method-intf>
            <method-name>*</method-name></method>
        <method>
            <ejb-name>HelloBean</ejb-name>
            <method-intf>Remote</method-intf>
            <method-name>*</method-name></method>
            <trans-attribute>NotSupported</trans-attribute></container-
transaction></assembly-descriptor></ejb-jar>
```

US 7,793,256 B2

METHODS AND SYSTEMS FOR SUPPORTING AND DEPLOYING DISTRIBUTED COMPUTING COMPONENTS

RELATED APPLICATIONS

This application is a divisional application of U.S. patent application Ser. No. 09/838,646, entitled "Methods and Systems for Supporting and Deploying Distributed Computing Components," filed on Apr. 20, 2001, now U.S. Pat. No. 7,051,316 which claims the benefit of the filing date of U.S. Provisional Application No. 60/199,046, entitled "Software Development Tool," filed on Apr. 21, 2000, and is a continuation-in-part of U.S. patent application No. 09/680,063, now U.S. Pat. No. 6,851,107 entitled "Method and System for Developing Software," filed on Oct. 4, 2000, which claims the benefit of the filing date of U.S. Provisional Application No. 60/157,826, entitled "Visual Unified Modeling Language Development Tool," filed on Oct. 5, 1999, and U.S. Provisional Application No. 60/199,046, entitled "Software Development Tool," filed on Apr. 21, 2000; all of which are incorporated herein by reference.

The following identified U.S. patent applications are also relied upon and are incorporated by reference in this application:

U.S. patent application Ser. No. 09/680,065, entitled "Method And System For Displaying Changes Of Source Code," filed on Oct. 4, 2000;

U.S. patent application Ser. No. 09/680,030, entitled "Method And System For Generating, Applying, And Defining A Pattern," filed on Oct. 4, 2000;

U.S. patent application Ser. No. 09/680,064, entitled "Method And System For Collapsing A Graphical Representation Of Related Elements." filed on Oct. 4, 2000:

U.S. patent application Ser. No. 09/839,045, entitled "Methods and Systems for Generating Source Code for Object Oriented Elements," and filed on the same date herewith;

U.S. patent application Ser. No. 09/839,526, entitled "Methods and Systems for Relating Data Structures and Object Oriented Elements for Distributed Computing," and filed on the same date herewith;

U.S. patent application Ser. No. 09/839,525, entitled "Methods and Systems for Finding Specific Line Of Source Code," and filed on the same date herewith;

U.S. patent application Ser. No. 09/839,645, entitled "Methods and Systems for Finding and Displaying Linked Objects," and filed on the same date herewith;

U.S. patent application Ser. No. 09/839,527, entitled "Methods and Systems for Animating the Interaction of Objects in an Object Oriented Program," and filed on the same date herewith;

U.S. patent application Ser. No. 09/838,580, entitled "Diagrammatic Control of a Software in a Version Control System," and filed on the same date herewith;

U.S. patent application Ser. No. 09/838,578, entitled "Navigation Links in Generated Documentation," and filed on the same date herewith;

U.S. patent application Ser. No. 09/839,644, entitled "Methods and Systems for Identifying Dependencies Between Object-Oriented Elements," and filed on the same date herewith; and U.S. patent application Ser. No. 09/839,524, entitled "Methods and Systems for Relating a Data Definition File and a Data Model for Distributed Computing," and filed on the same date herewith.

FIELD OF THE INVENTION

The present invention relates generally to data processing systems and, more particularly, to methods and systems for supporting and deploying a distributed computing component.

BACKGROUND OF THE INVENTION

Computer instructions are written in source code. Although a skilled programmer can understand source code to determine what the code is designed to accomplish, with highly complex software systems, a graphical representation or model of the source code is helpful to organize and visualize the structure and components of the system. Using models, the complex systems are easily identified, and the structural and behavioral patterns can be visualized and documented.

The well-known Unified Modeling Language (UML) is a general-purpose notational language for visualizing, specifying, constructing, and documenting complex software systems. UML is used to model systems ranging from business information systems to Web-based distributed systems, to real-time embedded systems. UML formalizes the notion that real-world objects are best modeled as self-contained entities that contain both data and functionality. UML is more clearly described in the following references, which are incorporated herein by reference: (1) Martin Fowler, *UML Distilled Second Edition: Applying the Standard Object Modeling Language*, Addison-Wesley (1999); (2) Booch, Rumbaugh, and Jacobson, *The Unified Modeling Language User Guide*, Addison-Wesley (1998); (3) Peter Coad, Jeff DeLuca, and Eric Lefebvre, *Java Modeling in Color with UML: Enterprise Components and Process*, Prentice Hall (1999); and (4) Peter Coad, Mark Mayfield, and Jonathan Kern, *Java Design: Building Better Apps & Applets* (2nd Ed.), Prentice Hall (1998).

As shown in FIG. 1, conventional software development tools 100 allow a programmer to view UML 102 while viewing source code 104. The source code 104 is stored in a file, and a reverse engineering module 106 converts the source code 104 into a representation of the software project in a database or repository 108. The software project comprises source code 104 in at least one file which, when compiled, forms a sequence of instructions to be run by the data processing system. The repository 108 generates the UML 102. If any changes are made to the UML 102, they are automatically reflected in the repository 108, and a code generator 110 converts the representation in the repository 108 into source code 104. Such software development tools 100, however, do not synchronize the displays of the UML 102 and the source code 104. Rather, the repository 108 stores the representation of the software project while the file stores the source code 104. A modification in the UML 102 does not appear in the source code 104 unless the code generator 110 re-generates the source code 104 from the data in the repository 108. When this occurs, the portion of the source code 104 that is not protected from being overwritten is rewritten. Similarly, any modifications made to the source code 104 do not appear in the UML 102 unless the reverse engineering module 106 updates the repository 108. As a result, redundant information is stored in the repository 108 and the source code 104. In addition, rather than making incremental changes to the source code 104, conventional software development tools 100 rewrite the overall source code 104 when modifications are made to the UML 102, resulting in wasted processing time. This type of manual, large-grained synchronization requires either human intervention, or a "batch" style process to try to keep the two views (the UML 102 and the source code 104) in sync. Unfortunately, this approach, adopted by many tools, leads to many undesirable side effects; such as desired changes to the source code being overwritten by the tool. A further disadvantage with conventional software development tools 100 is that they are designed to only work in a single programming language. Thus, a tool 100 that is designed for Java™ programs cannot be utilized to develop a program in C++. There is a need in the art for a tool that avoids the limitations of these conventional software development tools.

Additionally, conventional software development tools have further limitations that increase the time and cost for developing and deploying software to support distributed computing. Distributed computing allows a business system to be more accessible to enterprise affiliates such as suppliers, customers, business partners, or financial lending institutions. A distributed computing component, such as an Enterprise JavaBean™ (EJB), defines the architecture for developing distributed business objects so that a remote client application run by an enterprise affiliate can access business logic managed by an enterprise application server. Business logic represents the specific details and information flow of a particular industry, such as a reservation system for an airline, a just-in-time parts inventory system for a car manufacturer, or an online stock trading system for a financial services vendor. In general, a conventional three-tier distributed business object architecture typically has a presentation first tier, a business object middle tier, and a relational database third tier. The presentation first tier resides on a remote client application and may include a graphical user interface defined to communicate with an EJB. The EJB (or business object) resides on and is managed by the enterprise application server on the second tier. The business data resides in the database (the third tier).

An EJB, which is typically written in an object-oriented programming language, has a generic set of attributes and methods through which the EJB can communicate the functionality it supports to the enterprise application server after the EJB is deployed. Thus, an EJB enables completely dynamic deployment and loading of an EJB object. The attributes of an EJB allow the runtime behavior of the EJB to be modified when the EJB is deployed to an enterprise application server, without having to change the programming code in the EJB. For example, an administrator of the enterprise application server is able to change the behavior of an EJB by modifying a particular attribute, such as a security behavior attribute, to have another value.

To create and deploy an EJB, a programmer follows the conventional development process for an EJB that includes:

(1) using a graphical modeling tool, such as a computer-aided software engineering (CASE) tool, to model an EJB to be generated;

(2) using the CASE tool to generate a source code framework for the EJB, such as constructs for an EJB class;

(3) using a text editor to develop the code for the EJB, such as attributes and business methods that define the behavior of the EJB;

(4) using an integrated development environment tool or software design kit, such as JDK™, to compile the EJB code;

(5) using a debugger tool suitable for evaluating errors in the EJB code;

(6) using a text editor or comparable tool to write a deployment descriptor, usually in XML, that describes the serialization and other properties of the EJB in the context of a client application;

(7) using a tool provided by an application server vendor to generate a collection or container class. A container object or class instance logically, rather than physically, encapsulates, tracks, and manages zero or more EJBs that have been deployed to the application server. For each EJB that is deployed to or added to a container, the container creates a site that it uses to manage the component;

(8) using a deployment packaging tool to package the deployment descriptor, and the compiled code for the EJB into a deployment package, such as a specific directory or file on the application server;

(9) using another tool provided by the application server vendor to read the deployment package and properly deploy the EJB on the application server; and

(10) repeating the process when runtime errors are discovered with the EJB.

Thus, the conventional development process presents several problems for a programmer. First, to develop and deploy an EJB, the programmer typically performs many of the steps manually, such as writing the deployment descriptor and porting the EJB between tools. Furthermore, the conventional development process dictates that the programmer learn to use an array of different tools which contributes to a longer learning curve for each programmer that slows down the EJB development process. In addition, the array of different tools increases the costs to produce the EJB. Conventional software development tools do not address these problems.

In addition, when runtime errors are discovered with the EJB, the programmer makes manual corrections to the EJB code mad deployment descriptor file while repeating the entire conventional development process. Thus, by following the conventional deployment process, a programmer spends additional time debugging, correcting code, and re-deploying an EJB to produce an EJB that runs as desired or error free. Conventional software development tools lack the capability to address these problems. Thus, there is a need in the art for a tool that avoids the foregoing limitations of conventional software development tools.

SUMMARY OF THE INVENTION

Methods and systems consistent with the present invention provide an improved software development tool that overcomes the limitations of conventional software development tools. The improved software development tool of the present invention allows a developer to simultaneously view a graphical and a textual display of source code. The graphical and textual views are synchronized so that a modification in one view is automatically reflected in the other view. The software development tool is designed for use with more than one programming language.

The software development tool also saves significant programming development time as well as costs for conventional tools by allowing a developer to generate, compile, assemble, deploy, and debug a distributed computing component, such as an Enterprise JavaBean™, without having to use multiple conventional tools. By using the software development tool to support and deploy an EJB, a developer produces error-free code in a shorter amount of time as the risk of error is reduced by alleviating the need to switch from tool to tool during the development and deployment process of the EJB. In addition, the software development tool provides the programmer with a segregated grouping and view of methods that define the behavior of an EJB, where the programmer is able to easily identify a method in an EJB implementation class to a respective method signature in either an EJB Home Interface or an EJB Remote Interface that corresponds to the EJB implementation class as explained below.

In accordance with methods and systems consistent with the present invention, a method is provided in a data processing system. The method receives a request to generate a distributed computing component, generates code corresponding to the distributed computing component, where the code contains a function that is one of a plurality of function types, and displays a graphical representation of the code that includes a separately delineated display area for each of the plurality of function types. The method also displays a symbol in each separately delineated display area, wherein the symbol indicates the type of method displayed in the display area.

In accordance with methods and systems consistent with the present invention, a method is provided in a data processing system. The data processing system includes a software development tool. The method initiates execution of the software development tool, and while the software development tool is executing, the software development tool receives an indication to deploy a distributed computing component, deploys the distributed computing component to a deployment environment on a computer, and initiates execution of the distributed computing component in debug mode.

In accordance with methods and systems consistent with the present invention, a method is provided in a data processing system. The data processing system includes a software development tool with access to a distributed computing component. The method initiates execution of the software development tool, and while the software development tool is executing, the software development tool receives an indication to deploy the distributed computing component, and generates a web page to facilitate testing the distributed computing component.

In accordance with methods and systems consistent with the present invention, a method is provided in a data processing system. The data processing system has a distributed computing component with source code. The method determines whether the code of the distributed computing component has a non-compliant portion that does not comply with a specification for the type of distributed computing component, and when it is determined that the code corresponding to the distributed computing component has a non-compliant portion, replaces the non-compliant portion with new code that complies with the specification.

In accordance with methods and systems consistent with the present invention, a method is provided in a data processing system. The data processing system has a distributed computing component with source code. The method receives an indication to deploy the distributed computing component, retrieves deployment information from a comment of the source code corresponding to the distributed computing component, where the deployment information comprises a plurality of properties to control deployment of the distributed computing component on a computer and to control a relationship between the distributed computing component and a deployment environment on the computer, generates a deployment descriptor file that includes the deployment information, receives a change to die deployment information associated with the distributed computing component contained in the deployment descriptor file, and modifies the deployment information in the comment of the source code for the distributed computing component to reflect the change.

In accordance with articles of manufacture consistent with the present invention, a computer-readable medium is provided. The computer-readable medium contains instructions for controlling a data processing system to perform a method. The method comprising the steps of receiving a request to generate a distributed computing component, generating code corresponding to the distributed computing component, the code containing a method having one of a plurality of types, and displaying a graphical representation of the code that includes a separately delineated display area for each of the plurality of types.

In accordance with articles of manufacture consistent with the present invention, a computer-readable medium is provided. The computer-readable medium contains instructions for controlling a data processing system to perform a method. The data processing system includes a software development tool. The method comprising the steps of initiating execution of the software development tool, and while the software development tool is executing, receiving an indication to deploy a distributed computing component, deploying the distributed computing component to a deployment environment on a computer, and initiating execution of the distributed computing component in debug mode.

In accordance with articles of manufacture consistent with the present invention, a computer-readable medium is provided. The computer-readable medium contains instructions for controlling a data processing system to perform a method. The data processing system includes a software development tool with access to a distributed computing component. The method comprising initiating execution of the software development tool, and while the software development tool is executing, receiving an indication to deploy the distributed computing component, and generating a web page to facilitate testing the distributed computing component.

In accordance with articles of manufacture consistent with the present invention, a computer-readable medium is provided. The computer-readable medium contains instructions for controlling a data processing system to perform a method. The data processing system includes a distributed computing component with source code. The method comprising the steps of determining whether the code of the distributed computing component has a non-compliant portion that does not comply with a specification for the type of distributed computing component, and when it is determined that the code corresponding to the distributed computing component has a non-compliant portion, replacing the non-compliant portion with new code that complies with the specification.

In accordance with articles of manufacture consistent with the present invention, a computer-readable medium is provided. The computer-readable medium contains instructions for controlling a data processing system to perform a method. The data processing system includes a distributed computing component with source code. The method comprising the steps of receiving an indication to deploy the distributed computing component, retrieving deployment information from a comment of the source code corresponding to the distributed computing component, where the deployment information comprises a plurality of properties to control deployment of the distributed computing component on a computer and to control a relationship between the distributed computing component and a deployment environment on the computer, generating a deployment descriptor file that includes the deployment information, receiving a change to the deployment information associated with the distributed computing component contained in the deployment descriptor file, and modifying the deployment information in the comment of the source code for the distributed computing component to reflect the change.

Additional implementations are directed to systems and computer devices incorporating the methods described above. It is also to be understood that both the foregoing general description and the detailed description to follow are exemplary and explanatory only and are not restrictive of the invention, as claimed.

BRIEF DESCRIPTION OF THE DRAWINGS

The accompanying drawings, which are incorporated in and constitute a part of this specification, illustrate an implementation of the invention and, together with the description, serve to explain the advantages and principles of the invention. In the drawings.

FIGS. 22A and 22B depict flowcharts illustrating an exemplary process performed by the software development tool in FIG. 2 to develop and deploy an Enterprise JavaBean™;

FIG. 42 depicts an exemplary user interface displayed by the software development tool in FIG. 2, where the user interface displays access information for the EJB target application server;

FIG. 43 depicts an exemplary user interface displayed by the software development tool in FIG. 2, where the user interface displays a port address received by the software development tool for communicating to the target application server;

FIG. 44 depicts an exemplary response received by the software development tool from the EJB target application server following a command to start;

FIG. 47 depicts an exemplary user interface displayed by the software development tool in FIG. 2, where the user interface displays the access information for a compiler;

FIG. 48 depicts an exemplary user interface displayed by the software development tool in FIG. 2, for receiving access privileges for the EJB target application server computer;

FIG. 49 depicts an exemplary user interface displayed by the software development tool in FIG. 2, where the user interface displays access information for JAVA™ Server Pages generated by the software development tool;

FIG. 51 depicts an exemplary deployment descriptor file generated by the software development tool for deploying the EJB;

Figure 1:
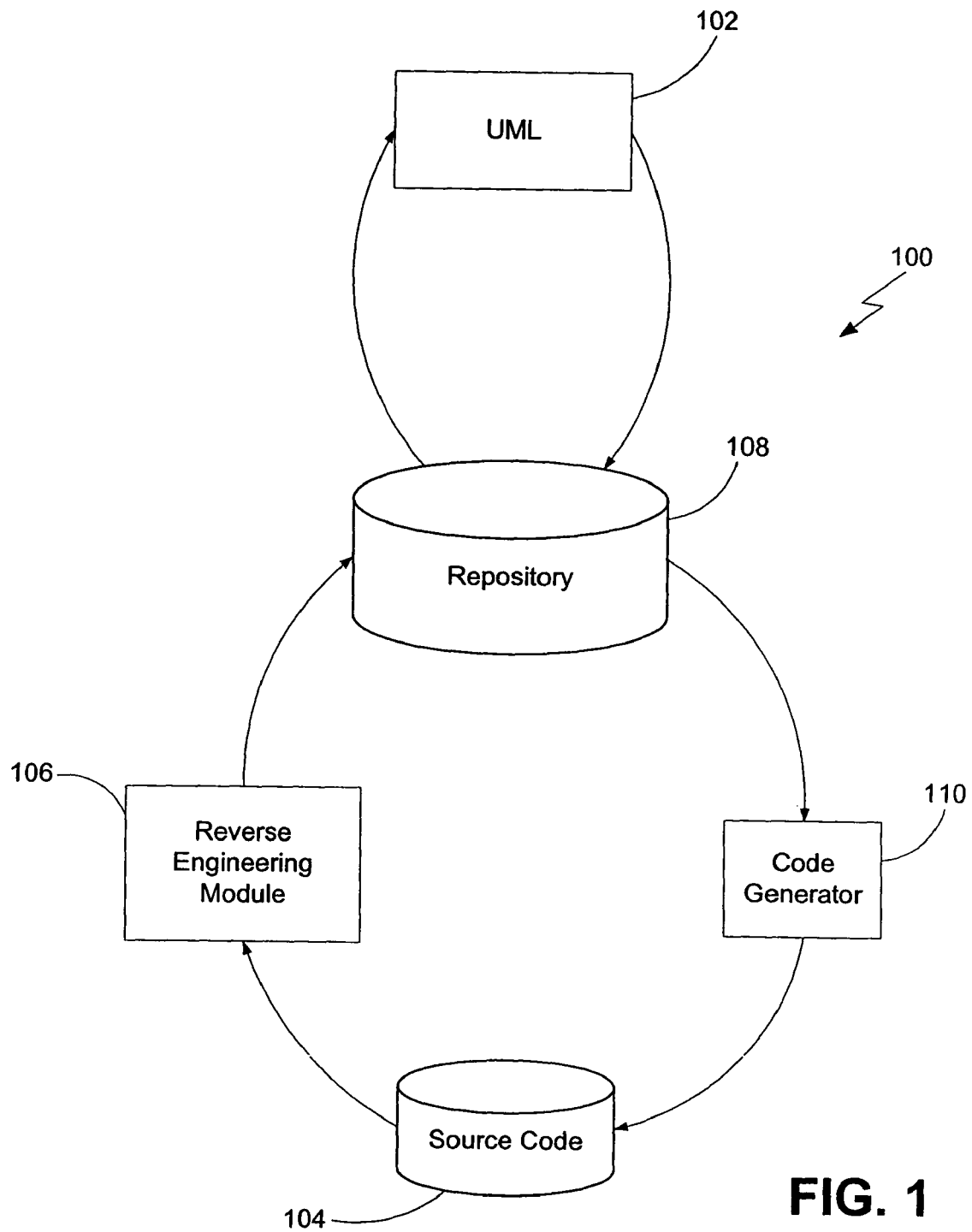
FIG. 1 depicts a conventional software development tool.

Reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications, and equivalents included within the spirit and scope of the invention as defined by the appended claims.

DETAILED DESCRIPTION OF THE INVENTION

Methods and systems consistent with the present invention provide an improved software development tool that creates a graphical representation of source code regardless of the programming language in which the code is written. In addition, the software development tool simultaneously reflects any modifications to the source code to both the display of the graphical representation as well as the textual display of the source code.

Figure 2:
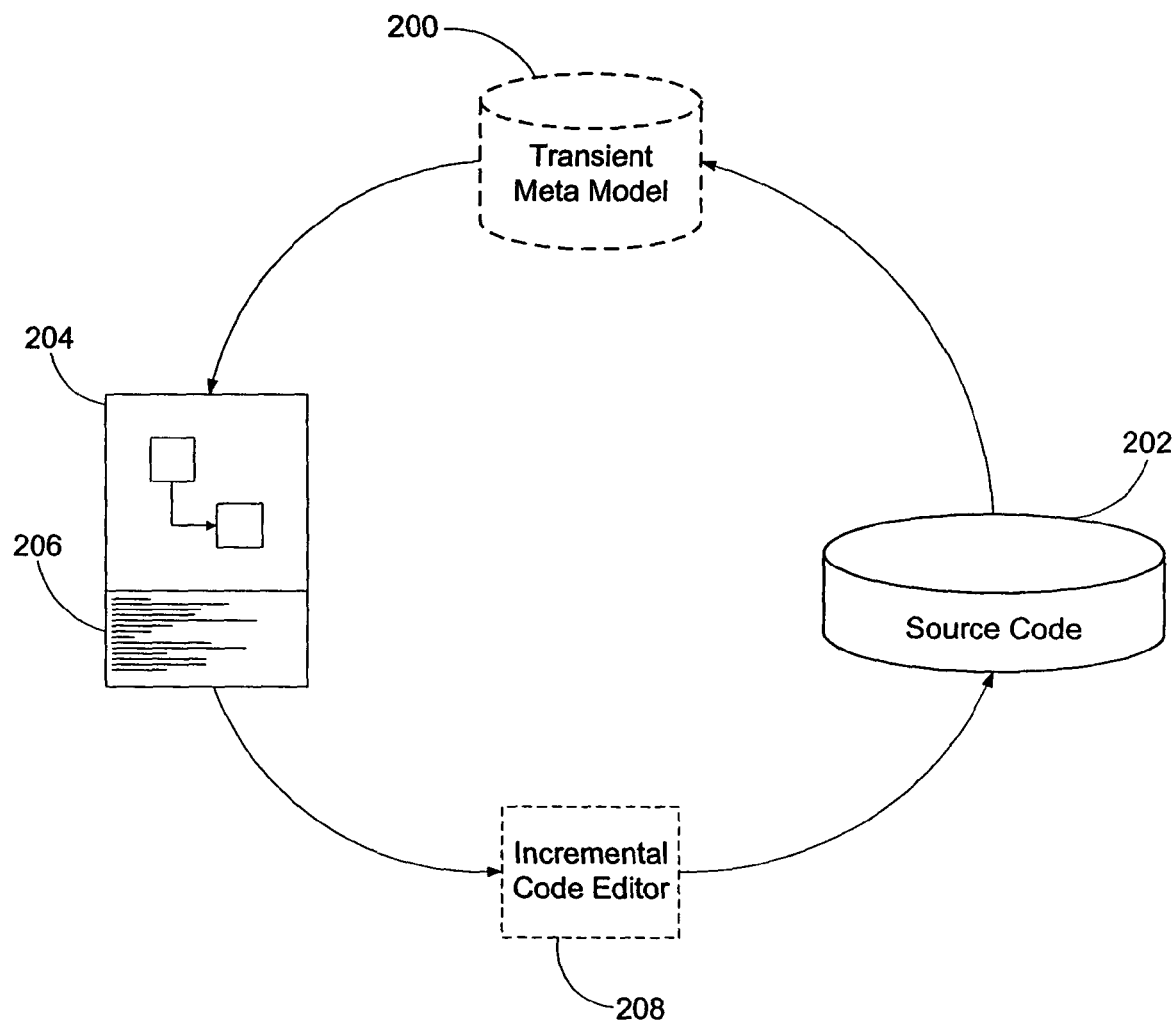
FIG. 2 depicts an overview of a software development tool in accordance with methods and systems consistent with the present invention.

As depicted in FIG. 2, source code 202 is being displayed in both a graphical form 204 and a textual form 206. In accordance with methods and systems consistent with the present invention, the improved software development tool generates a transient meta model (TMM) 200 which stores a language-neutral representation of the source code 202. The graphical 204 and textual 206 representations of the source code 202 are generated from the language-neutral representation in the TMM 200. Alternatively, the textual view 206 of the source code may be obtained directly from the source code file. Although modifications made on the displays 204 and 206 may appear to modify the displays 204 and 206, in actuality all modifications are made directly to the source code 202 via an incremental code editor (ICE) 208, and the TMM 200 is used to generate the modifications in both the graphical 204 and the textual 206 views from the modifications to the source code 202.

The improved software development tool provides simultaneous round-trip engineering, i.e., the graphical representation 204 is synchronized with the textual representation 206. Thus, if a change is made to the source code 202 via the graphical representation 204, the textual representation 206 is updated automatically. Similarly, if a change is made to the source code 202 via the textual representation 206, the graphical representation 204 is updated to remain synchronized. There is no repository, no batch code generation, and no risk of losing code.

Figure 3:
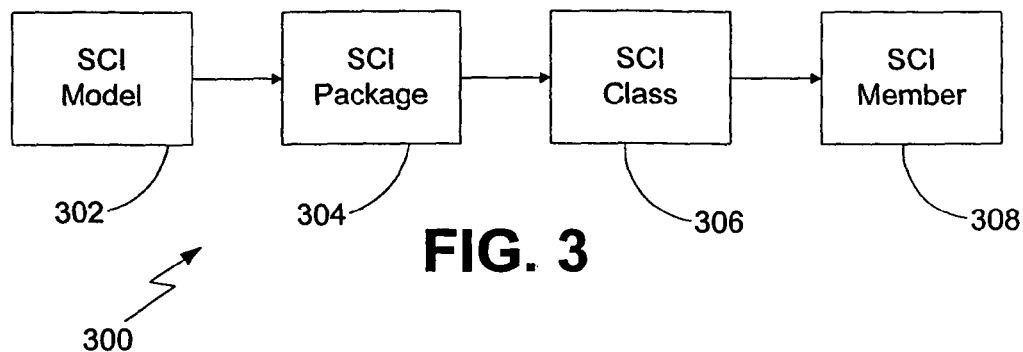
FIG. 3 depicts a data structure of the language-neutral representation created by the software development tool of FIG. 2.

The data structure 300 of the language-neutral representation is depicted in FIG. 3. The data structure 300 comprises a Source Code Interface (SCI) model 302, an SCI package 304, an SCI class 306, and an SCI member 308. The SCI model 302 is the source code organized into packages. The SCI model 302 corresponds to a directory for a software project being developed by the user, and the SCI package 304 corresponds to a subdirectory. The software project comprises the source code in at least one file that is compiled to form a sequence of instructions to be run by a data processing system. The data processing system is discussed in detail below. As is well known in object-oriented programming, the class 306 is a category of objects which describes a group of objects with similar properties (attributes), common behavior (operations or methods), common relationships to other objects, and common semantics. The members 308 comprise attributes and/or operations.

Figure 4:
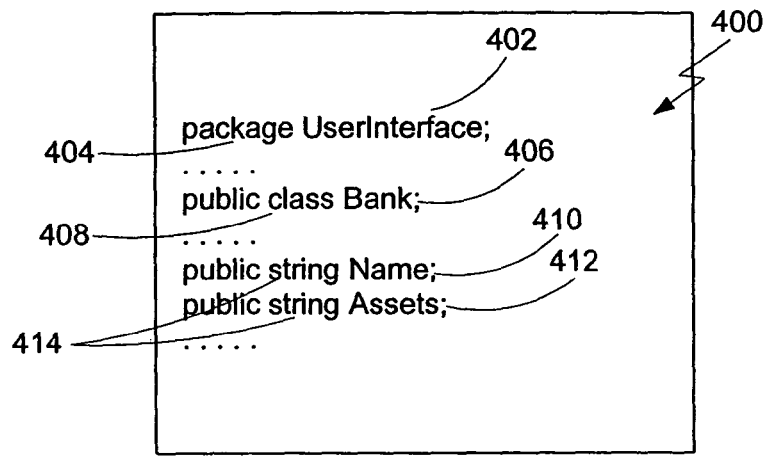
FIG. 4 depicts representative source code.
Figure 5:
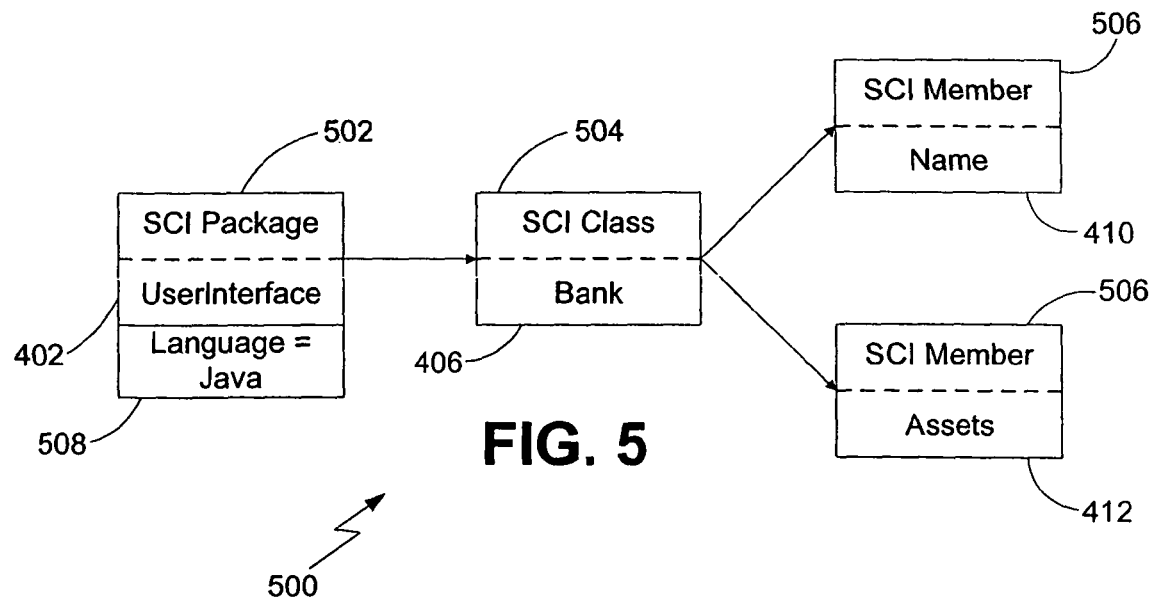
FIG. 5 depicts the data structure of the language-neutral representation of the source code of FIG. 4.

For example, the data structure 500 for the source code 400 depicted in FIG. 4 is depicted in FIG. 5. UserInterface 402 is defined as a package 404. Accordingly, UserInterface 402 is contained in SCI package 502. Similarly, Bank 406, which is defined as a class 408, is contained in SCI class 504, and Name 410 and Assets 412, which are defined as attributes (strings 414), are contained in SCI members 506. Since these elements are in the same project, all are linked. The data structure 500 also identifies the language in which the source code is written 508, e.g., the Java™ language.

Figure 6:
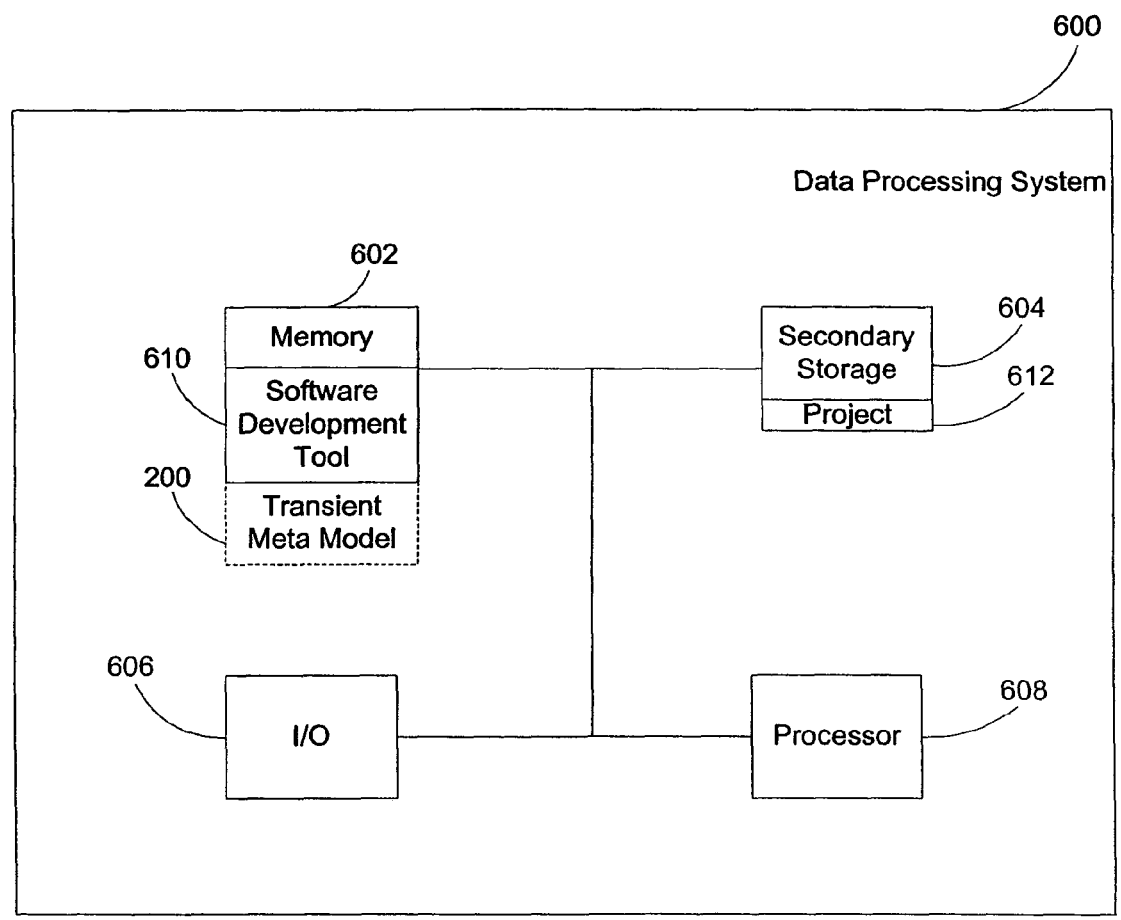
FIG. 6 depicts a data processing system suitable for practicing the present invention.

FIG. 6 depicts a data processing system 600 suitable for practicing methods and systems consistent with the present invention. Data processing system 600 comprises a memory 602, a secondary storage device 604, an I/O device 606, and a processor 608. Memory 602 includes the improved software development tool 610. The software development tool 610 is used to develop a software project 612, and create the TMM 200 in the memory 602. The project 612 is stored in the secondary storage device 604 of the data processing system 600. One skilled in the art will recognize that data processing system 600 may contain additional or different components.

Although aspects of the present invention are described as being stored in memory, one skilled in the art will appreciate that these aspects can also be stored on or read from other types of computer-readable media, such as secondary storage devices, like hard disks, floppy disks or CD-ROM; or other forms of RAM or ROM either currently known or later developed.

Figure 7:
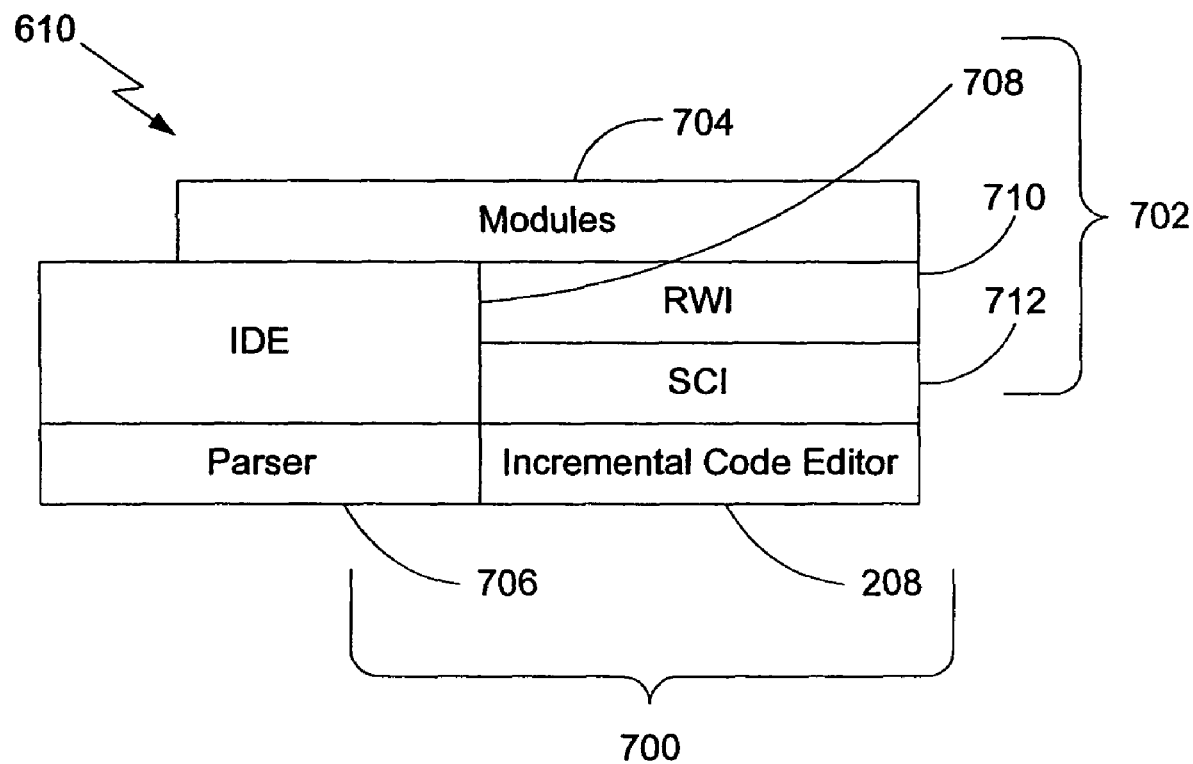
FIG. 7 depicts an architectural overview of the software development tool of FIG. 2.

FIG. 7 illustrates an architectural overview of the improved software development tool 610. The tool 610 comprises a core 700, an open application program interface (API) 702, and modules 704. The core 700 includes a parser 706 and an ICE 208. The parser 706 converts the source code into the language-neutral representation in the TMM, and the ICE 208 converts the text from the displays into source code. There are three main packages composing the API 702: Integrated Development Environment (IDE) 708; Read-Write Interface (RWI) 710; and Source Code Interface (SCI) 712. Each package includes corresponding subpackages. As is well known in the art, a package is a collection of classes, interfaces, attributes, notifications, operations, or behaviors that are treated as a single module or program unit.

IDE 708 is the API 702 needed to generate custom outputs based on information contained in a model. It is a read-only interface, i.e., the user can extract information from the model, but not change the model. IDE 708 provides the functionality related to the model's representation in IDE 708 and interaction with the user. Each package composing the IDE group has a description highlighting the areas of applicability of this concrete package.

RWI 710 enables the user to go deeper into the architecture. Using RWI 710, information can be extracted from and written to the models. RWI not only represents packages, classes and members, but it may also represent different diagrams (class diagrams, use case diagrams, sequence diagrams and others), links, notes, use cases, actors, states, etc.

SCI 712 is at the source code level, and allows the user to work with the source code almost independently of the language being used.

There are a variety of modules 704 in the software development tool 610 of the present invention. Some of the modules 704 access information to generate graphical and code documentation in custom formats, export to different file formats, or develop patterns. The software development tool also includes a quality assurance (QA) module which monitors the modifications to the source code and calculates various complexity metrics, i.e., various measurements of the program's performance or efficiency, to support quality assurance. The types of metrics calculated by the software development tool include basic metrics, cohesion metrics, complexity metrics, coupling metrics, Halstead metrics, inheritance metrics, maximum metrics, polymorphism metrics, and ratio metrics. Examples of these metrics with their respective definitions are identified in Tables 1-9 below.

TABLE 1

Basic Metrics

| Basic Metrics | Description |
| --- | --- |
| Lines Of Code | Counts the number of code lines. |
| Number Of Attributes | Counts the number of attributes. If a class has a high number of attributes, it may be appropriate to divide it into subclasses. |
| Number Of Classes | Counts the number of classes. |
| Number Of Import Statements | Counts the number of imported packages/classes. This measure can highlight excessive importing, and also can be used as a measure of coupling. |
| Number Of Members | Counts the number of members, i.e., attributes and operations. If a class has a high number of members, it may be appropriate to divide it into subclasses. |
| Number Of Operations | Counts the number of operations. If a class has a high number of operations, it may be appropriate to divide it into subclasses. |

TABLE 2

Cohesion Metrics

| Cohesion Metrics | Description |
| --- | --- |
| Lack Of Cohesion Of Methods 1 | Takes each pair of methods in the class and determines the set of fields they each access. A low value indicates high coupling between methods, which indicates potentially low reusability and increased testing because many methods can affect the same attributes. |
| Lack Of Cohesion Of Methods 2 | Counts the percentage of methods that do not access a specific attribute averaged over all attributes in the class. A high value of cohesion (a low lack of cohesion) implies that the class is well designed. |
| Lack Of Cohesion Of Methods 3 | Measures the dissimilarity of methods in a class by attributes. A low value indicates good class subdivision, implying simplicity and high reusability. A high lack of cohesion increases complexity, thereby increasing the likelihood of errors during the development process. |

TABLE 3

Complexity Metrics

| Complexity Metrics | Description |
| --- | --- |
| Attribute Complexity | Defined as the sum of each attribute's value in the class. |
| Cyclomatic Complexity | Represents the cognitive complexity of the class. It counts the number of possible paths through an algorithm by counting the number of distinct regions on a flowgraph, i.e., the number of 'if,' 'for' and 'while' statements in the operation's body. |
| Number Of Remote Methods | Processes all of the methods and constructors, and counts the number of different remote methods called. A remote method is defined as a method which is not declared in either the class itself or its ancestors. |
| Response For Class | Calculated as 'Number of Local Methods' + 'Number of Remote Methods.' A class which provides a larger response set is considered to be more complex and requires more testing than one with a smaller overall design complexity. |
| Weighted Methods Per Class 1 | The sum of the complexity of all methods for a class, where each method is weighted by its cyclomatic complexity. The number of methods and the complexity of the methods involved is a predictor of how much time and effort is required to develop and maintain the class. |
| Weighted Methods Per Class 2 | Measures the complexity of a class, assuming that a class with more methods than another is more complex, and that a method with more parameters than another is also likely to be more complex. |

TABLE 4

Coupling Metrics

| Coupling Metrics | Description |
| --- | --- |
| Coupling Between Objects | Represents the number of other classes to which a class is coupled. Counts the number of reference types that are used in attribute declarations, formal parameters, return types, throws declarations and local variables, and types from which attribute and method selections are made.<br>Excessive coupling between objects is detrimental to modular design and prevents reuse. The more independent a class is, the easier it is to reuse it in another application. In order to improve modularity and promote encapsulation, inter-object class couples should be kept to a minimum. The larger the number of couples, the higher the sensitivity to changes in other parts of the design, and therefore maintenance is more difficult. A measure of coupling is useful to determine how complex the testing of various parts of a design is likely to be. The higher the inter-object class coupling, the more rigorous the testing needs to be. |
| Data Abstraction Coupling | Counts the number of reference types used in the attribute declarations. |
| FanOut | Counts the number of reference types that are used in attribute declarations, formal parameters, return types, throws declarations and local variables. |

TABLE 5

Halstead Metrics

| Halstead Metrics | Description |
| --- | --- |
| Halstead Difficulty | This measure is one of the Halstead Software Science metrics. It is calculated as ('Number of Unique Operators'/'Number of Unique Operands') * ('Number of Operands'/'Number of Unique Operands'). |
| Halstead Effort | This measure is one of the Halstead Software Science metrics. It is calculated as 'Halstead Difficulty' * 'Halstead Program Volume.' |
| Halstead Program Length | This measure is one of the Halstead Software Science metrics. It is calculated as 'Number of Operators' + 'Number of Operands.' |
| Halstead Program Vocabulary | This measure is one of the Halstead Software Science metrics. It is calculated as 'Number of Unique Operators' + 'Number of Unique Operands.' |
| Halstead Program Volume | This measure is one of the Halstead Software Science metrics. It is calculated as 'Halstead Program Length' * Log2 ('Halstead Program Vocabulary'). |
| Number Of Operands | This measure is used as an input to the Halstead Software Science metrics. It counts the number of operands used in a class. |
| Number Of Operators | This measure is used as an input to the Halstead Software Science metrics. It counts the number of operators used in a class. |
| Number Of Unique Operands | This measure is used as an input to the Halstead Software Science metrics. It counts the number of unique operands used in a class. |
| Number Of Unique Operators | This measure is used as an input to the Halstead Software Science metrics. It counts the number of unique operators used in a class. |

TABLE 6

Inheritance Metrics

| Inheritance Metrics | Description |
| --- | --- |
| Depth Of Inheritance Hierarchy | Counts how far down the inheritance hierarchy a class or interface is declared. High values imply that a class is quite specialized. |
| Number Of Child Classes | Counts the number of classes which inherit from a particular class, i.e., the number of classes in the inheritance tree down from a class. Non-zero value indicates that the particular class is being re-used. The abstraction of the class may be poor if there are too many child classes. It should also be stated that a high value of this measure points to the definite amount of testing required for each child class. |

TABLE 7

Maximum Metrics

| Maximum Metrics | Description |
| --- | --- |
| Maximum Number Of Levels | Counts the maximum depth of 'if,' 'for' and 'while' branches in the bodies of methods. Logical units with a large number of nested levels may need implementation simplification and process improvement because groups that contain more than seven pieces of information are increasingly harder for people to understand in problem solving. |
| Maximum Number Of Parameters | Displays the maximum number of parameters among all class operations. Methods with many parameters tend to be more specialized and, thus, are less likely to be reusable. |
| Maximum Size Of Operation | Counts the maximum size of the operations for a class. Method size is determined in terms of cyclomatic complexity, i.e., the number of 'if,' 'for' and 'while' statements in the operation's body. |

TABLE 8

Polymorphism Metrics

| Polymorphism Metrics | Description |
| --- | --- |
| Number Of Added Methods | Counts the number of operations added by a class. A large value of this measure indicates that the functionality of the given class becomes increasingly distinct from that of the parent classes. In this case, it should be considered whether this class genuinely should be inheriting from the parent, or if it could be broken down into several smaller classes. |

TABLE 8-continued

Polymorphism Metrics

| Polymorphism Metrics | Description |
| --- | --- |
| Number Of Overridden Methods | Counts the number of inherited operations which a class overrides. Classes without parents are not processed. High values tend to indicate design problems, i.e., subclasses should generally add to and extend the functionality of the parent classes rather than overriding them. |

TABLE 9

Ratio Metrics

| Ratio Metrics | Description |
| --- | --- |
| Comment Ratio | Counts the ratio of comments to total lines of code including comments. |
| Percentage Of Package Members | Counts the percentage of package members in a class. |
| Percentage Of Private Members | Counts the percentage of private members in a class. |
| Percentage Of Protected Members | Counts the percentage of protected members in a class. |
| Percentage Of Public Members | Counts the proportion of vulnerable members in a class. A large proportion of such members means that the class has high potential to be affected by external classes and means that increased efforts will be needed to test such a class thoroughly. |
| True Comment Ratio | Counts the ratio of comments to total lines of code excluding comments. |

The QA module also provides audits, i.e., the module checks for conformance to pre-defined or user-defined styles. The types of audits provided by the module include coding style, critical errors, declaration style, documentation, naming style, performance, possible errors and superfluous content. Examples of these audits with their respective definitions are identified in Tables 10-17 below.

TABLE 10

Coding Style Audits

| Coding Style Audits | Description |
| --- | --- |
| Access Of Static Members Through Objects | Static members should be referenced through class names rather than through objects. |
| Assignment To Formal Parameters | Formal parameters should not be assigned. |
| Complex Assignment | Checks for the occurrence of multiple assignments and assignments to variables within the same expression. Complex assignments should be avoided since they decrease program readability. |
| Don't Use The Negation Operator Frequently | The negation operator slows down the readability of the program. Thus, it is recommended that it not be used frequently. |
| Operator '?:' May Not Be Used | The operator '?:' makes the code harder to read than the alternative form with an if-statement. |
| Provide Incremental In For-Statement Or Use While-Statement | Checks if the third argument of the 'for'-statement is missing. |
| Replacement For Demand Imports | Demand import-declarations must be replaced by a list of single import-declarations that are actually imported into the compilation unit. In other words, import-statements may not end with an asterisk. |
| Use Abbreviated Assignment Operator | Use the abbreviated assignment operator in order to write programs more rapidly. Also, some compilers run faster with the abbreviated assignment operator. |
| Use 'this' Explicitly To Access Class Members | Tries to make the developer use 'this' explicitly when trying to access class members. Using the same class member names with parameter names often makes what the developer is referring to unclear. |

TABLE 11

Critical Errors Audits

| Critical Errors Audits | Description |
| --- | --- |
| Avoid Hiding Inherited Attributes | Detects when attributes declared in child classes hide inherited attributes. |
| Avoid Hiding Inherited Static Methods | Detects when inherited static operations are hidden by child classes. |
| Command Query Separation | Prevents methods that return a value from a modifying state. The methods used to query the state of an object must be different from the methods used to perform commands (change the state of the object). |
| Hiding Of Names | Declarations of names should not hide other declarations of the same name. |
| Inaccessible Constructor Or Method Matches | Overload resolution only considers constructors and methods that are visible at the point of the call. If, however, all the constructors and methods were considered, there may be more matches. This rule is violated in this case. Imagine that ClassB is in a different package than ClassA. Then the allocation of ClassB violates this rule since the second constructor is not visible at the point of the allocation, but it still matches the allocation (based on signature). Also, the call to open in ClassB violates this rule since the second and the third declarations of open are not visible at the point of the call, but it still matches the call (based on signature). |
| Multiple Visible Declarations With Same Name | Multiple declarations with the same name must not be simultaneously visible except for overloaded methods. |
| Overriding A Non-Abstract Method With An Abstract Method | Checks for abstract methods overriding non-abstract methods in a subclass. |
| Overriding A Private Method | A subclass should not contain a method with the same name and signature as in a superclass if these methods are declared to be private. |
| Overloading Within A Subclass | A superclass method may not be overloaded within a subclass unless all overloading in the superclass are also overridden in the subclass. It is very unusual for a subclass to be overloading methods in its superclass without also overriding the methods it is overloading. More frequently this happens due to inconsistent changes between the superclass and subclass - i.e., the intention of the user is to override the method in the superclass, but, due to the error, the subclass method ends up overloading the superclass method. |
| Use Of Static Attribute For Initialization | Non-final static attributes should not be used in initializations of attributes. |

TABLE 12

Declaration Style Audits

| Declaration Style Audits | Description |
| --- | --- |
| Badly Located Array Declarators | Array declarators must be placed next to the type descriptor of their component type. |
| Constant Private Attributes Must Be Final | Private attributes that never get their values changed must be declared final. By explicitly declaring them in such a way, a reader of the source code get some information of how the attribute is supposed to be used. |
| Constant Variables Must Be Final | Local variables that never get their values changed must be declared final. By explicitly declaring them in such a way, a reader of the source code obtains information about how the variable is supposed to be used. |
| Declare Variables In One Statement Each | Several variables (attributes and local variables) should not be declared in the same statement. |
| Instantiated Classes Should Be Final | This rule recommends making all instantiated classes final. It checks classes which are present in the object model. Classes from search/classpath are ignored. |
| List All Public And Package Members First | Enforces a standard to improve readability. Methods/data in your class should be ordered properly. |

TABLE 12-continued

Declaration Style Audits

| Declaration Style Audits | Description |
|---|---|
| Order Of Appearance Of Modifiers | Checks for correct ordering of modifiers. For classes, this includes visibility (public, protected or private), abstract, static, final. For attributes, this includes visibility (public, protected or private), static, final, transient, volatile. For operations, this includes visibility (public, protected or private), abstract, static, final, synchronized, native. |
| Put The Main Function Last | Tries to make the program comply with various coding standards regarding the form of the class definitions. |

TABLE 13

Documentation Audits

| Documentation Audits | Description |
|---|---|
| Bad Tag In JavaDoc Comments | This rule verifies code against accidental use of improper JavaDoc tags. |
| Distinguish Between JavaDoc And Ordinary Comments | Checks whether the JavaDoc comments in your program ends with '**/' and ordinary C-style ones with '*/.' |

TABLE 14

Naming Style Audits

| Naming Style Audits | Description |
|---|---|
| Class Name Must Match Its File Name | Checks whether top level classes or interfaces have the same name as the file in which they reside. |
| Group Operations With Same Name Together | Enforces standard to improve readability. |
| Naming Conventions | Takes a regular expression and item name and reports all occurrences where the pattern does not match the declaration. |
| Names Of Exception Classes | Names of classes which inherit from Exception should end with Exception. |
| Use Conventional Variable Names | One-character local variable or parameter names should be avoided, except for temporary and looping variables, or where a variable holds an undistinguished value of a type. |

TABLE 15

Performance Audits

| Performance Audits | Description |
|---|---|
| Avoid Declaring Variables Inside Loops | This rule recommends declaring local variables outside the loops since declaring variables inside the loop is less efficient. |
| Append To String Within A Loop | Performance enhancements can be obtained by replacing string operations with stringbuffer operations if a string object is appended within a loop. |
| Complex Loop Expressions | Avoid using complex expressions as repeat conditions within loops. |

TABLE 16

Possible Error Audits

| Possible Error Audits | Description |
|---|---|
| Avoid Public And Package Attributes | Declare the attributes either private or protected, and provide operations to access or change them. |
| Avoid Statements With Empty Body | Avoid statements with empty body. |
| Assignment To For-Loop Variables | 'For'-loop variables should not be assigned. |
| Don't Compare Floating Point Types | Avoid testing for equality of floating point numbers since floating-point numbers that should be equal are not always equal due to rounding problems. |
| Enclosing Body Within A Block | The statement of a loop must always be a block. The 'then' and 'else' parts of 'if'-statements must always be blocks. This makes it easier to add statements without accidentally introducing bugs in case the developer forgets to add braces. |
| Explicitly Initialize All Variables | Explicitly initialize all variables. The only reason not to initialize a variable is where it's declared is if the initial value depends on some computation occurring first. |
| Method finalize( ) Doesn't Call super.finalize( ) | Calling of super.finalize( ) from finalize( ) is good practice of programming, even if the base class doesn't define the finalize( ) method. This makes class implementations less dependent on each other. |

TABLE 16-continued

Possible Error Audits

| Possible Error Audits | Description |
| --- | --- |
| Mixing Logical Operators Without Parentheses | An expression containing multiple logical operators should be parenthesized properly. |
| No Assignments In Conditional Expressions | Use of assignment within conditions makes the source code hard to understand. |
| Use 'equals' Instead Of '==' | The '==' operator used on strings checks if two string objects are two identical objects. In most situations, however, one likes to simply check if two strings have the same value. In these cases, the 'equals' method should be used. |
| Use 'L' Instead Of 'l' At The End Of Integer Constant | It is better to use uppercase 'L' to distinguish the letter 'l' from the number '1.' |
| Use Of The 'synchronized' Modifier | The 'synchronized' modifier on methods can sometimes cause confusion during maintenance as well as during debugging. This rule therefore recommends against using this modifier, and instead recommends using 'synchronized' statements as replacements. |

TABLE 17

Superfluous Content Audits

| Superfluous Content Audits | Description |
| --- | --- |
| Duplicate Import Declarations | There should be at most one import declaration that imports a particular class/package. |
| Don't Import the Package The Source File Belongs To | No classes or interfaces need to be imported from the package to which the source code file belongs. Everything in that package is available without explicit import statements. |
| Explicit Import Of The java.lang Classes | Explicit import of classes from the package 'java.lang' should not be performed. |
| Equality Operations On Boolean Arguments | Avoid performing equality operations on Boolean operands. 'True' and 'false' literals should not be used in conditional clauses. |
| Imported Items Must Be Used | It is not legal to import a class or an interface and never use it. This rule checks classes and interfaces that are explicitly imported with their names - that is, not with import of a complete package, using an asterisk. If unused class and interface imports are omitted, the amount of meaningless source code is reduced — thus the amount of code to be understood by a reader is minimized. |
| Unnecessary Casts | Checks for the use of type casts that are not necessary. |
| Unnecessary 'instance of' Evaluations | Verifies that the runtime type of the left-hand side expression is the same as the one specified on the right-hand side. |
| Unused Local Variables And Formal Parameters | Local variables and formal parameter declarations must be used. |
| Use Of Obsolete Interface Modifier | The modifier 'abstract' is considered obsolete and should not be used. |
| Use Of Unnecessary Interface Member Modifiers | All interface operations are implicitly public and abstract. All interface attributes are implicitly public, final and static. |
| Unused Private Class Member | An unused class member might indicate a logical flaw in the program. The class declaration has to be reconsidered in order to determine the need of the unused member(s). |

Figure 8A:
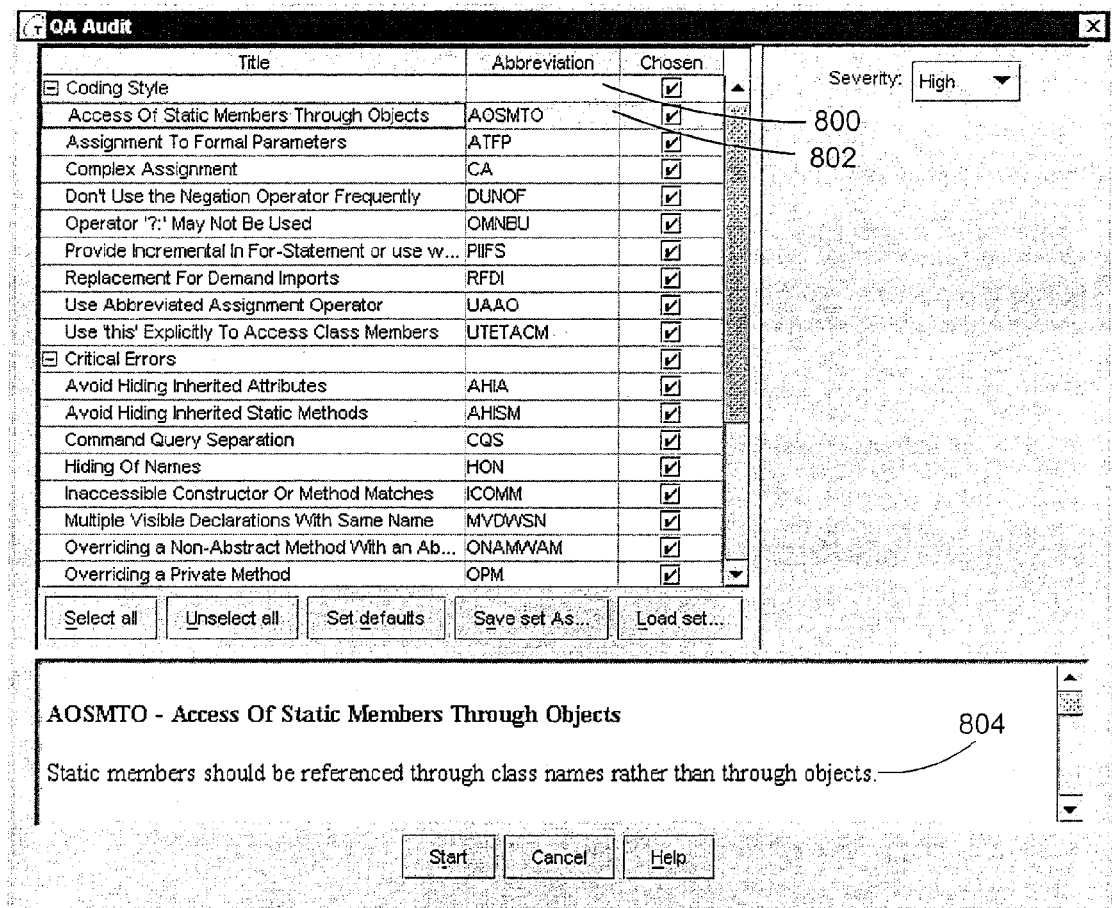
FIG. 8A depicts a user interface displayed by the software development tool depicted in FIG. 2, where the user interface displays a list of pre-defined criteria which the software development tool checks in the source code.
Figure 8B:
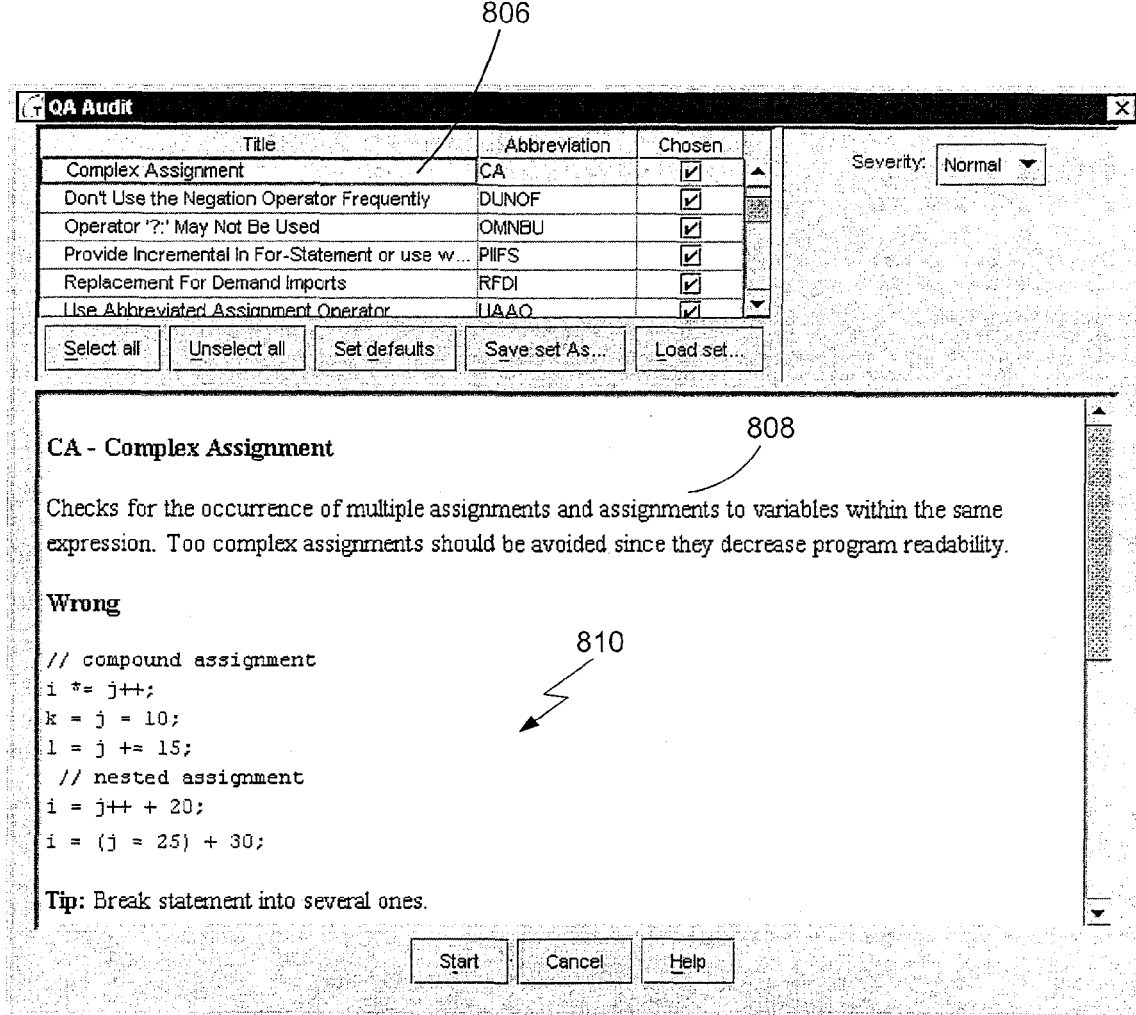
FIG. 8B depicts a user interface displayed by the software development tool depicted in FIG. 2, where the user interface displays the definition of the criteria which the software development tool checks in the source code, and an example of source code which does not conform to the criteria.
Figure 8C:
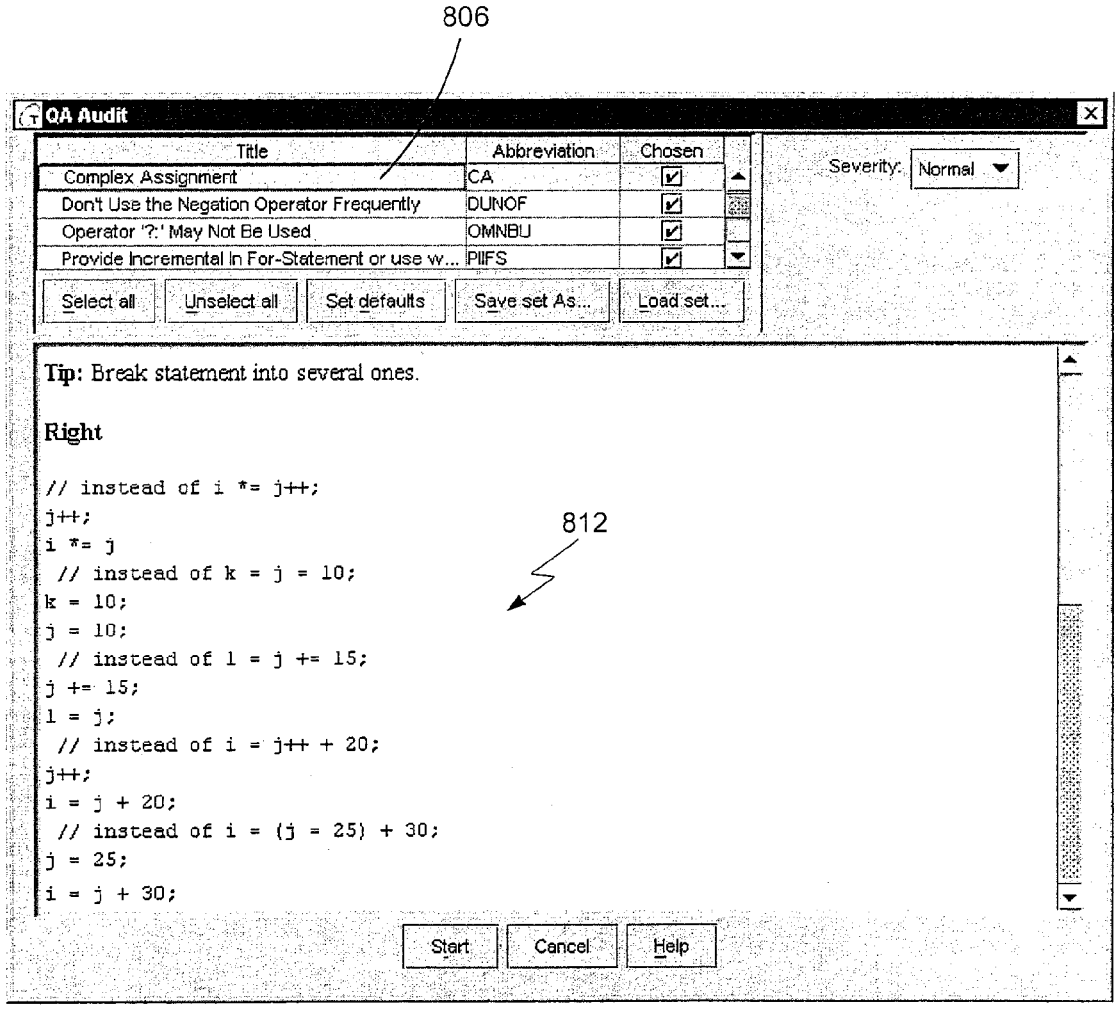
FIG. 8C depicts a user interface displayed by the software development tool depicted in FIG. 2, where the user interface displays an example of source code which conforms to the criteria which the software development tool checks in the source code.

If the QA module determines that the source code does not conform, an error message is provided to the developer. For example, as depicted in FIG. 8A, the software development tool checks for a variety of coding styles 800. If the software development tool were to check for "Access Of Static Members Through Objects" 802, it would verify whether static members are referenced through class names rather than through objects 804. Further, as depicted in FIG. 8B, if the software development tool were to check for "Complex Assignment" 806, the software development tool would check for the occurrence of multiple assignments and assignments to variables within the same expression to avoid complex assignments since these decrease program readability 808. An example of source code having a complex assignment 810 and source code having a non-complex assignment 812 are depicted in FIGS. 8B and 8C, respectively. The QA module of the software development tool scans the source code for other syntax errors and/or other deviations from well known rules, as described above, and provides an error message if any such errors are detected.

The improved software development tool of the present invention is used to develop source code in a project. The project comprises a plurality of files and the source code of a chosen one of the plurality of files is written in a given language. The software development tool determines the language of the source code of the chosen file, converts the source code from the language into a language-neutral representation, uses the language-neutral representation to textually display the source code of the chosen file in the language, and uses the language-neutral representation to display a graphical representation of at least a portion of the project. As discussed above, in an alternative embodiment, the textual display may be obtained directly from the source code file. The source code and the graphical representation are displayed simultaneously.

The improved software development tool of the present invention is also used to develop source code. The software development tool receives an indication of a selected language for the source code, creates a file to store the source code in the selected language, converts the source code from the selected language into a language-neutral representation, uses the language-neutral representation to display the source code of the file, and uses the language-neutral representation to display a graphical representation of the file. Again, the source code and the graphical representation are displayed simultaneously.

Moreover, if the source code in the file is modified, the modified source code and a graphical representation of at least a portion of the modified source code are displayed simultaneously. The QA module of the software development tool provides an error message if the modification does not conform to pre-defined or user-defined styles, as described above. The modification to the source code may be received by the software development tool via the programmer editing the source code in the textual pane or the graphical pane, or via some other independent software tool that the programmer uses to modify the code. The graphical representation of the project may be in Unified Modeling Language; however, one skilled in the art will recognize that other graphical representations of the source code may be displayed. Further, although the present invention is described and shown using the various views of the UML, one of ordinary skill in the art will recognize that other views may be displayed.

Figure 9:
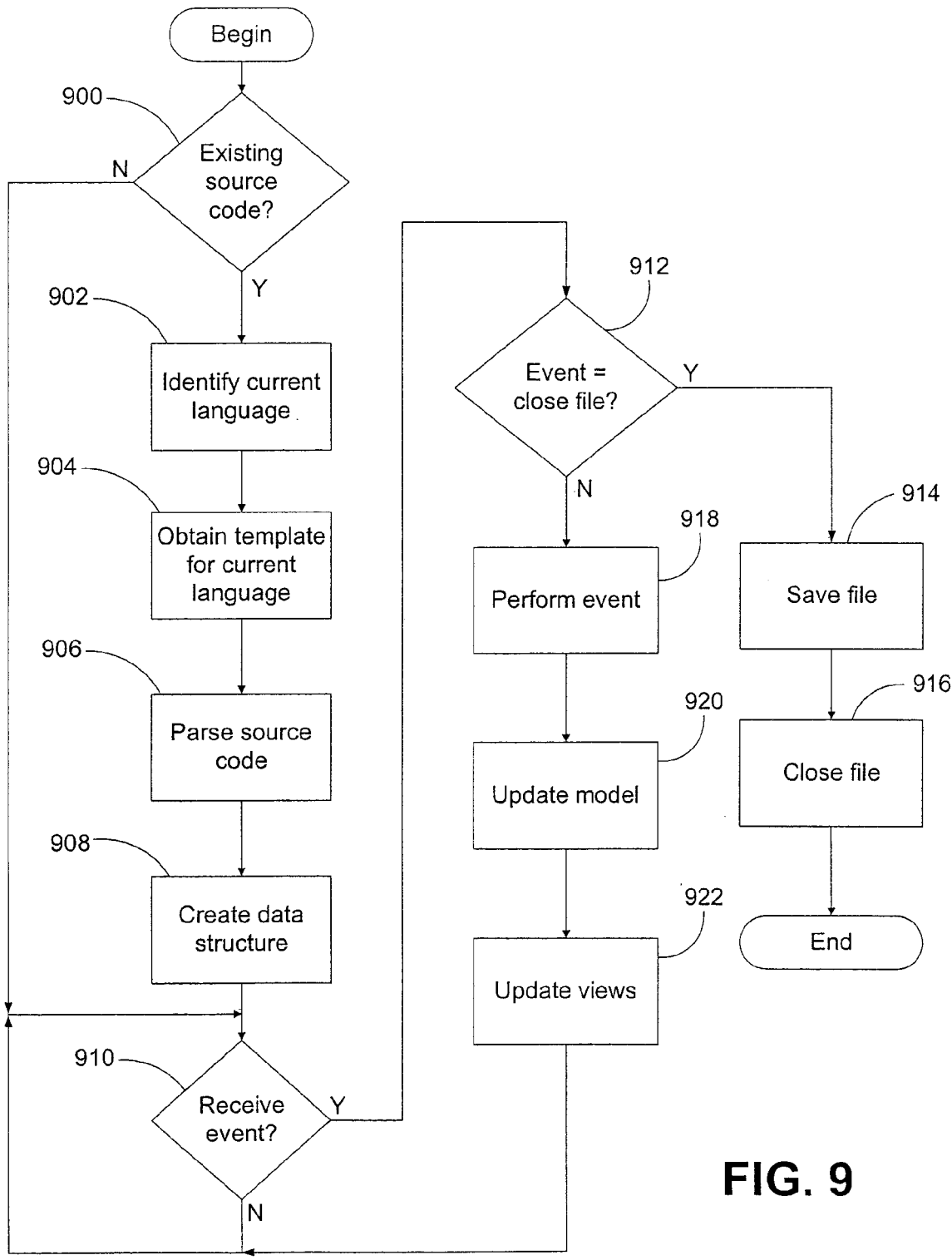
FIG. 9 depicts a flow diagram of the steps performed by the software development tool depicted in FIG. 2.

FIG. 9 depicts a flow diagram of the steps performed by the software development tool to develop a project in accordance with methods consistent with the present invention. As previously stated, the project comprises a plurality of files. The developer either uses the software development tool to open a file that contains existing source code, or to create a file in which the source code will be developed. If the software development tool is used to open the file, determined in step 900, the software development tool initially determines the programming language in which the code is written (step 902). The language is identified by the extension of the file, e.g., ".java" identifies source code written in the Java™ language, while ".cpp" identifies source code written in C++. The software development tool then obtains a template for the current programming language, i.e., a collection of generalized definitions for the particular language that can be used to build the data structure (step 904). For example, the templates used to define a new Java™ class contains a default name, e.g., "Class1," and the default code, "public class Class1 { }." Such templates are well known in the art. For example, the "Microsoft Foundation Class Library" and the "Microsoft Word Template For Business Use Case Modeling" are examples of standard template libraries from which programmers can choose individual template classes. The software development tool uses the template to parse the source code (step 906), and create the data structure (step 908). After creating the data structure or if there is no existing code, the software development tool awaits an event, i.e., a modification or addition to the source code by the developer (step 910). If an event is received and the event is to close the file (step 912), the file is saved (step 914) and closed (step 916). Otherwise, the software development tool performs the event (step 918), i.e., the tool makes the modification. The software development tool then updates the TMM or model (step 920), as discussed in detail below, and updates both the graphical and the textual views (step 922).

Figure 10A:
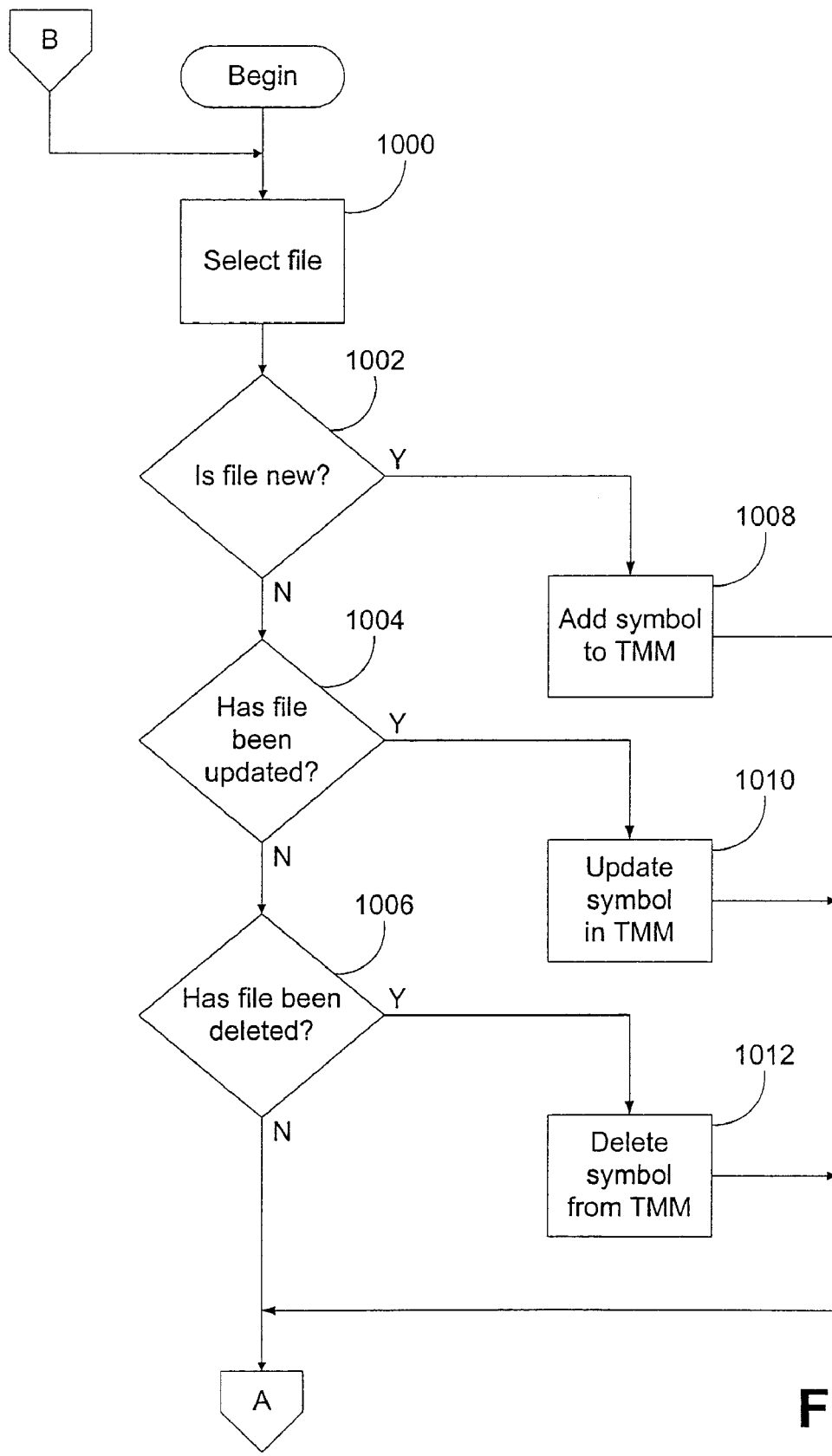
FIGS. 10A and 10B depict a flow diagram illustrating the update model step of FIG. 9.
Figure 10B:
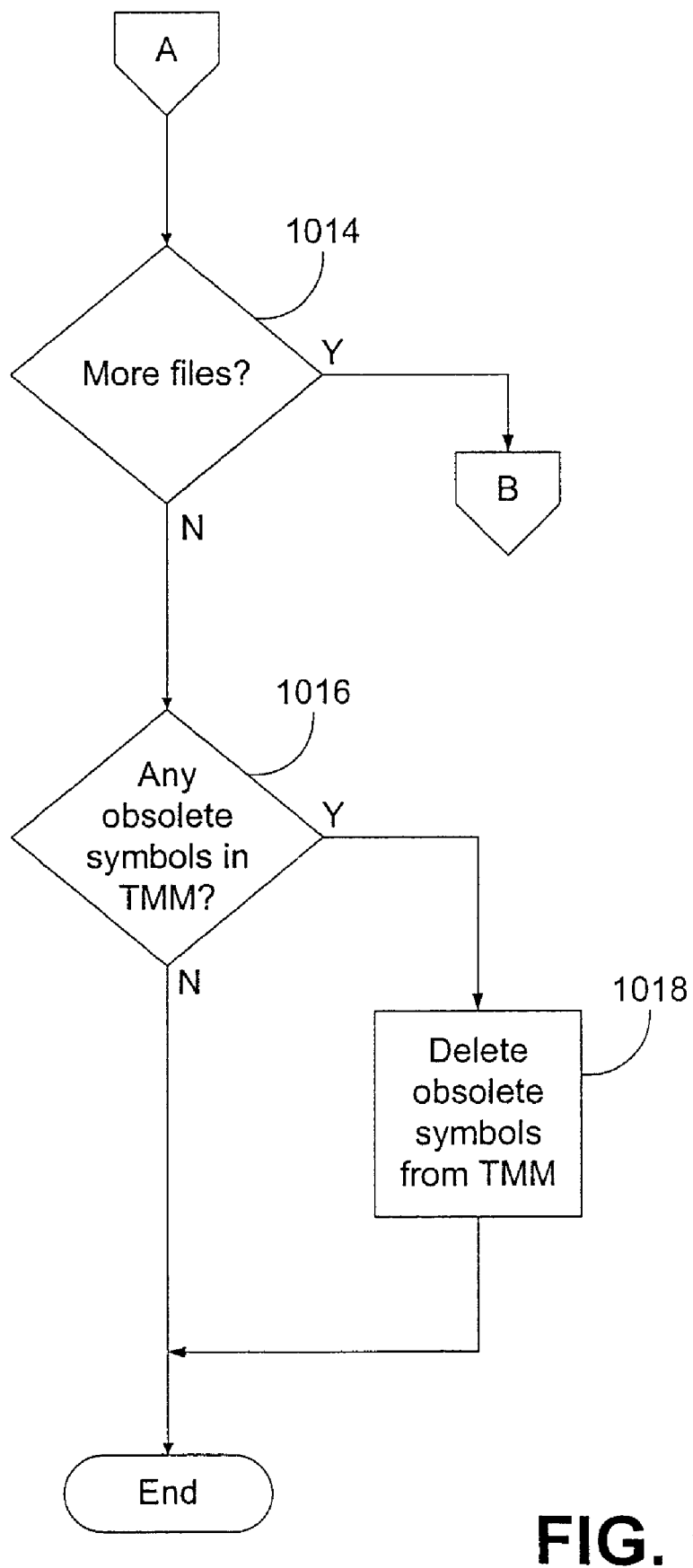

FIGS. 10A and 10B depict a flow diagram illustrating the update model step of FIG. 9. The software development tool selects a file from the project (step 1000), and determines whether the file is new (step 1002), whether the file has been updated (step 1004), or whether the file has been deleted (step 1006). If the file is new, the software development tool adds the additional symbols from the file to the TMM (step 1008). To add the symbol to the TMM, the software development tool uses the template to parse the symbol to the TMM. If the file has been updated, the software development tool updates the symbols in the TMM (step 1010). Similar to the addition of a symbol to the TMM, the software development tool uses the template to parse the symbol to the TMM. If the file has been deleted, the software development tool deletes the symbols in the TMM (step 1012). The software development tool continues this analysis for all files in the project. After all files are analyzed (step 1014), any obsolete symbols in the TMM (step 1016) are deleted (step 1018).

Figure 11:
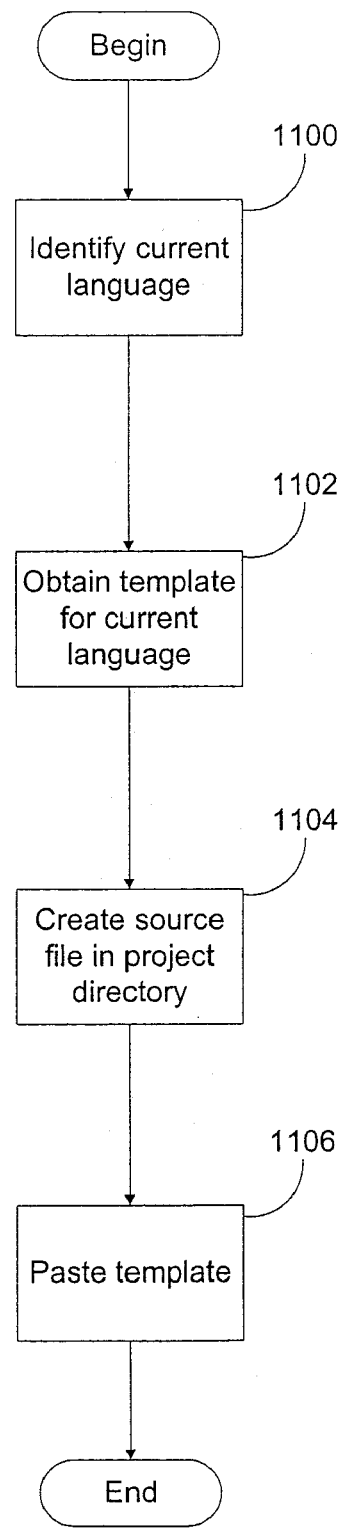
FIG. 11 depicts a flow diagram of the steps performed by the software development tool in FIG. 2 when creating a class.

FIG. 11 depicts a flow diagram illustrating the performance of an event. specifically the creation of a class, in accordance with methods consistent with the present invention. After identifying the programming language (step 1100), the software development tool obtains a template for the language (step 1102), creates a source code file in the project directory (step 1104), and pastes the template into the file (step 1106). The project directory corresponds to the SCI model 302 of FIG. 3. Additional events which a developer may perform using the software development tool include the creation, modification or deletion of packages, projects, attributes, interfaces, links, operations, and the closing of a file.

Figure 12:
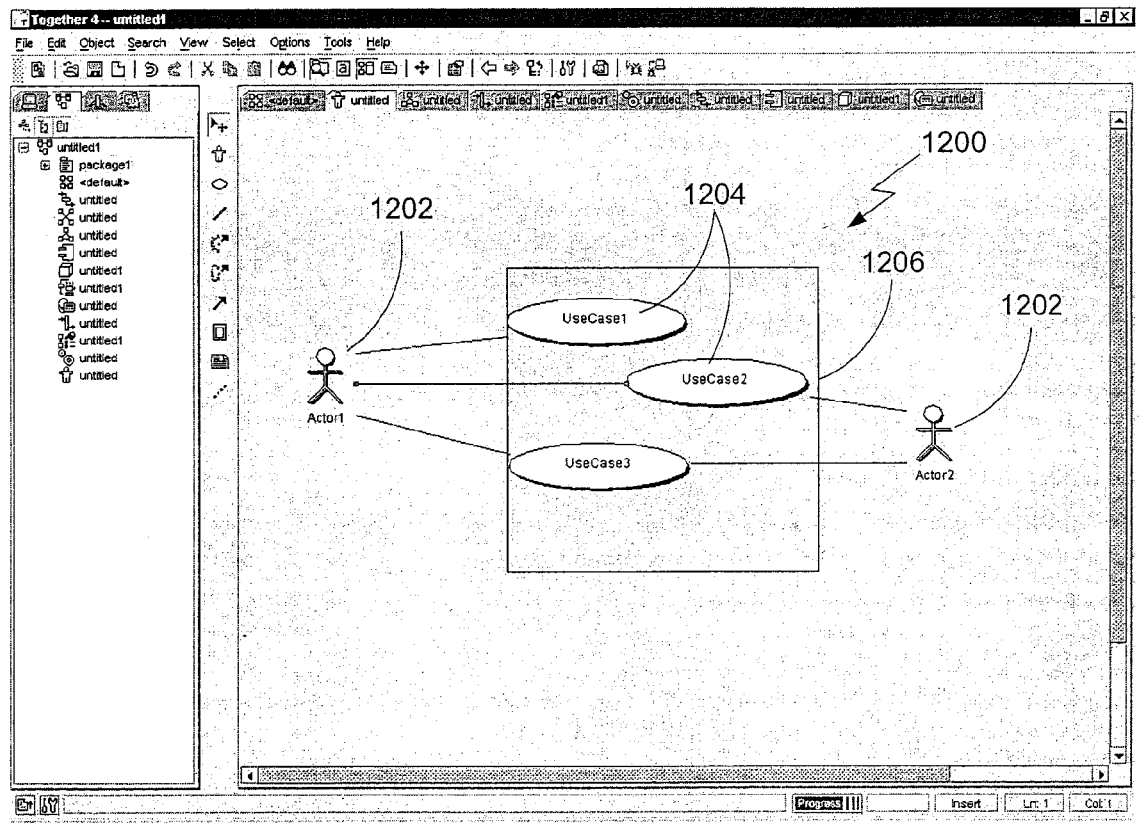
FIG. 12 depicts a user interface displayed by the software development tool depicted in FIG. 2, where the user interface displays a use case diagram of source code.
Figure 13:
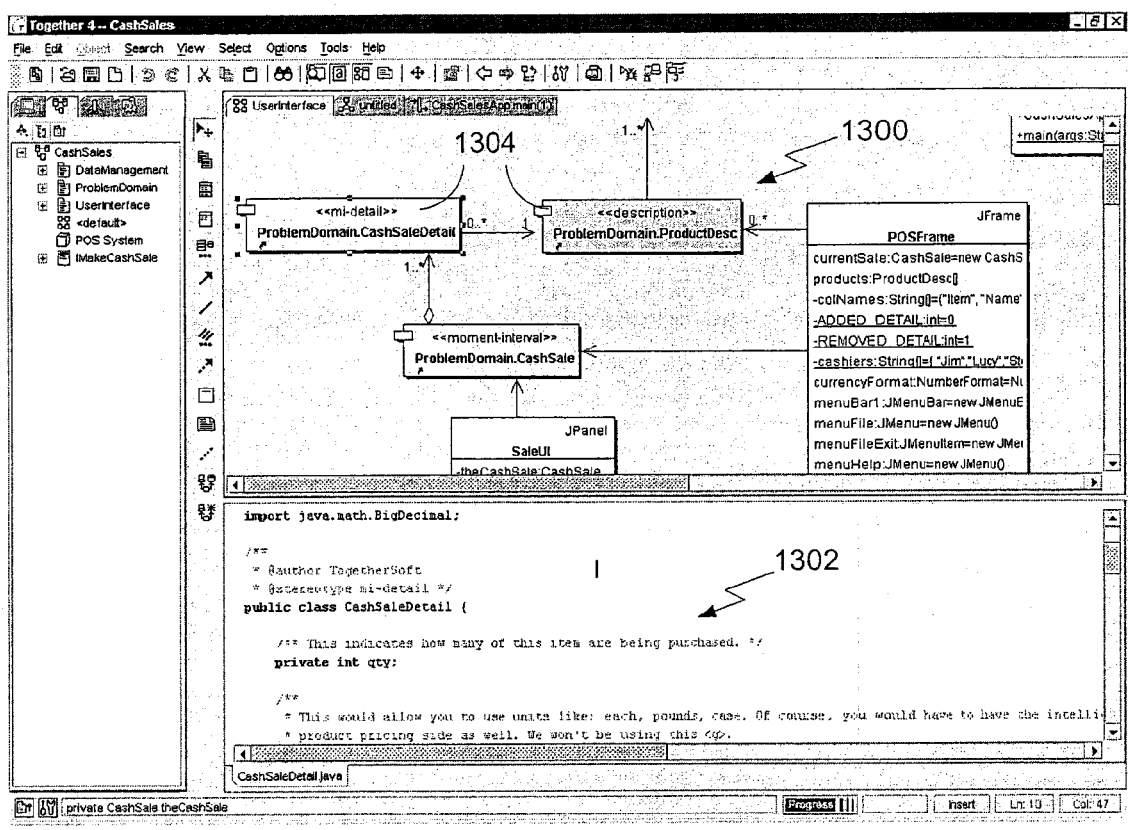
FIG. 13 depicts a user interface displayed by the software development tool depicted in FIG. 2, where the user interface displays both a class diagram and a textual view of source code.

Applications to be developed using the software development tool are collectively broken into three views of the application: the static view, the dynamic view, and the functional view. The static view is modeled using the use-case and class diagrams. A use case diagram 1200, depicted in FIG. 12, shows the relationship among actors 1202 and use cases 1204 within the system 1206. A class diagram 1300, depicted in FIG. 13 with its associated source code 1302, on the other hand, includes classes 1304, interfaces, packages and their relationships connected as a graph to each other and to their contents.

Figure 14:
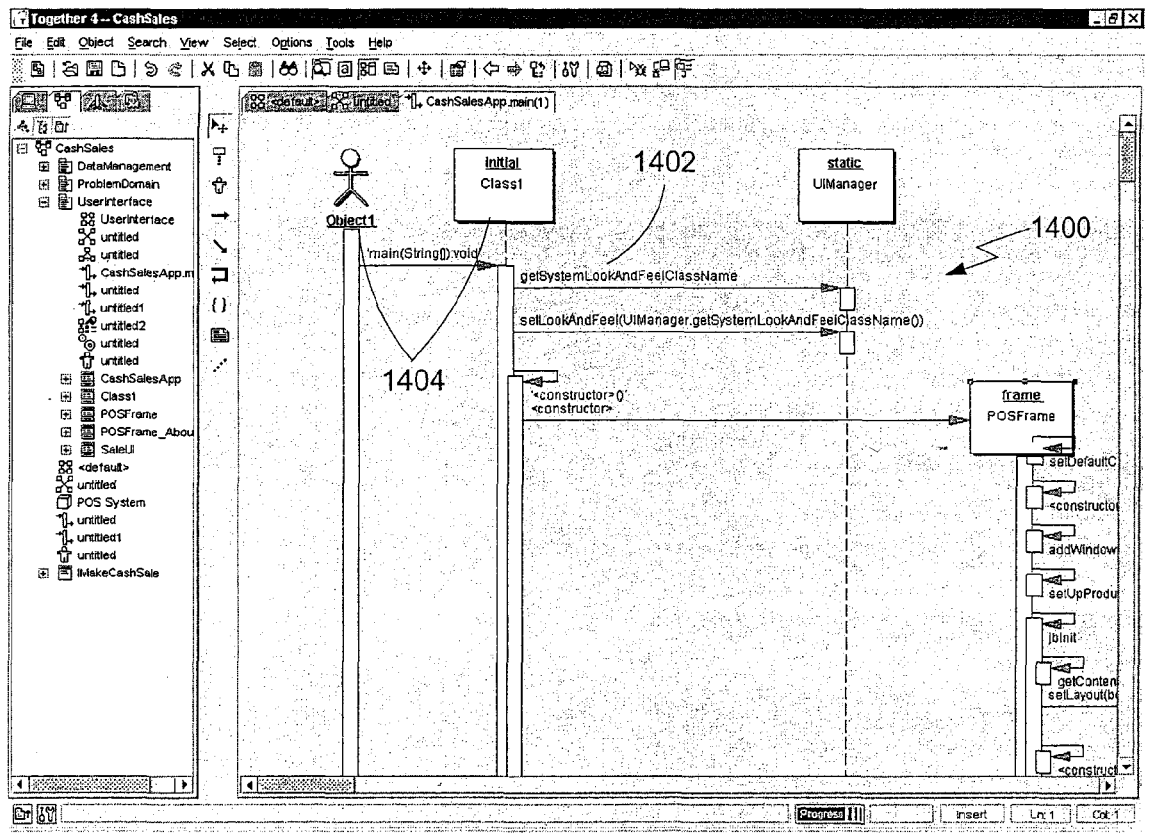
FIG. 14 depicts a user interface displayed by the software development tool depicted in FIG. 2, where the user interface displays a sequence diagram of source code.
Figure 15:
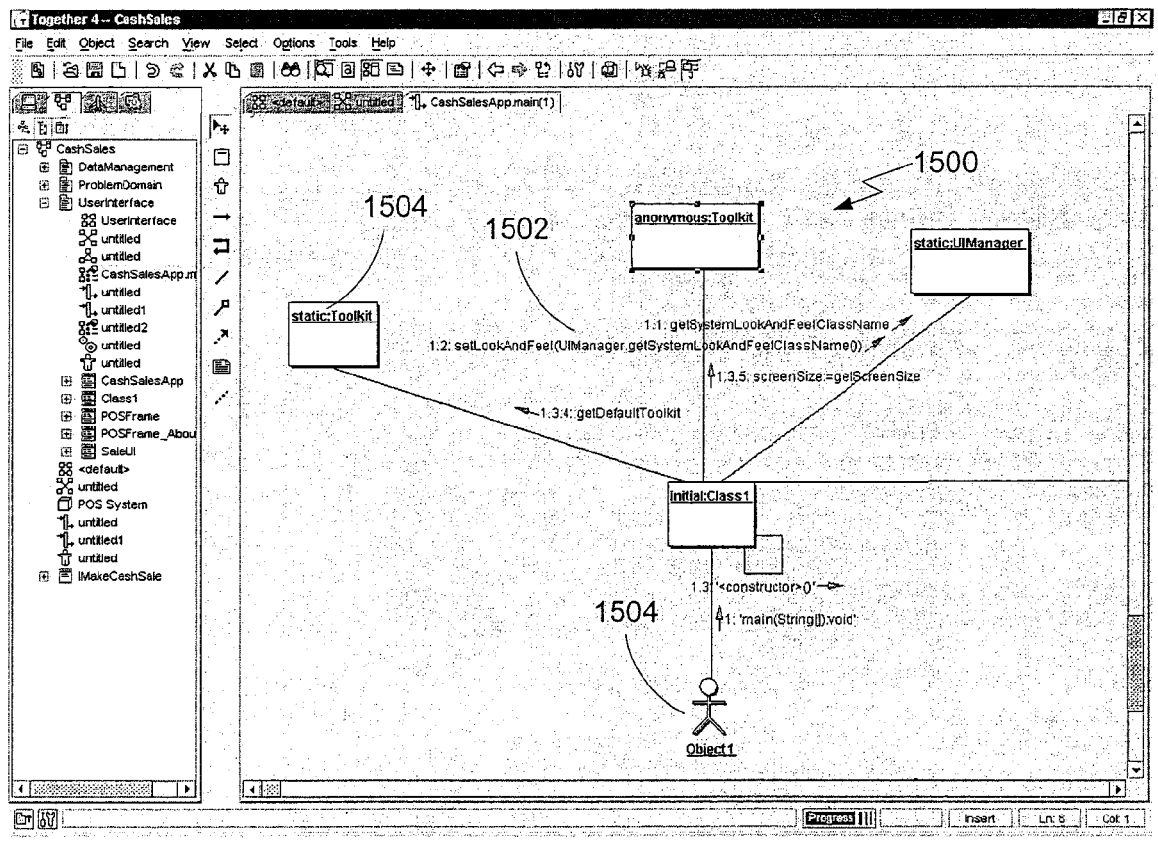
FIG. 15 depicts a user interface displayed by the software development tool depicted in FIG. 2, where the user interface displays a collaboration diagram of source code.

The dynamic view is modeled using the sequence, collaboration and statechart diagrams. As depicted in FIG. 14, a sequence diagram 1400 represents an interaction, which is a set of messages 1402 exchanged among objects 1404 within a collaboration to effect a desired operation or result. In a sequence diagram 1400, the vertical dimension represents time and the horizontal dimension represents different objects. A collaboration diagram 1500, depicted in FIG. 15, is also an interaction with messages 1502 exchanged among objects 1504, but it is also a collaboration, which is a set of objects 1504 related in a particular context. Contrary to sequence diagrams 1400 (FIG. 14), which emphasize the time ordering of messages along the vertical axis, collaboration diagrams 1500 (FIG. 15) emphasize the structural organization of objects.

Figure 16:
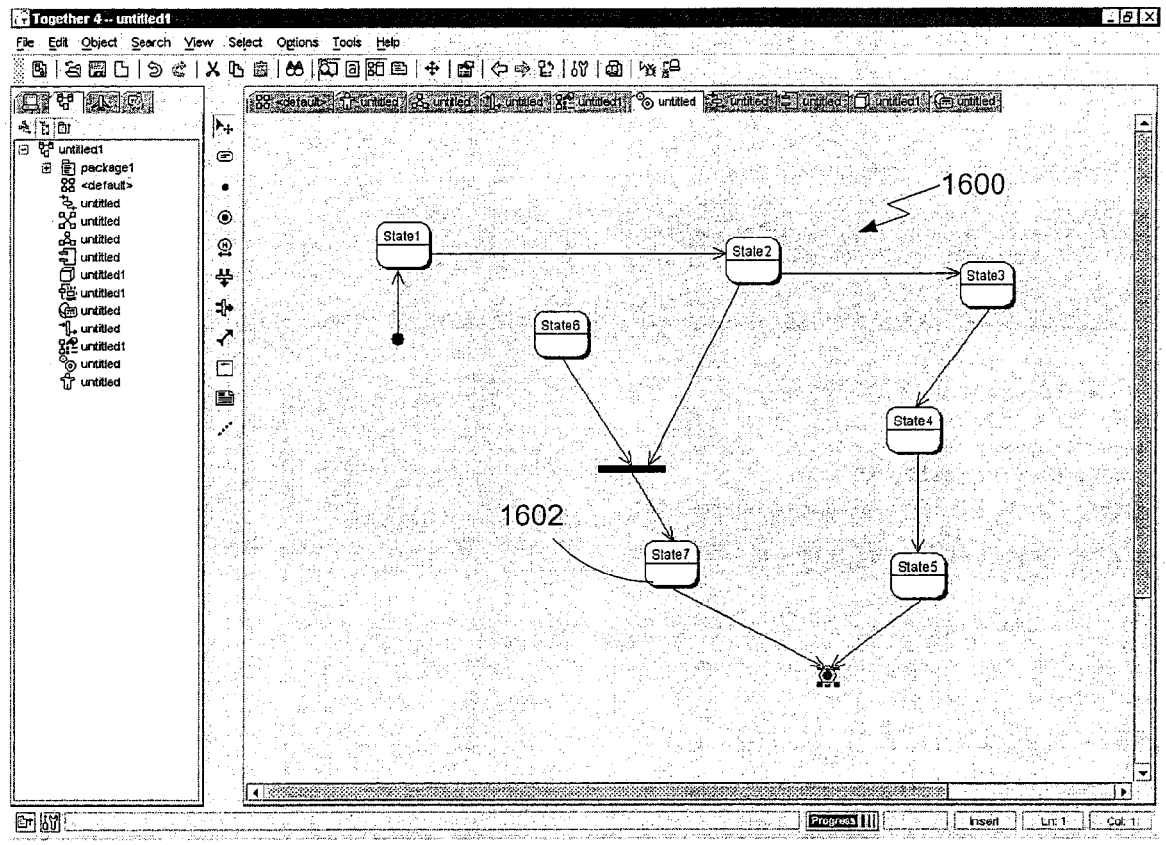
FIG. 16 depicts a user interface displayed by the software development tool depicted in FIG. 2, where the user interface displays a statechart diagram of source code.

A statechart diagram 1600 is depicted in FIG. 16. The statechart diagram 1600 includes the sequences of states 1602 that an object or interaction goes through during its life in response to stimuli, together with its responses and actions. It uses a graphic notation that shows states of an object, the events that cause a transition from one state to another, and the actions that result from the transition.

Figure 17:
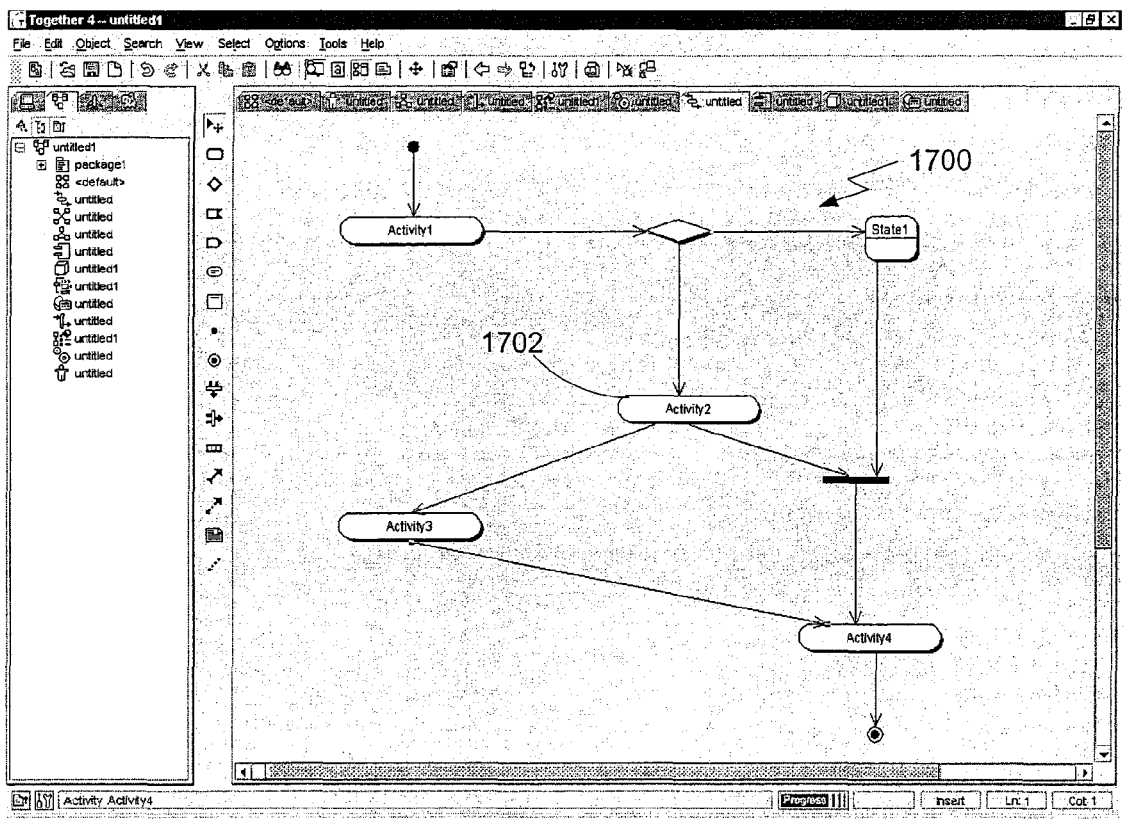
FIG. 17 depicts a user interface displayed by the software development tool depicted in FIG. 2, where the user interface displays an activity diagram of source code.

The functional view can be represented by activity diagrams 1700 and more traditional descriptive narratives such as pseudocode and minispecifications. An activity diagram 1700 is depicted in FIG. 17, and is a special case of a state diagram where most, if not all, of the states are action states 1702 and where most, if not all, of the transitions are triggered by completion of the actions in the source states. Activity diagrams 1700 are used in situations where all or most of the events represent the completion of internally generated actions.

Figure 18:
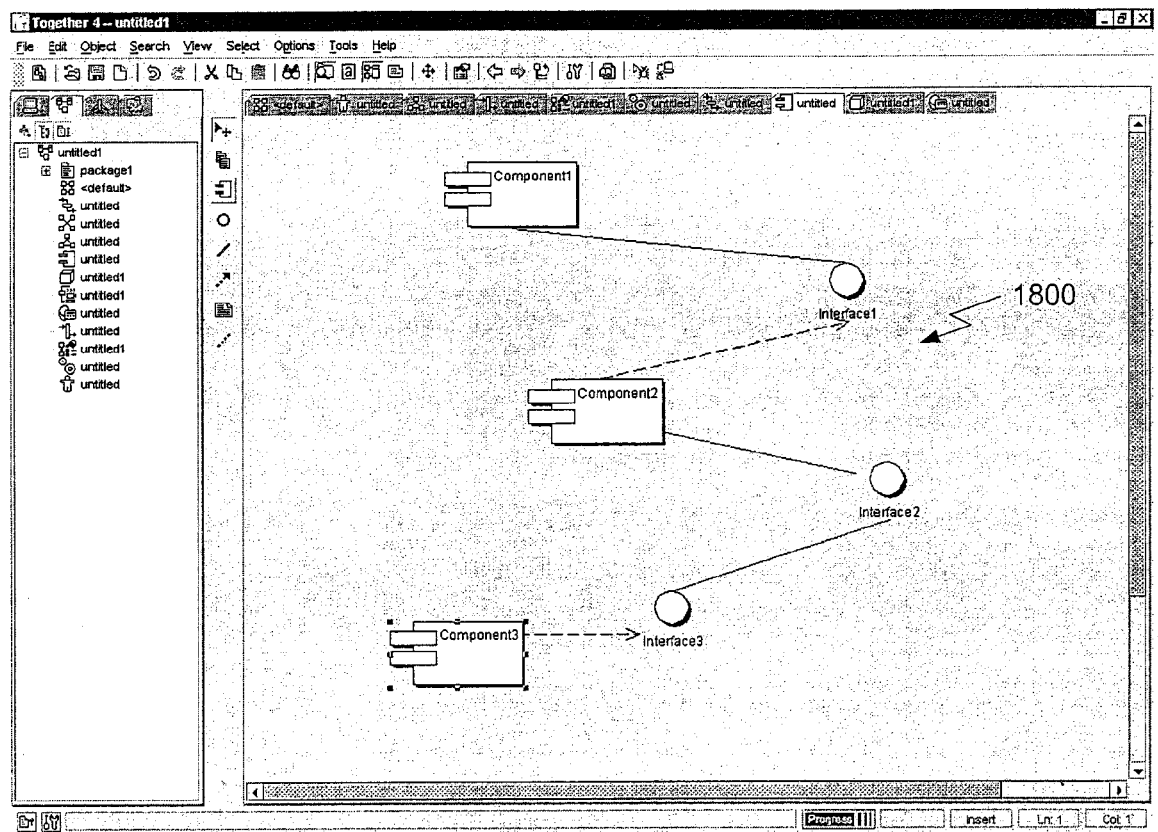
FIG. 18 depicts a user interface displayed by the software development tool depicted in FIG. 2, where the user interface displays a component diagram of source code.
Figure 19:
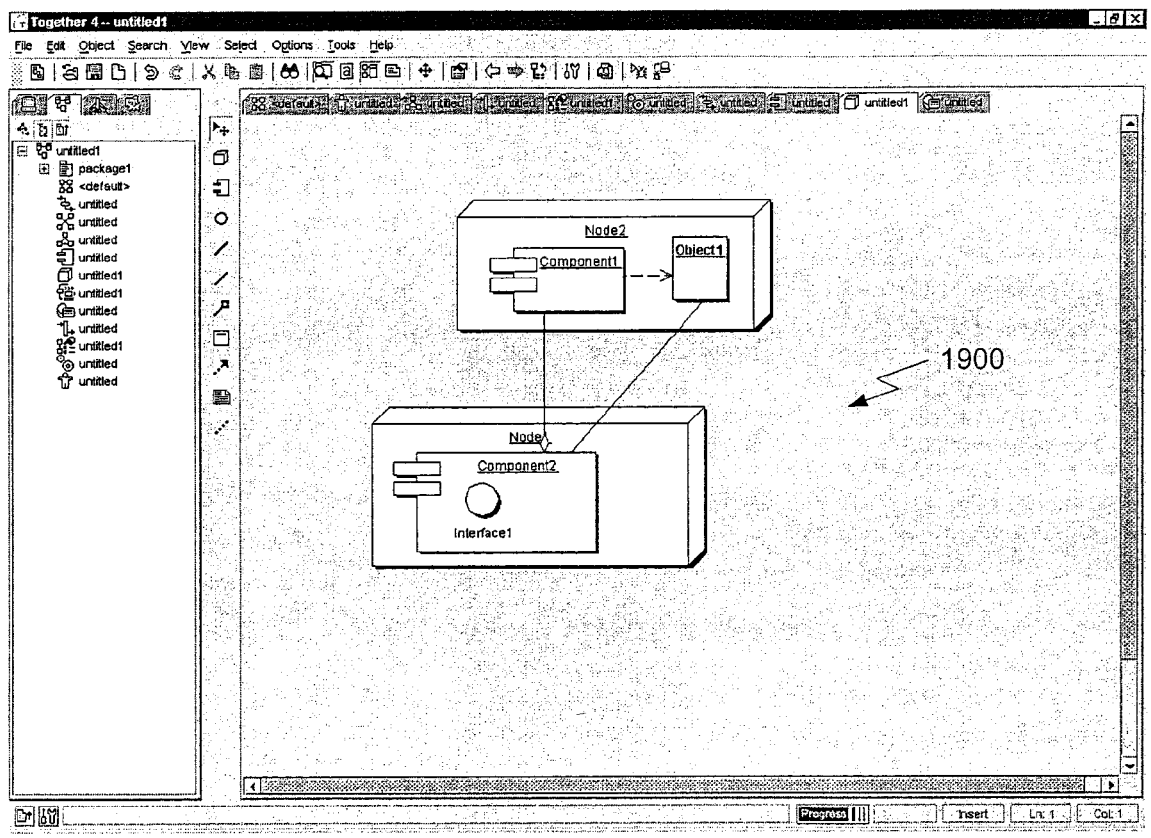
FIG. 19 depicts a user interface displayed by the software development tool depicted in FIG. 2, where the user interface displays a deployment diagram of source code.

There is also a fourth view mingled with the static view called the architectural view. This view is modeled using package, component and deployment diagrams. Package diagrams show packages of classes and the dependencies among them. Component diagrams 1800, depicted in FIG. 18, are graphical representations of a system or its component parts. Component diagrams 1800 show the dependencies among software components, including source code components, binary code components and executable components. As depicted in FIG. 19, deployment diagrams 1900 are used to show the distribution strategy for a distributed object system. Deployment diagrams 1900 show the configuration of run-time processing elements and the software components, processes and objects that live on them.

Although discussed in terms of class diagrams, one skilled in the art will recognize that the software development tool of the present invention may support these and other graphical views.

Supporting and Deploying a Distributed Computing Component

In addition to the functionality described above, the software development tool saves significant programming development time as well as costs for conventional tools by allowing a developer to generate, compile, assemble, deploy, and debug a distributed computing component, such as an EJB, without having to use multiple conventional tools. A distributed computing component is a software component that runs on a computer and is designed to perform business logic for client application(s) requiring a solution to a business problem (e.g., process a customer order or determine a senior citizen discount for a customer). The solution to the business problem typically requires access to corresponding business data contained in an enterprise database. By using the software development tool to support and deploy an EJB, a developer produces error-free code in a shorter amount of time as the risk of error is reduced by alleviating the need to switch from tool to tool during the development and deployment process of the EJB. In general, a deployed EJB is hosted in a special environment called an EJB container that resides on an application server of an organization. The deployed EJB provides remote services, such as access to business logic data, to clients distributed throughout a network in which the application server is connected. Business logic data represents the specific details and information flow of the organization or a particular industry. The software development tool allows a developer to focus on developing code for the EJB that utilizes the business logic data stored in the database of the organization, rather than worrying about endless amounts of programming and coding needed to connect all the working parts for accessing the database of the organization.

Figure 20:
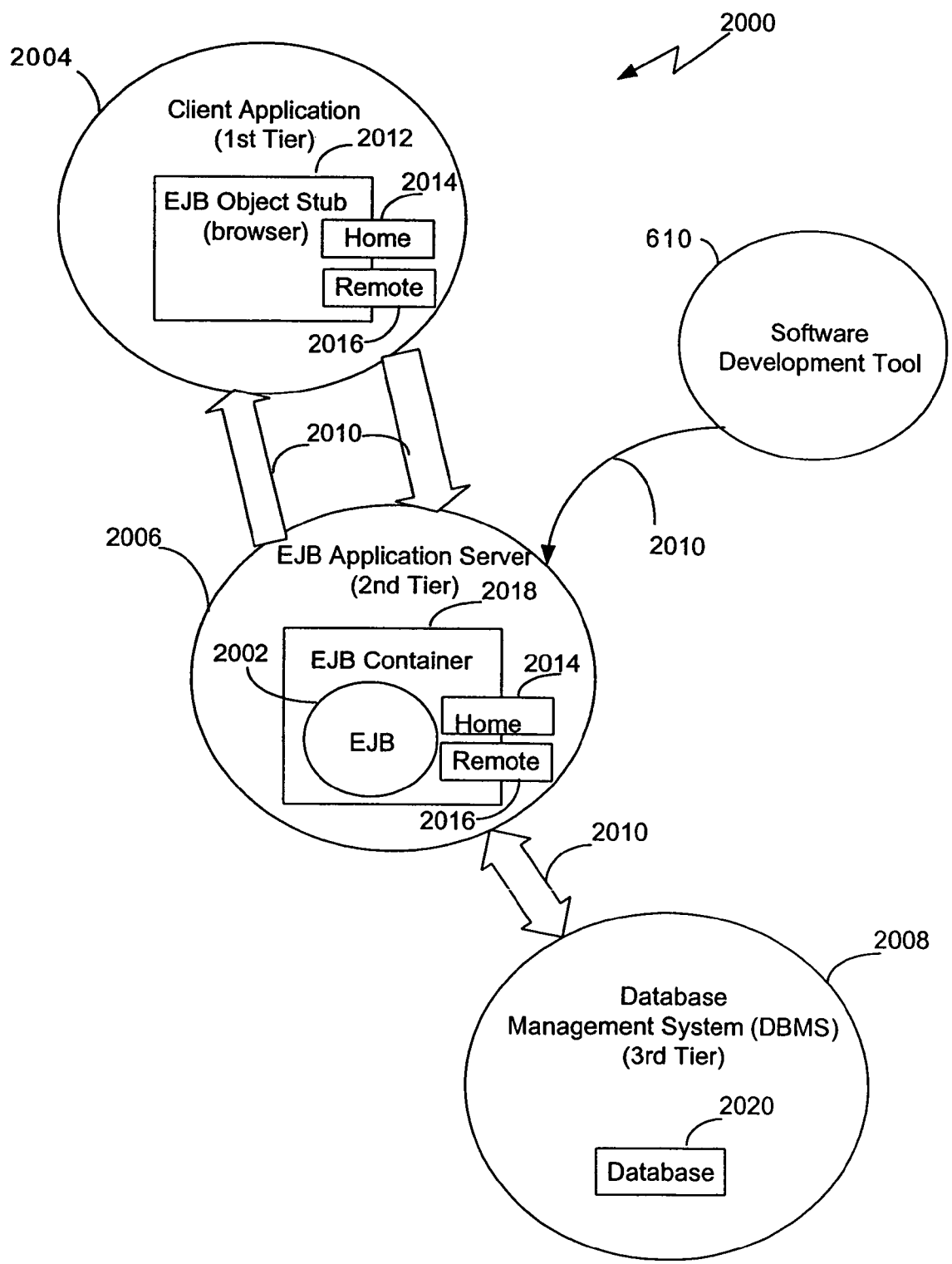
FIG. 20 depicts an overview of a three-tiered client/server system that illustrates the architecture and operation of an Enterprise JavaBean™ deployed by the software development tool in FIG. 2.

FIG. 20 depicts an overview of a three-tiered client/server system 2000 that illustrates the architecture and operation of an EJB 2002 deployed by the software development tool 610 in accordance with methods and systems consistent with the present invention. The EJB 2002 that is deployed by the software development tool may be an EJB EntityBean, an EJB SessionBean, or other similar deployable entity, such as a message Bean. An EJB EntityBean represents a real-world object, such as a customer, a bank account, or a cruise ship, which has persistent records (i.e., data structures) in a database. An EJB SessionBean represents a set of processes or tasks, which are performed on behalf of a client application, such as $1^{st}$ Tier Client Application 2004 described below. The EJB SessionBean may use other beans to perform a task or access a database directly. The EJB EntityBean and the EJB SessionBean each include a bean implementation class, a remote interface, and a home interface. The EJB EntityBean also includes a Primary Key class that provides a pointer to a data structure in a database for identifying the EJB EntityBean with the data structure. The home interface of the EJB EntityBean and the home interface of the EJB SessionBean each include a group of life-cycle methods signatures contained in the respective bean implementation class of the EJB EntityBean and the EJB SessionBean. The life-cycle methods contained in the EJB EntityBean or the EJB SessionBean may include a method to create and initialize an instance of the respective bean implementation class, a method to destroy an instance of the respective bean implementation class when it is no longer needed, and a method to find and identify the respective bean implementation class an example of which is an EJB. The remote interface of the EJB EntityBean and the remote interface of the EJB SessionBean may each include a signature of a business method of the respective bean implementation class. The methods associated with the home and remote interface of the respective bean implementation class are further discussed below.

Continuing with FIG. 20, the three-tiered client/server system 2000 is comprised of the $1^{st}$ tier Client Application 2004, a $2^{nd}$ tier EJB Application Server 2006, and a $3^{rd}$ tier Database Management System (DBMS) Server 2008. The Client Application 2004 may be any standalone application, servlet, applet, or even other EJBs. As shown in FIG. 20, the Client Application 2004 includes a browser 2012 that invokes methods through a home interface 2014 that contains signatures for the life cycle methods of the EJB 2002. The browser 2012 also invokes methods through a remote interface 2016 that includes signatures for the business methods of the EJB 2002.

The EJB Application Server 2006 may be any known application server, such as BEA Weblogic Server or IBM Websphere Server that complies with Sun's Java™ 2 Enterprise Edition (J2EE) specification which ensures a consistent platform for deploying an EJB by requiring that a specific set of communication protocols and standard services be provided by the EJB Application Server 2006. The EJB Application Server 2006 includes an EJB container 2018 that hosts and manages the deployed EJB 2002. The EJB container 2018 implements the home interface 2014 and the remote interface 2016 that contain the method signatures of the EJB 2002. The EJB container 2018 isolates the EJB 2002 from direct access by the Client Application 2004. When the Client Application 2004 invokes a life cycle method (i.e., a create method) or a business method on the EJB 2002, home interface 2014 or remote interface 2016, respectively, communicates the invocation to the EJB container 2018 through known protocols on network 2010. When the Client Application 2004 invokes a create method (i.e., a life cycle method), the EJB container 2018 intercepts the invocation and instantiates the EJB 2002 to form a distributed object of the EJB 2002 that is responsive to business method invocations via remote interface 2016. When the Client Application 2004 invokes a business method, the EJB container 2018 intercepts the invocation before passing it to the object of the EJB 2002 to ensure persistence, transactions, and security are applied properly to every operation the Client Application performs on the object of the EJB 2002. The EJB container 2018 manages security, transactions, and persistence automatically for EJB 2002, so a developer doesn't have to use the software development tool to write this type of logic into the code corresponding to EJB 2002.

The Database Management System (DBMS) Server 2008 may be any known DBMS, such as Oracle 7.3x/8x DBMS, ODBC/Access 97, Cloudscape, ODBC/MS SQL Server, or IBM DB2 6.1. The DBMS Server 2008 manages a known relational database 2020 that contains the business data structures of the organization that an EJB EntityBean represents (e.g., customers, bank accounts, or hotel rooms) or that an EJB SessionBean may access to complete a transaction (e.g., BankTeller SessionBean may perform Processloan( ) method or HotelClerk SessionBean may perform Reserveroom( ) method). Thus, the Client Application 2004 can invoke business methods remotely to access desired business logic data in the database 2020 or perform a desired task that uses business logic data in the database 2020 via EJB 2002. Enterprise JavaBeans™ are more clearly described in the following references, which are incorporated herein by reference:

(1) Richard Monson-Haefel, *Enterprise JavaBeans™ 2$^{nd}$ Edition*, O'Reilly & Associates (2000);

(2) David Flanagan, et al., *Java Enterprise in a Nutshell 2$^{nd}$ Edition*, O'Reilly & Associates (1999);

(3) Ed Rowan, Mastering Enterprise JavaBeans and the Java 2 Platform, Enterprise Edition, John Wiley & Sons (1999); and (4) Sun Microsystems' Enterprise JavaBeans.™. Specifications v1.0, v1.1, and V2.0.

Figure 21:
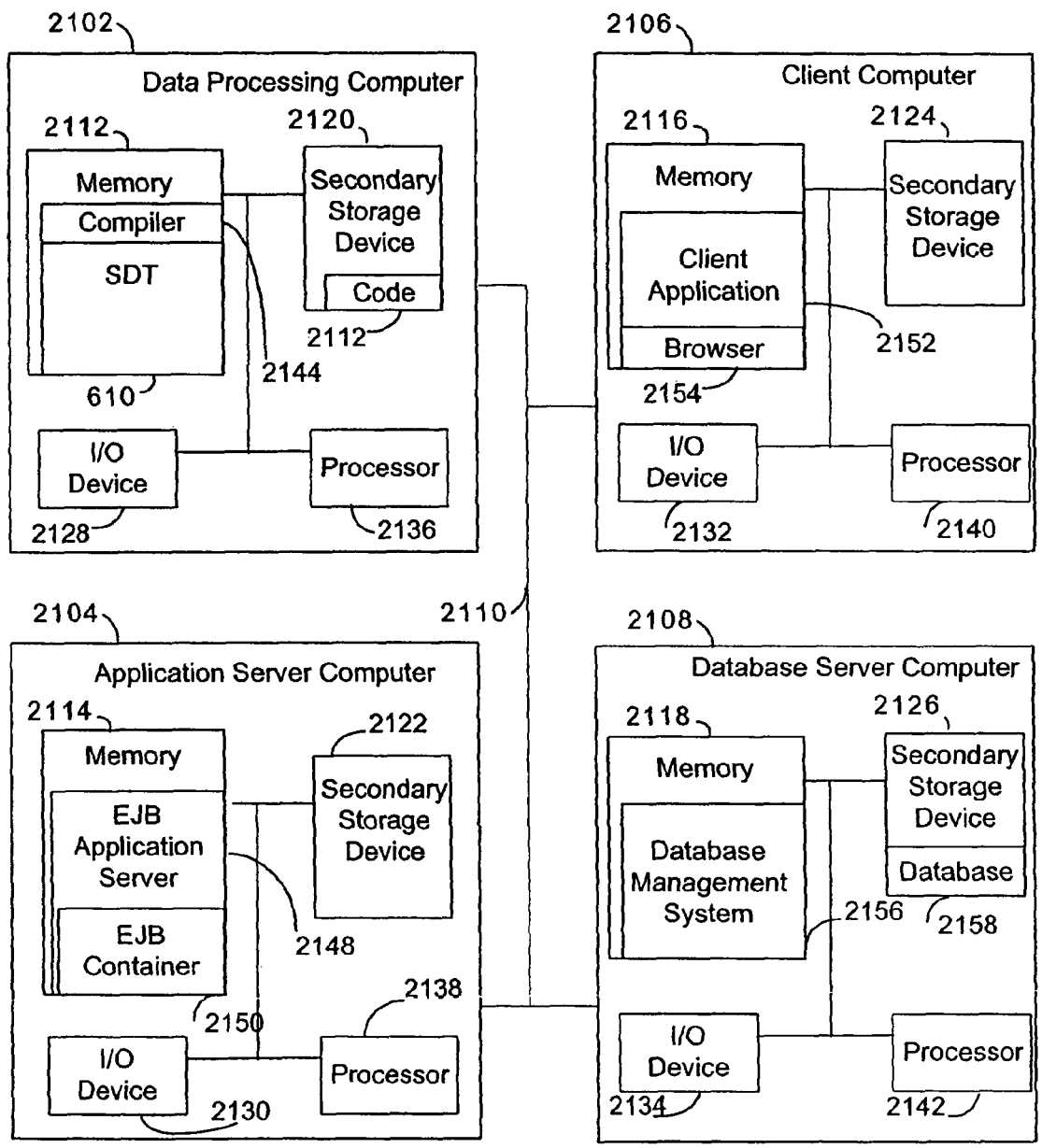
FIG. 21 depicts a block diagram of a data processing system suitable for practicing methods and systems consistent with the present invention.

FIG. 21 depicts a data processing system suitable for practicing methods and systems consistent with the present invention, including supporting and deploying an EJB. Data processing system 2100 includes a group of computers 2102, 2104, 2106, and 2108 that are connected via network 2110. The network 2110 may be any known physical or wireless network capable of supporting a data transmission between two computer systems, such as a Local Area Network (LAN), a Wide Area Network (WAN), Internet, or leased phone lines.

Each computer 2102, 2104, 2106, and 2108 includes a memory (2112, 2114, 2116 and 2118, respectively), a secondary storage device (2120, 2122, 2124 and 2126, respectively), an I/O device (2128, 2130, 2132 and 2134, respectively), and a processor (2136, 2138, 2140 and 2142, respectively). Memory 2112 in computer 2102 includes 610 improved software development tool (SDT) that is capable of supporting and deploying an EJB. Memory 2112 in computer 2102 also includes a compiler 2144, such as Java Development Kit (JDK) v1.2 or later, which the software development tool uses to compile an EJB in the development and deployment processing described below. The Compiler 2144 may reside in secondary storage device 2120 in computer 2102 until prompted by the software development tool to compile the EJB as described below. In another implementation, the compiler 2144 may reside in secondary storage of another computer, such as secondary storage device 2122, 2124, or 2126 on computers 2104, 2106, or 2108, respectively. In this implementation, the software development tool may access the compiler via network 2110.

Memory 2114 in computer 2104 includes an EJB Application Server 2148 that generates the EJB container 2150 in memory 2114 when started by the software development tool or when manually started by a developer. Memory 2116 in computer 2106 includes a Client Application 2152 and a browser 2154 that are used to test an EJB deployed by the software development tool. Memory 2118 in computer 2108 includes a Database Management System 2156. Secondary storage device 2126 includes a database 2158 that is managed by the Database Management System Server 2156. Database 2158 stores business logic data that is accessible by an EJB deployed by the software development tool. As known to one skilled in the art, EJB Application Server 2148, Client Application 2152, and Database Management System Server 2156 may be hosted locally with the software development tool on memory 2112 in computer 2102 so that the software development tool may deploy and test an EJB from the same computer. When the software development tool deploys and tests an EJB, the data processing system 2100 may function as described above for a three-tiered client/server system 2000.

Generating An Enterprise JavaBean™

Figure 22A:
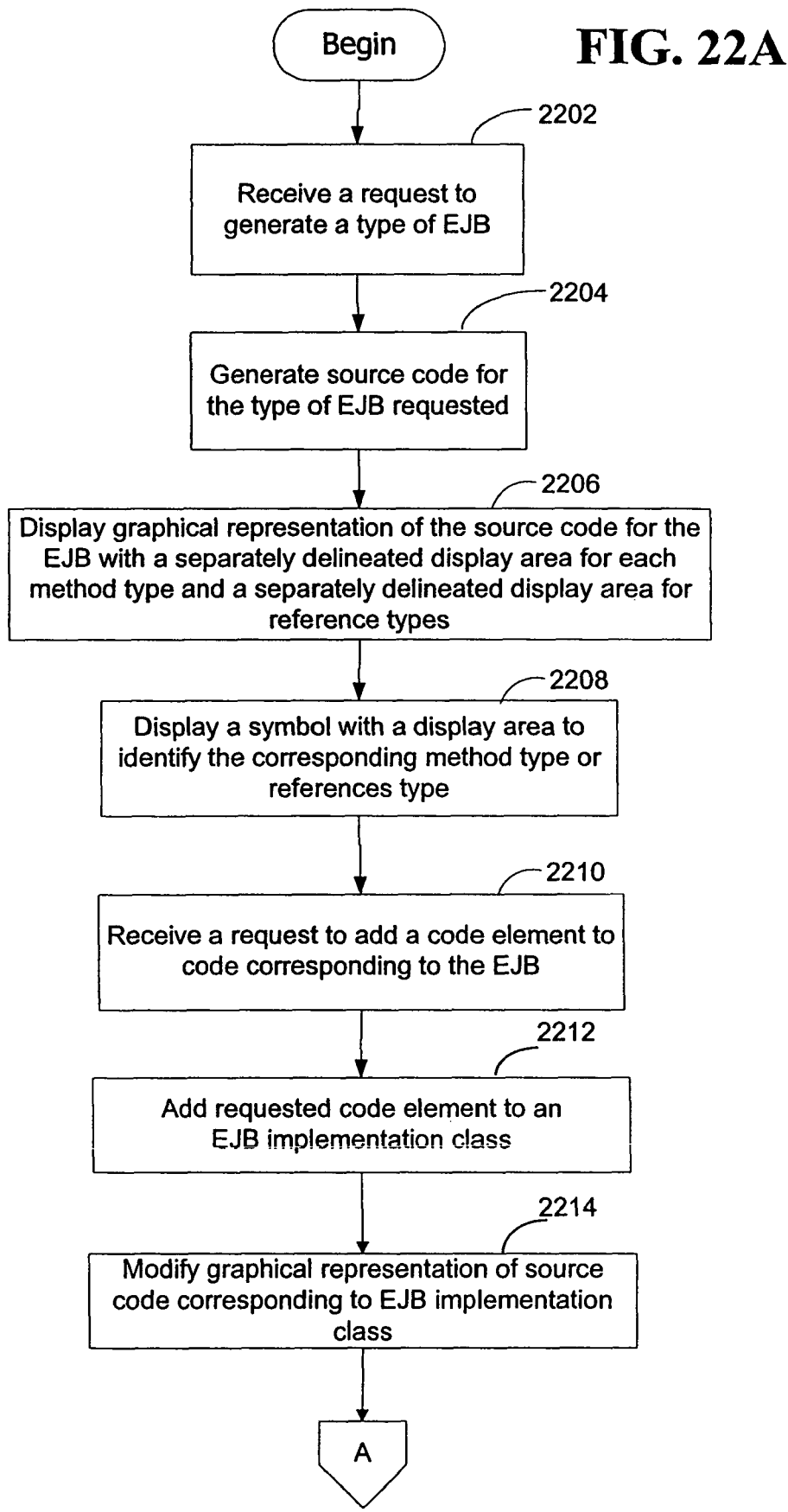
Figure 23:
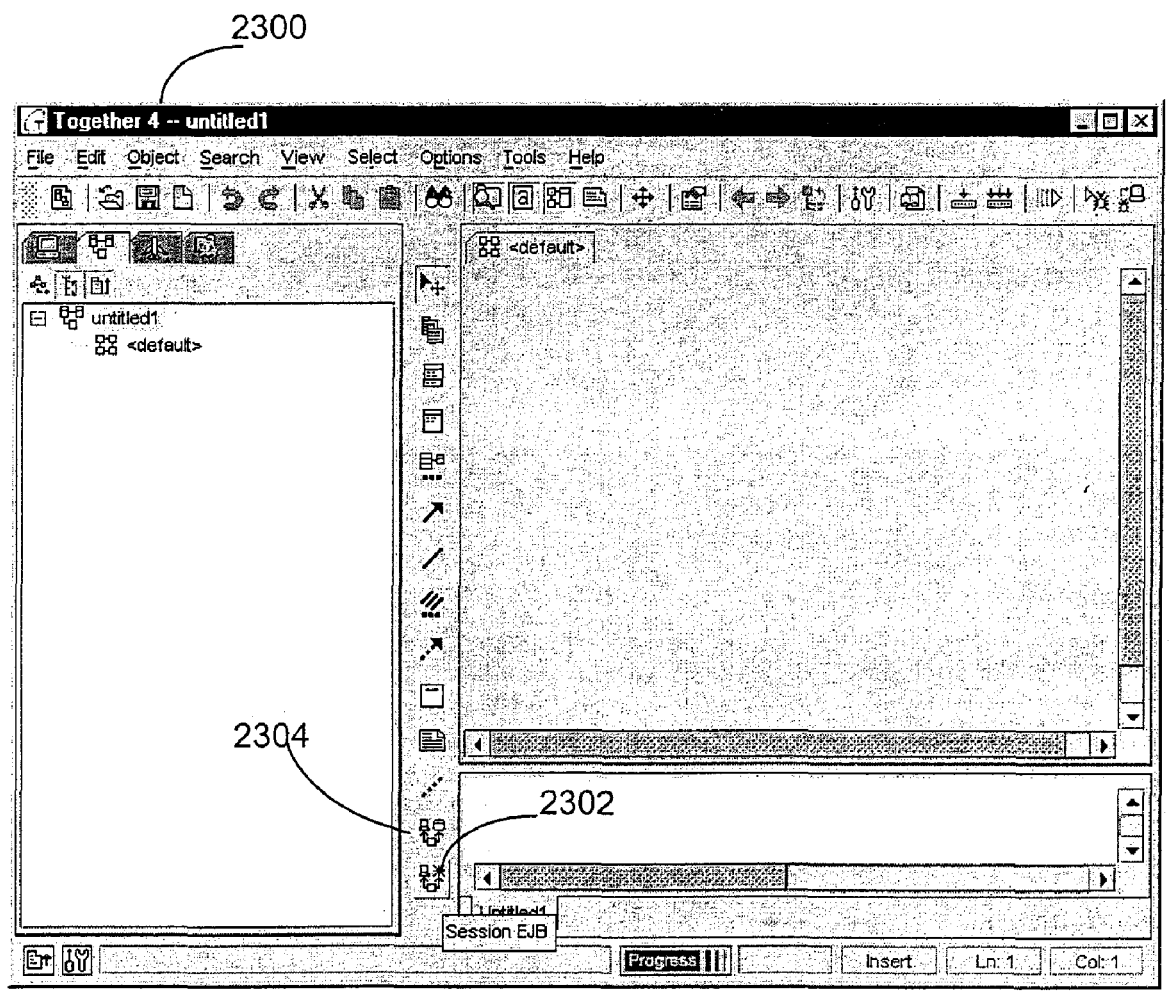
FIG. 23 depicts an exemplary user interface displayed by the software development tool in FIG. 2, where the user interface shows a request received by the software development tool to generate a type of Enterprise JavaBean™.

The software development tool provides the programmer with a segregated grouping and view of methods that define the behavior of an EJB, where the programmer is able to easily identify a method in an EJB implementation class to a respective method signature in either an EJB Home Interface or an EJB Remote Interface that corresponds to the EJB implementation class as explained below. FIGS. 22A and 22B depict a flowchart illustrating an exemplary process performed by the software development tool 610 for generating an EJB. The software development tool initially receives a request to generate a type of EJB (step 2202). The type of EJB may be an EntityBean, a SessionBean, or any other similar distributed computing component. As shown in FIG. 23, the request is received by the software development tool via the actuation of a button 2302 that corresponds to the type of EJB. In the implementation shown in FIG. 23, the actuation of button 2302 indicates the request to generate a SessionBean, and the actuation of button 2304 indicates the request to generate an EntityBean. A developer, however, may use any known data input technique, such as a pull-down menu selection or a keyboard input, to indicate the request to the software development tool.

Next, the software development tool generates source code for the requested type of EJB (step 2204). To generate source code for the requested type of EJB, the software development tool performs the process in FIG. 9 to create a group of EJB source code files in the project for the requested type of EJB. If the requested type of EJB is an EJB EntityBean, the software development tool generates an EJB EntityBean Implementation Class 2401 like the one graphically depicted in FIG. 24 as 2402 by parsing an EntityBean Implementation Class template to add EJB EntityBean code to an EJB source code file. The EJB EntityBean code added by the software development tool includes state-management callback methods (depicted graphically as 2404) that are invoked by the container 2150 to notify the EJB EntityBean when certain events are to occur on the EJB Application Server 2148. For example, setEntityContext( )(depicted graphically as 2406) provides the EJB EntityBean with an interface to the EJB Application Server 2148 so the EJB EntityBean is able to get information about itself or its surrounding environment.

State-management callback methods are described in the Sun Microsystems' EJB Specification previously incorporated herein by reference.

If the requested type of EJB is an EJB EntityBean, the software development tool also generates an EJB EntityBean Primary Key class (graphically depicted as 2408) by parsing an EntityBean Primary Key Class template to add EJB Primary Key code to another EJB source code file. The EJB Primary Key code contains method constructs, such as "Entity1PK( )," "equal( )" and "hashcode( )" (graphically depicted as 2410, 2414, and 2412, respectively) to identify the EJB EntityBean with a pointer to a table in the database 2158. The software development tool also adds a Primary Key attribute, "field1" (graphically depicted as 2416), to both the EJB EntityBean Implementation class 2602 and the EJB EntityBean Primary Key class 2408 to be used as a primary key index into the table in the database 2158.

In addition, if the requested type of EJB is an EJB EntityBean, the software development tool also generates an EJB Home Interface (graphically depicted as 2418) and an EJB Remote Interface (graphically depicted as 2420) for the EJB EntityBean Implementation Class 2402. To generate the EJB Home Interface and the EJB Remote Interface, the software development tool parses a Home Interface template to add Home Interface code to another source code file, and parses a Remote Interface template to add Remote Interface code to another source code file. The software development tool also adds signatures for life cycle methods contained in the EJB EntityBean Implementation Class 2402 to the code corresponding to the EJB Home Interface 2418, such as signatures for create or find methods. The software development tool also adds signatures for business methods contained in the EJB EntityBean Implementation Class 2402 to the code corresponding to the EJB Remote Interface 2420.

If the requested type of EJB is an EJB SessionBean, the software development tool generates an EJB SessionBean Implementation Class (graphically depicted as 2430), a corresponding EJB Home Interface (graphically depicted as 2432), and a corresponding EJB Remote Interface (2434) by parsing one of a group of associated templates in the same manner as described for the EJB EntityBean Implementation Class 2402 above. The software development tool also adds signatures for life cycle methods contained in the EJB SessionBean Implementation Class 2430 to the code corresponding to the EJB Home Interface 2432, such as a signature for create method. The software development tool also adds signatures for business methods contained in the EJB SessionBean Implementation Class 2430 to the code corresponding to the EJB Remote Interface 2434.

As shown in FIG. 22A, the software development tool then displays a graphical representation of the source code for the EJB with a separately delineated display area for a method type and a separately delineated display area for reference types (step 2206). In one implementation shown in FIG. 24, to display a graphical representation of the source code for the EJB, the software development tool displays a graphical representation of code corresponding to EJB EntityBean 2401 (depicted in diagram 2402), a graphical representation of code corresponding to EJB Primary Key Class (depicted in diagram 2408), a graphical representation of code corresponding to EJB Home Interface (depicted in diagram 2418), and a graphical representation of code corresponding to EJB Remote Interface (depicted in diagram 2420). The EntityBean diagram 2402 has a first display area 2405 for create method types, a second display 2407 for finder method types, and a third display area 2409 for business method types. Because there are no business methods in the code corresponding to EJB EntityBean 2401, the software development tool displays nothing in the third display area 2409 in this example. In addition, the software development tool displays a separately delineated area 2411 for reference types, such as an EJB Environment Reference, an EJB Reference, an EJB Security Role Reference, or an EJB Resource Reference, which are described below. The Home Interface diagram 2418 has a create method display area 2419 for signatures of the create method types displayed in the first display area. The Home Interface diagram 2418 also has a finder method display area 2421 for signatures of the finder method types displayed in the second display area. Remote Interface diagram 2420 has a business method display area 2423 for signatures of the business method types displayed in the third display area. In another implementation, the software development tool receives an EJB display filter indication (e.g., a system display filter previously defined by a developer) and in response displays the graphical representation of code corresponding to EJB EntityBean 2402 without displaying the second, third, or graphical representations of code corresponding to EJB Primary Key class, EJB Home Interface, and EJB Remote Interface, respectively.

Figure 24:
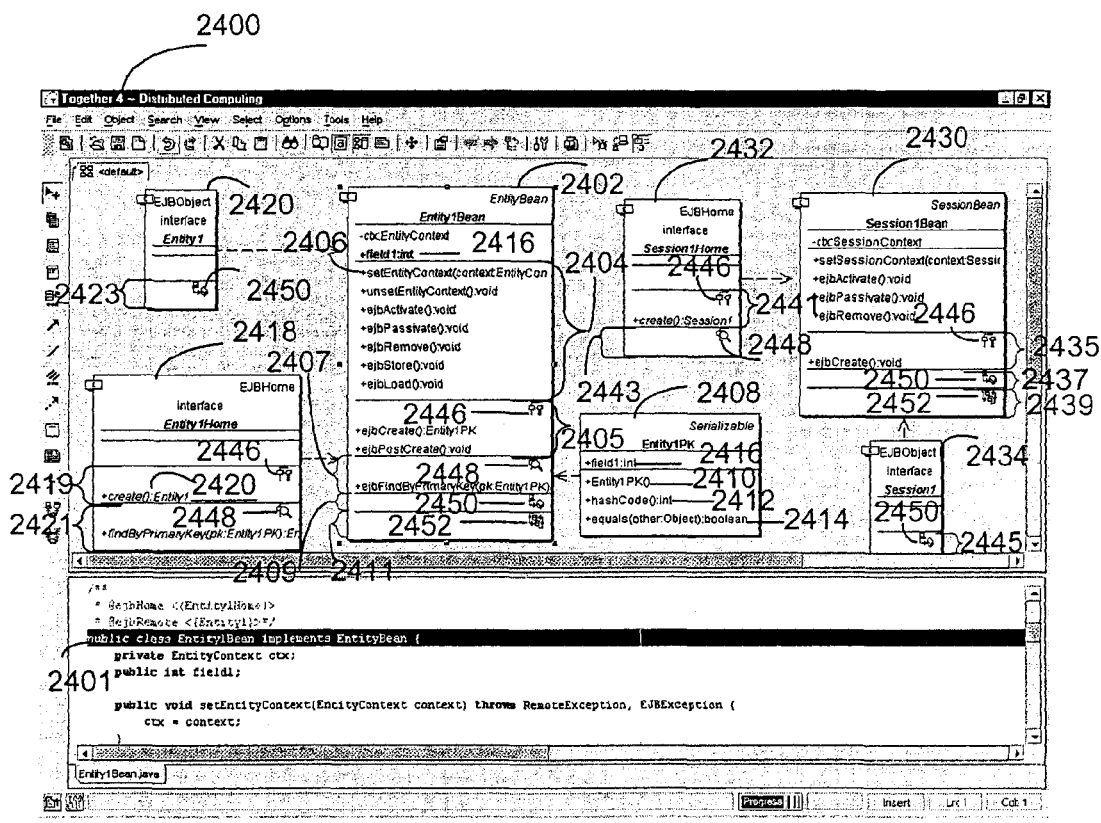
FIG. 24 depicts an exemplary user interface displayed by the software development tool in FIG. 2, where the user interface displays a related group of elements that comprise the EntityBean™ and another group of elements that comprise the SessionBean™.

In another implementation shown in FIG. 24, to display a graphical representation of the source code for the EJB, the software development tool displays a graphical representation of code corresponding to EJB SessionBean (depicted in diagram 2430), and a graphical representation of code corresponding to EJB Home Interface (depicted in diagram 2432), and a graphical representation of code corresponding to EJB Remote Interface (depicted in diagram 2434). The SessionBean diagram 2430 that has a first display area for create method types 2435, a second display area 2437 for business method types, and a separately delineated display area for reference types 2439. The Home Interface diagram 2432 has a create method display area 2441 for signatures of the create method types displayed in the first display area 2435, and has a finder method display area 2443 for signatures of the finder method types displayed in the second display area 2437. Remote Interface diagram 2434 has a business method display area 2445 for signatures of the business method types displayed in the third display area 2439.

The software development tool displays a symbol with a display area to identify the corresponding method type or reference type displayed therein (step 2208). For example, as shown in FIG. 24, the software development tool displays a create method symbol 2446 as one of the group of symbols to identify that create method types are displayed in the respective display area, such as the first display area 2405 of the EJB EntityBean 2402 and the create method display area 2419 of the EJB Home Interface 2418. The software development tool also displays a finder method symbol 2448 as a second of the group of symbols to identify that finder method types are displayed in the respective display area, such as the second display area 2407 of the EJB EntityBean 2402 and the finder method display area 2421 of the EJB Home Interface 2418. The software development tool also displays a business method symbol 2448 as a third of the group of symbols to identify that business method types are displayed in the respective display area, such as the third display area 2409 of the EJB EntityBean 2402 and the business method display area 2423 of the EJB Remote Interface 2420. Finally, the software development tool also displays a references symbol 2452 to identify that reference types needed by the EJB are displayed in the respective display area, such as the fourth display area 2411 of the EJB EntityBean 2402.

Figure 25:
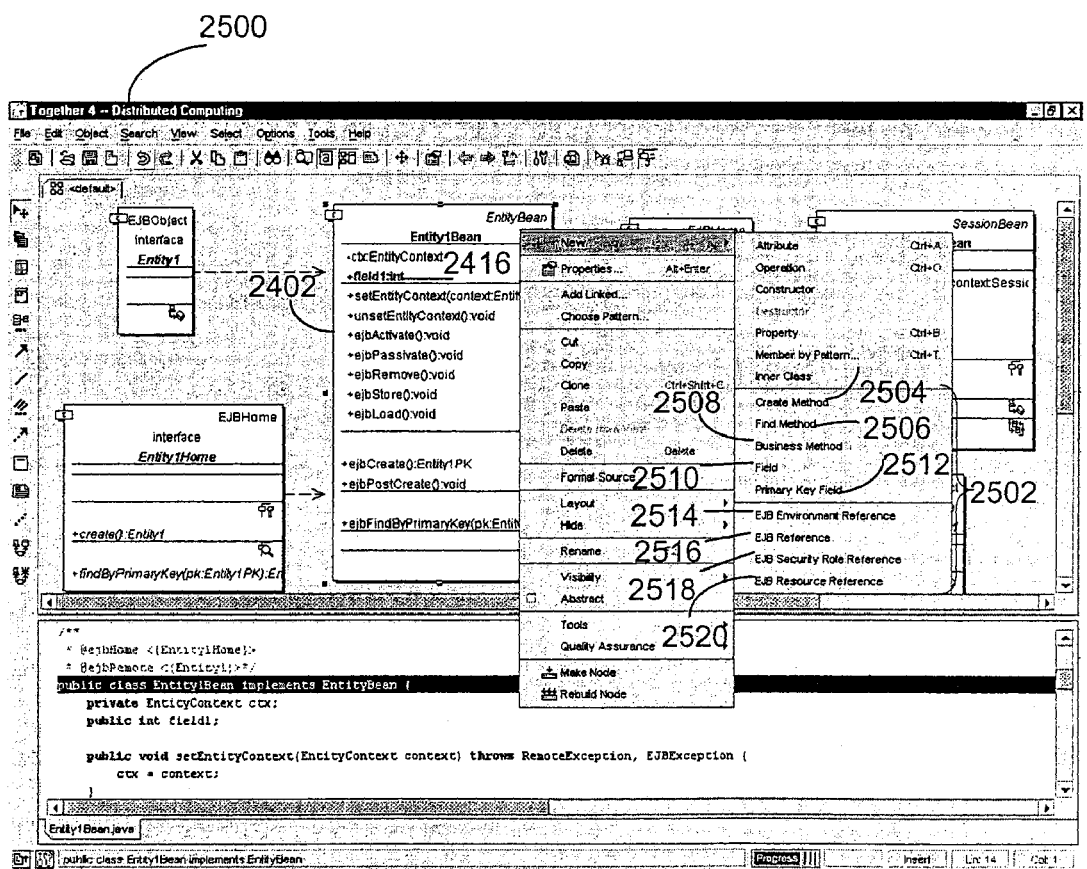
FIG. 25 depicts an exemplary user interface displayed by the software development tool in FIG. 2, where the user interface displays a list of code element types that the software development tool in FIG. 2 may generate for a selected EntityBean™.
Figure 26:
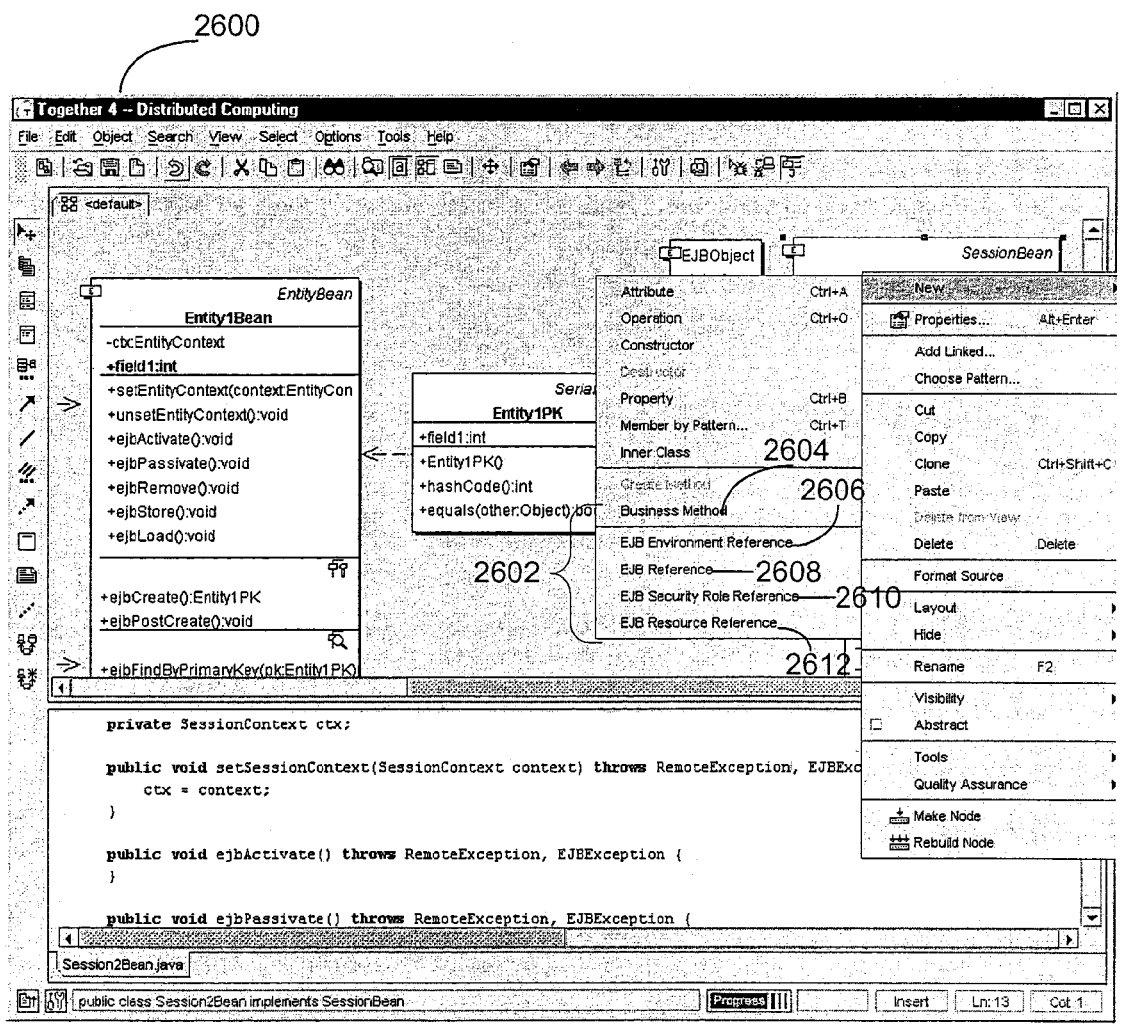
FIG. 26 depicts an exemplary user interface displayed by the software development tool in FIG. 2, where the user interface displays a list of code element types that the software development tool in FIG. 2 may generate for a selected SessionBean™.

After software development displays the symbol with the display area, the software development tool receives a request to add a code element to code then next corresponding to the EJB (step 2210). The programmer may request to add a business method to the EJB so that other business logic code can be written by the programmer for the newly added business method. FIG. 25 depicts an exemplary user interface 2500 displayed by the software development tool, where the user interface 2500 displays a list of code element types 2502 that the software development tool may generate for the selected EJB EntityBean 2402. Similarly, FIG. 26 depicts an exemplary user interface 2600 displayed by the software development tool, where the user interface 2600 displays a list of code element types 2602 that the software development tool may generate for die selected EJB SessionBean 2430. As shown in FIGS. 25 & 26, the software development tool may receive the request to add a code element to either the EJB EntityBean 2402 or the EJB SessionBean 2430 via a programmer selecting an option from the list of code element types displayed by the software development tool in a speed menu or pull down menu on user interface 2500 or 2600, respectively. As known to one skilled in the art, the programmer may indicate the request to the software development tool using any known data input technique associated with the I/O device 606.

When either the EJB EntityBean 2402 or the EJB SessionBean 2430 is selected, the list of code element types includes a business method type (e.g., 2508 or 2604), an EJB Environment Reference type (e.g., 2514 or 2606), an EJB Reference type (e.g., 2516 or 2608), an EJB Security Role Reference type (e.g., 2518 or 2610), or an EJB Resource Reference type (e.g., 2520 or 2612), which are described below. In addition, when the EJB EntityBean 2402 is selected, the list of code element types also includes a create method type 2504, a find method type 2506, a persistent field type 2510 that is to be mapped to a database table corresponding to the EJB EntityBean 2402, and another primary key field type 2512 that is to be used in combination with the primary key field (e.g., 2416) already in the code of the EJB EntityBean to uniquely identify the EJB EntityBean to a database table. For example, assuming that the EJB EntityBean represents a senior citizen, the name of the citizen and the age of the citizen may be two primary fields needed in combination to identify the EJB EntityBean to a corresponding table in the database.

Figure 27:
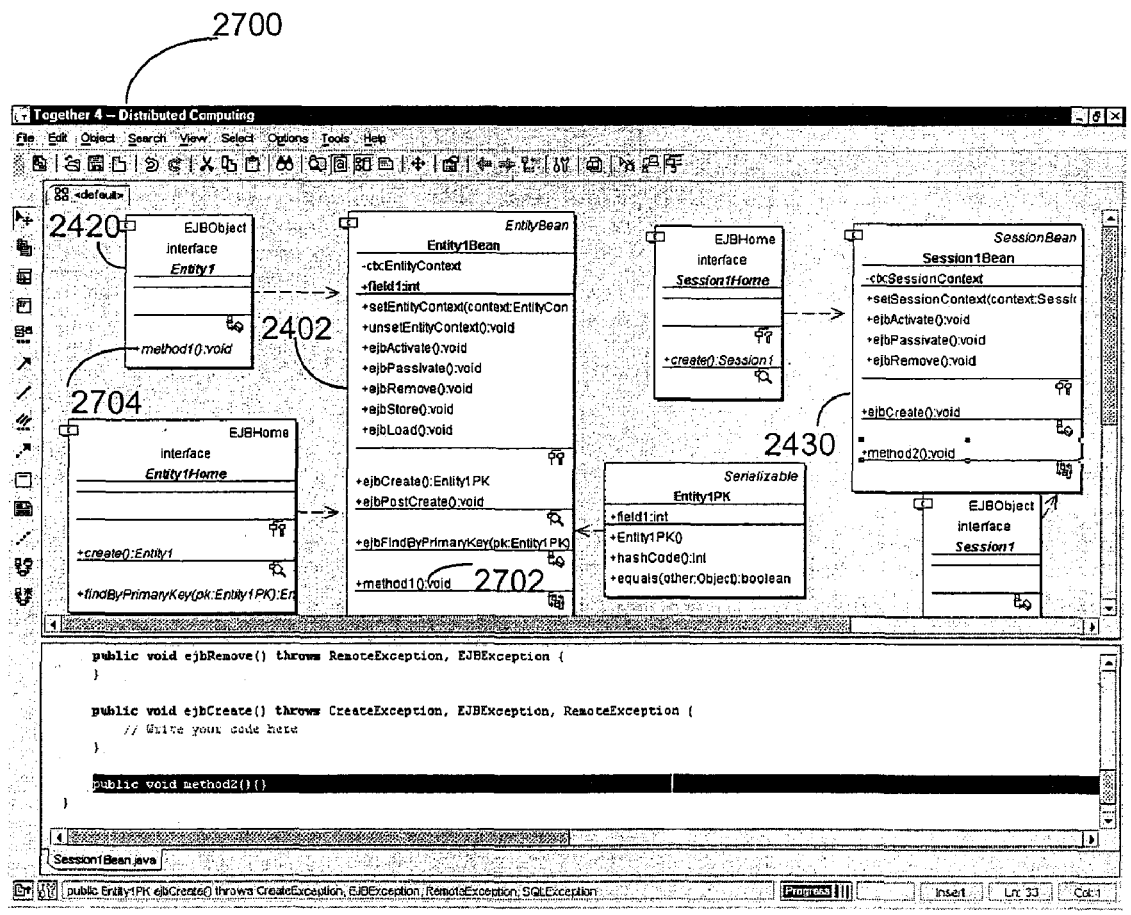
FIG. 27 depicts an exemplary user interface displayed by the software development tool in FIG. 2, where the exemplary user interface displays a code element for a business method added to the EntityBean™ and displays another code element for another business method added to the SessionBean™ by the software development tool.
Figure 28:
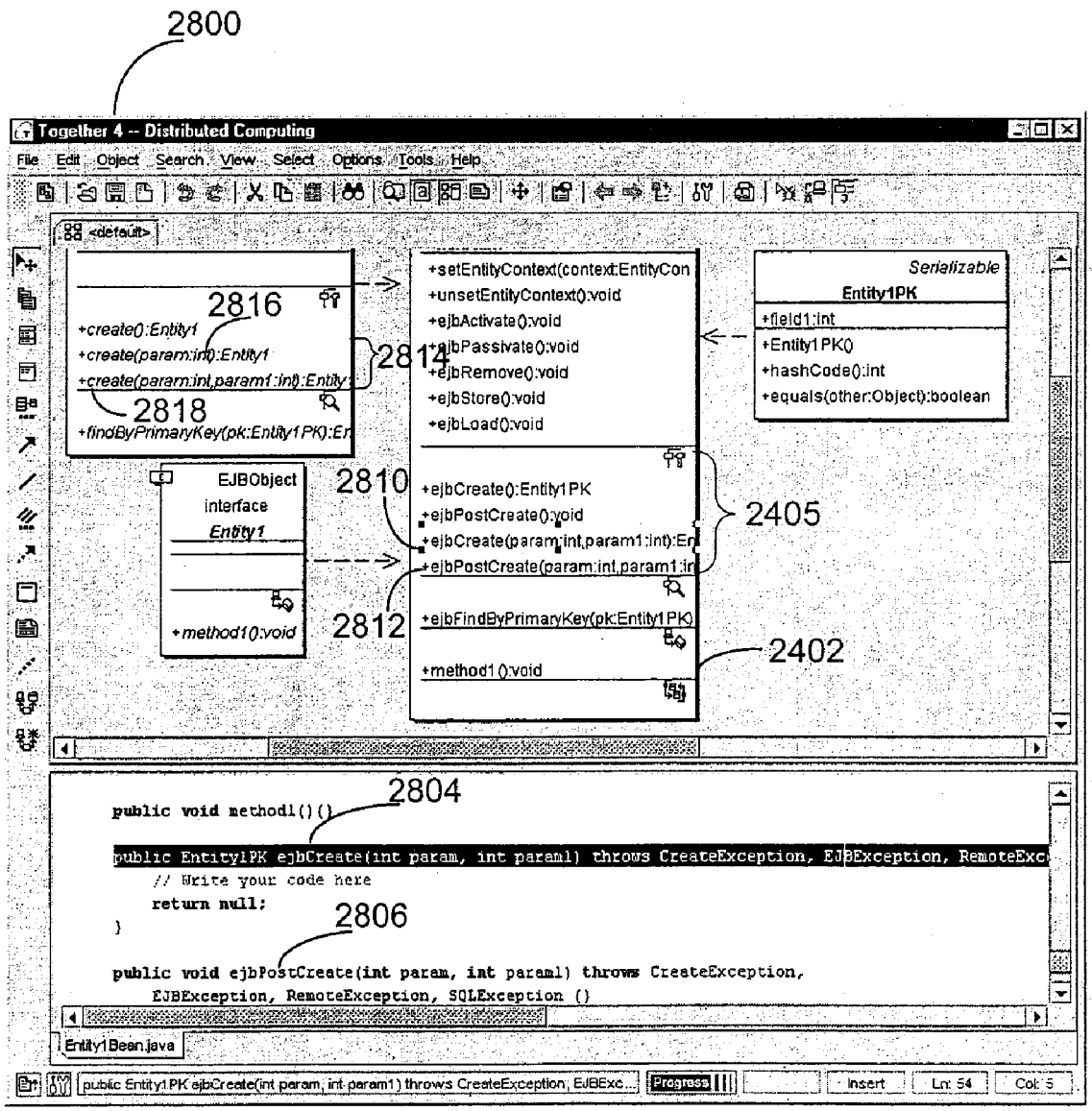
FIG. 28 depicts an exemplary user interface displayed by the software development tool in FIG. 2, where the user interface displays a code element for a create method and a postcreate method added to the EntityBean™ by the software development tool.
Figure 29:
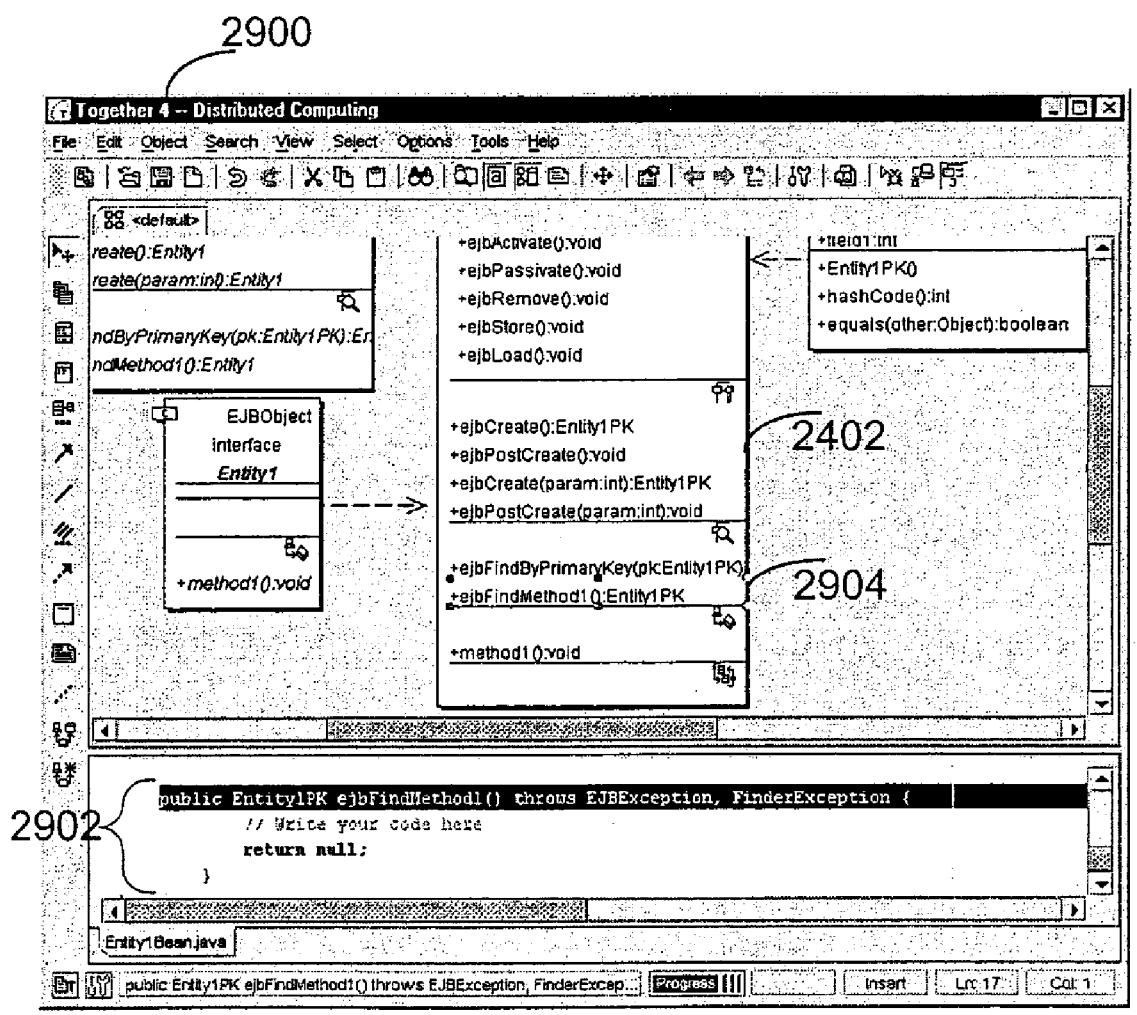
FIG. 29 depicts an exemplary user interface displayed by the software development tool in FIG. 2, where the user interface displays a code element for a find method added to the EntityBean™ by the software development tool.

After receiving the request, the software development tool adds the requested code element to the implementation class of the EJB (step 2212). For example, as shown in FIG. 27, when the software development tool receives the request to add a code element corresponding to business method type 2508 in step 2210, the software development tool adds a business method construct (graphically depicted as 2702) as the requested code element to code corresponding to EJB EntityBean 2402 in the first of the group of source code files of the EJB. As explained below, the software development tool saves development time by automatically adding a signature of the business method construct 2702 to the EJB Remote Interface 2420. FIG. 28 depicts an exemplary user interface 2800 displayed by the software development tool in response to receiving the request to add a code element corresponding to a create method type 2504 to the EJB EntityBean 2402. In this instance, the software development tool adds an ejbCreate method construct 2804 and an ejbPostCreate method construct 2806 to the code corresponding to EJB EntityBean 2402 in the first of the group of source code files of the EJB. As explained below, the software development tool also automatically adds signatures of the ejbCreate method construct 2804 and ejbPostCreate method construct 2806 to the EJB Home Interface 2418 to save a developer programming time. By invoking the added ejbCreate method construct 2804 or the added ejbPostCreate method construct 2806 via the EJB Home Interface 2418, a client may indicate to the EJB EntityBean 2402 to add a new record to an associated database table and initialize the new record. FIG. 29 depicts an exemplary user interface 2900 displayed by the software development tool in response to receiving the request to add a code element corresponding to a find method type 2506 to the EJB EntityBean 2402. In this instance, the software development tool adds an ejbFindMethod construct 2902 to the code corresponding to EJB EntityBean 2402 in the first of the group of source code files of the EJB. The software development tool, as explained below, also automatically adds a signature of the ejbFindMethod construct 2902 to the EJB Home Interface 2418 to save a developer programming time. By invoking die added ejbFindMethod construct 2902 via the EJB Home Interface 2418, a client may indicate to the EJB EntityBean 2402 to Find record(s) in the database that match the ejbFindMethod request.

Figure 30:
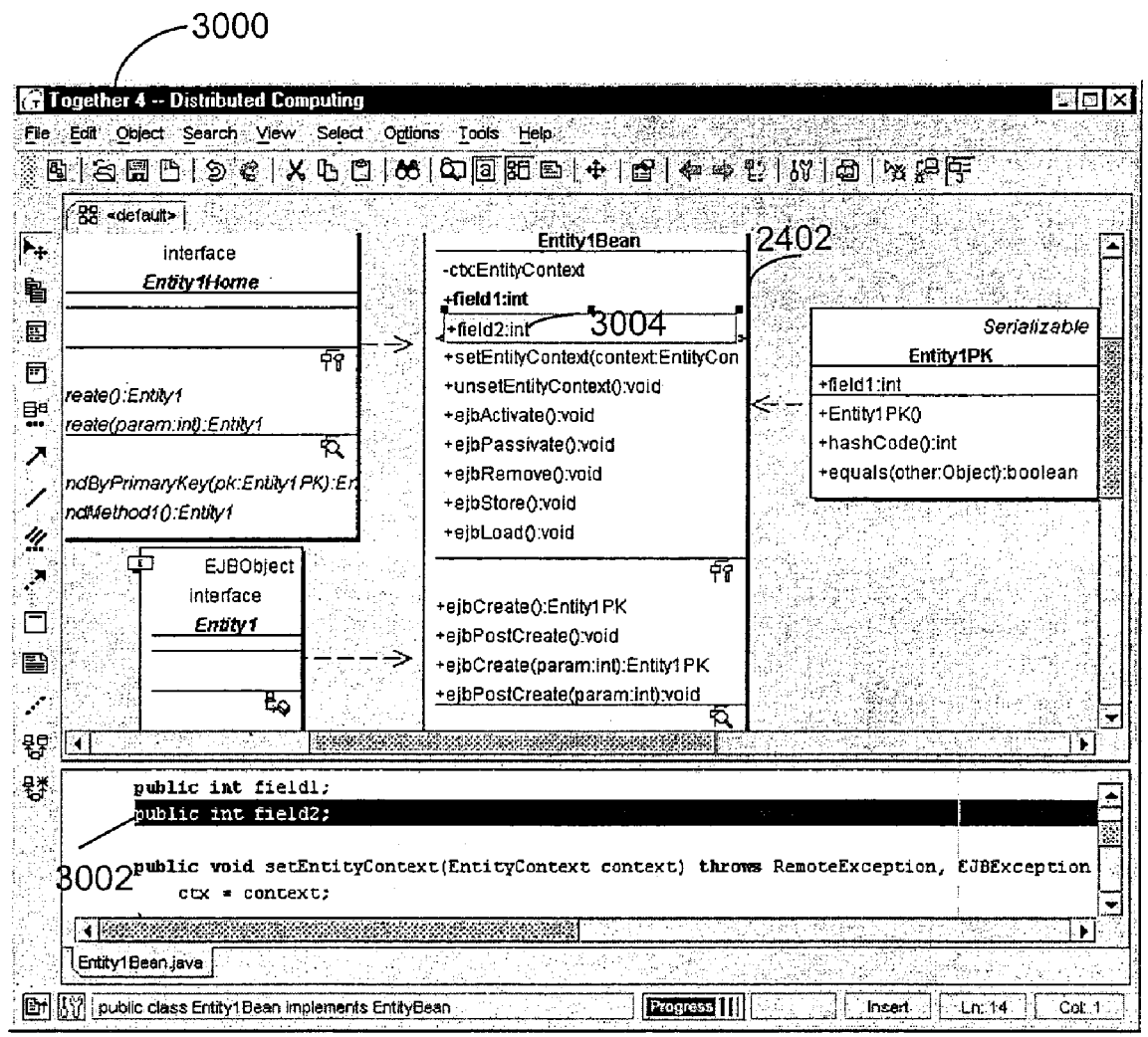
FIG. 30 depicts an exemplary user interface displayed by the software development tool in FIG. 2, where the user interface displays a code element for a persistent field added to the EntityBean™ by the software development tool.

FIG. 30 depicts an exemplary user interface 3000 displayed by the software development tool in response to receiving the request to add a code element corresponding to a persistent field type 2510 to the EJB EntityBean 2402. In this instance, the software development tool adds a persistent field attribute 3002 to the code corresponding to EJB EntityBean 2402 in the first of the group of source code files of the EJB. A developer may use the persistent field attribute within business logic code of the added business method construct 2702 in order to refer to a business data value stored in a corresponding field in a table of the database.

Figure 31:
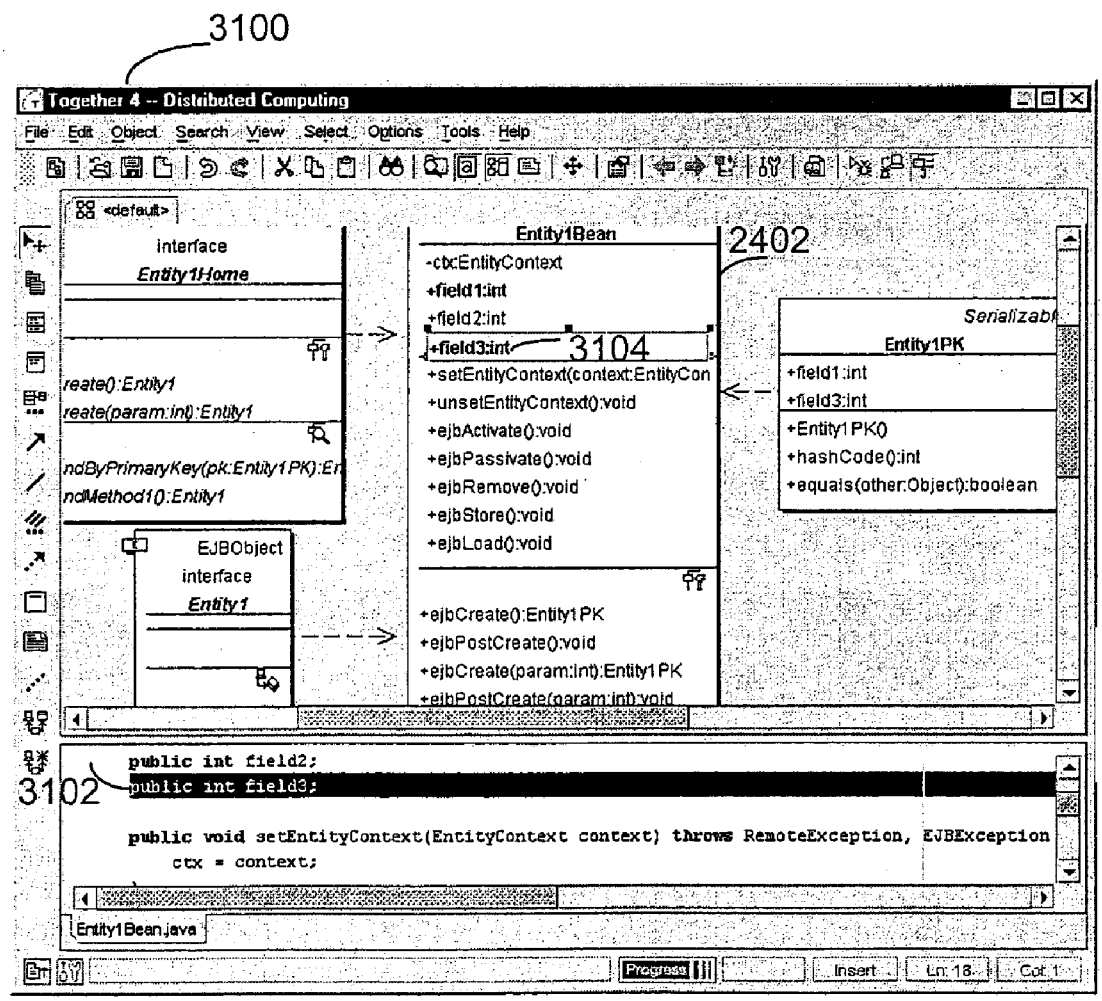
FIG. 31 depicts an exemplary user interface displayed by the software development tool in FIG. 2, where the user interface displays a code element for a primary key field added to the EntityBean™ by the software development tool.
Figure 32:
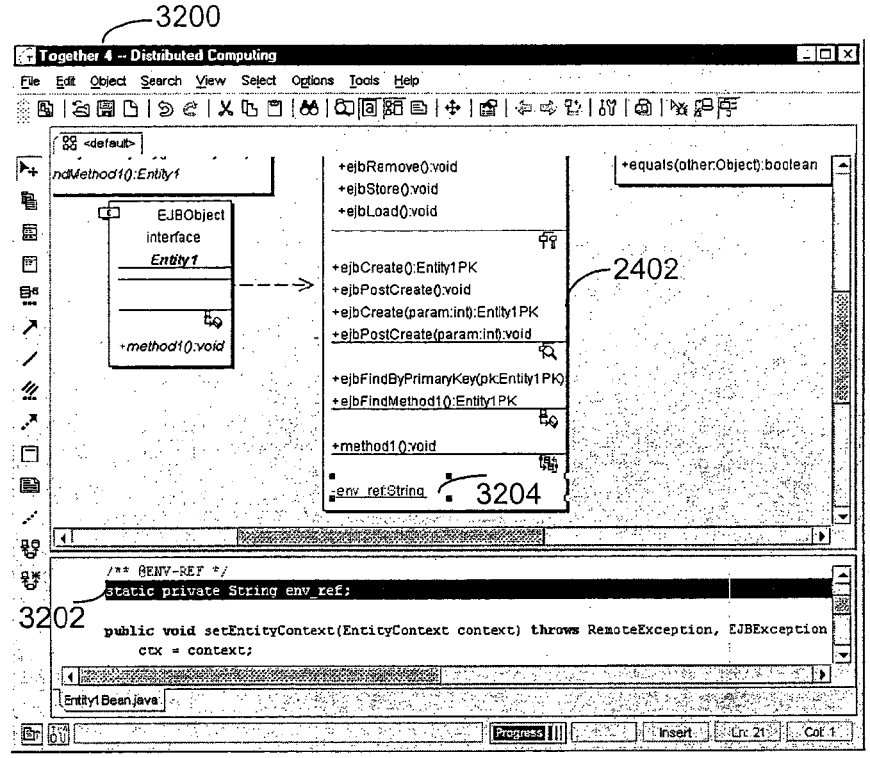
FIG. 32 depicts an exemplary user interface displayed by the software development tool in FIG. 2, where the user interface displays a code element for an EJB Environment Reference added to the EntityBean™ by the software development tool.
Figure 33:
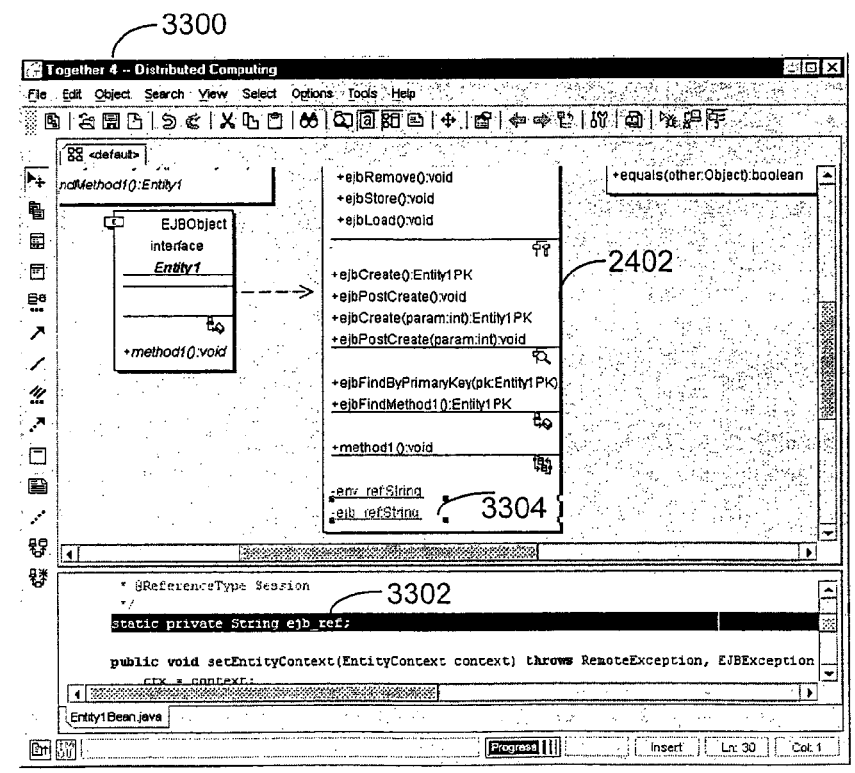
FIG. 33 depicts an exemplary user interface displayed by the software development tool in FIG. 2, where the user interface displays a code element for an EJB Reference added to the EntityBean™ by the software development tool.
Figure 34:
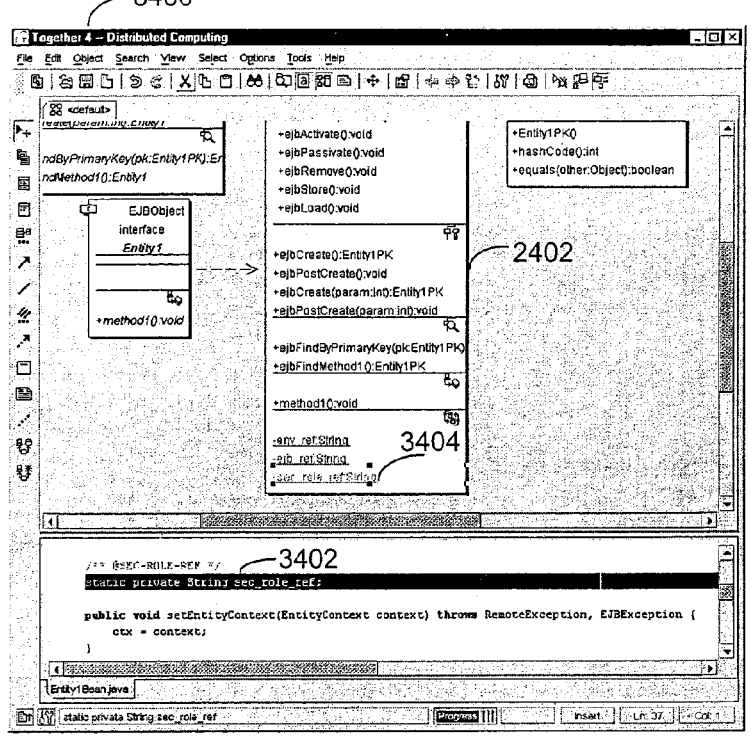
FIG. 34 depicts an exemplary user interface displayed by the software development tool in FIG. 2, where the user interface displays an EJB Security Role Reference added to the EntityBean™ by the software development tool.
Figure 35:
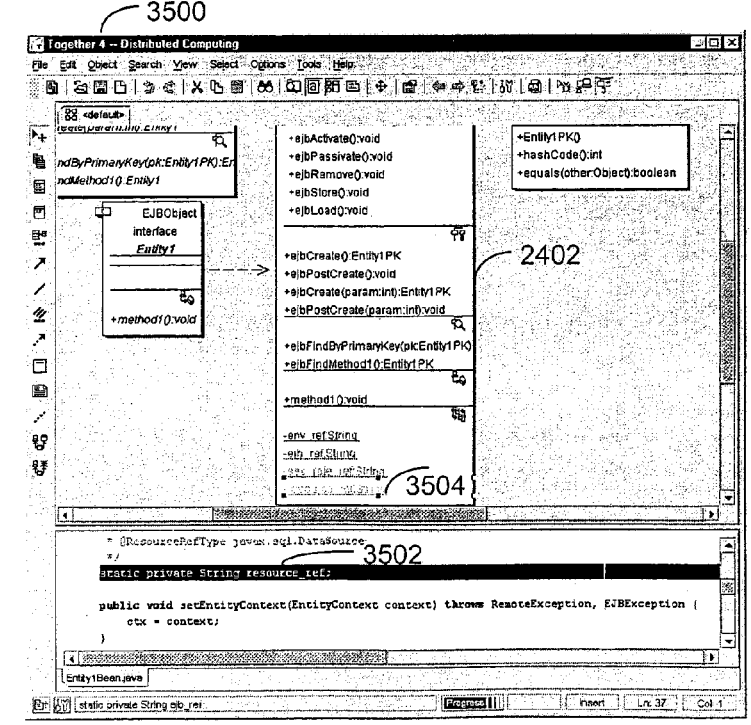
FIG. 35 depicts an exemplary user interface displayed by the software development tool in FIG. 2, where the user interface displays a code element for an EJB Resource Reference added to the EntityBean™ by the software development tool.

FIG. 31 depicts an exemplary user interface 3100 displayed by the software development tool in response to receiving the request to add a code element corresponding to a primary key field type 2512 to the EJB EntityBean 2402. In this instance, the software development tool adds a primary key field attribute 3102 to the code corresponding to EJB EntityBean 2402 in the first of the group of source code files of the EJB. As further explained below, the software development tool also automatically adds the same primary key field attribute 3102 as a primary key field attribute in code corresponding to the EJB Primary Key Class 2408 to save a developer programming time and prevent a mistake in mismatching the two attributes. As discussed above, the primary key field (e.g., 2416) and the additional primary key field 3102 may be used in combination to uniquely identify the EJB EntityBean to a database table.

FIGS. 32, 33, 34, and 35 depict exemplary user interfaces displayed by the software development tool in response to receiving the request to add a code element corresponding to an EJB Environment Reference type 2514 in FIG. 25, an EJB Reference type 2516 in FIG. 25, an EJB Security Role Reference type 2518 in FIG. 25, and an EJB Resource Reference type 2520 in FIG. 25 to the EJB EntityBean 2402, respectively. In each instance, the software development tool adds a persistent resource attribute corresponding to the respective type (i.e., 3202, 3302, 3402, and 3502 shown in FIGS. 32, 33, 34, and 35) to the code corresponding to EJB EntityBean 2402 in the first of the group of source code files of the EJB. These references may be correlated to references specified in a deployment descriptor file that is sent to the container 2150 via the EJB Application Server 2148 when the EJB EntityBean 2402 is deployed to the EJB Application Server 2148. The container 2150 identifies these references to the EJB EntityBean 2402 upon request from the EJB EntityBean 2402. The EJB Environment Reference 3202 is a property that the EJB EntityBean 2402 may reference when it is running (i.e., an instance of the EJB EntityBean 2402 has been created) to ascertain where the EJB EntityBean 2402 is deployed so that the EJB EntityBean 2402 is able to customize its behavior accordingly. The EJB Reference 3302 is a property that the EJB EntityBean 2402 may reference when running in order to call another EJB for information to complete processing of business logic within the EJB EntityBean 2402. The EJB Security Role Reference 3402 is a property that the EJB EntityBean 2402 may reference when executing in order to identify a security role (e.g., a user or group) with access to the EJB EntityBean 2402. The EJB Resource 3502 is a property that the EJB EntityBean 2402 may reference when executing to identity an external resource, such as "javax.sql.DataSource" which is used to obtain a connection to a database. In addition to saving the developer programming time, the software development tool correlates these resources to a deployment descriptor file when the EJB EntityBean 2402 is deployed as further discussed below. After adding the requested code element to the first of the group of source code files of the EJB, the software development tool also updates the TMM 200 to the first of the group of source code files of the EJB so that the TMM 200 has a language neutral representation of the EJB EntityBean 2402 that includes the requested code element.

Returning to FIG. 22A, the software development tool modifies the graphical representation of code corresponding to the EJB (step 2214). As shown in FIGS. 27 through 35, the software development tool modifies the graphical representation of code corresponding to the EJB by modifying the graphical representation of code corresponding to the EJB EntityBean 2402 to reflect the addition of the requested code element. In addition, the software development tool displays the addition of the requested code element in the display area that corresponds to the type of the requested code element. For example, as shown in FIG. 28, the software development tool displays the addition of ejbCreate and ejbPostCreate methods within the first display area 2405 of the EJB EntityBean 2402 that corresponds to create method types.

Next, the software development tool determines whether the requested code element is a method to be added to the EJB (step 2216 in FIG. 22B). If the requested code element is a method, the software development tool determines whether the requested code element is a business method (step 2218). If the requested code element is a business method, the software development tool adds a business method signature to the EJB Remote Interface that corresponds to the business method added to the EJB implementation class (step 2220). The software development tool then modifies the graphical representation of code corresponding to the EJB Remote Interface (step 2228). As shown in FIG. 27, the software development tool adds a business method signature (graphically depicted as 2704) to the EJB Remote Interface that corresponds to the business method 2702 added to the EJB EntityBean 2402. As previously discussed, by adding the business method signature to the EJB Remote Interface, the software development tool saves the developer programming time and ensures that the method signature in the EJB Remote Interface matches the method added to the related EJB EntityBean Implementation Class 2402.

Figure 36:
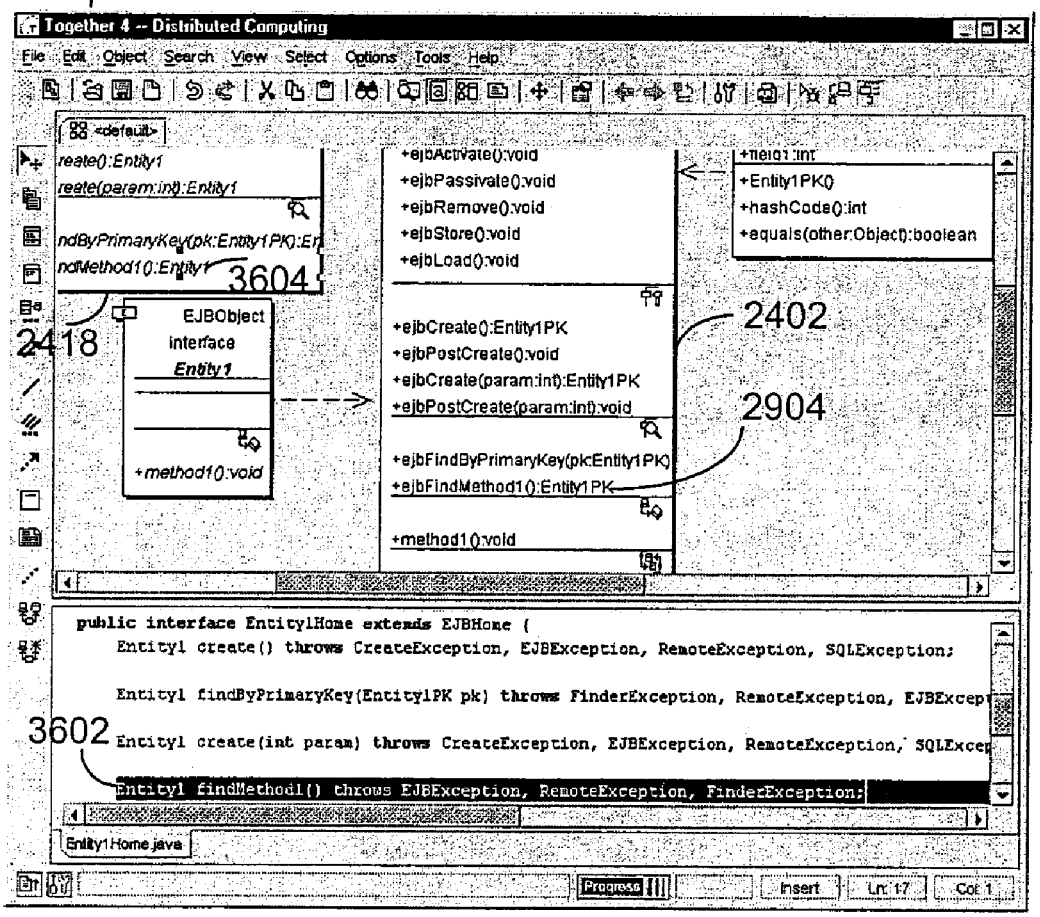
FIG. 36 depicts an exemplary user interface displayed by the software development tool in FIG. 2, where the user interface displays a find method signature for the code element added to the EJB Home Interface by the software development tool.

If the requested code element is a not a business method as previously determined in step 2218, the software development tool adds a method signature corresponding to code element to the EJB Home Interface (step 2222). If the requested code element is not a business method, the software development tool recognizes that the method to be added is a create or finder method whose signature is to be added to code corresponding to the EJB Home Interface 2418. The software development tool then modifies the graphical representation of the code corresponding to the EJB Home Interface (step 2230). Depending on the requested code element, the software development tool modifies the graphical representation of the code corresponding to the EJB Home Interface by displaying the signature of a create method or a finder element (e.g., signature 3604 for the finder element) in the create method display area 2419, in FIG. 24, or in the finder method display area 2421, in FIG. 24. FIG. 36 depicts an exemplary user interface displayed by the software development tool in FIG. 2, where the user interface displays a find method signature for the code element added to the EJB Home Interface by the software development tool. As shown, user interface 3600 displays a find method signature 3604 for the code element added to the EJB Home Interface 2418. The software development tool automatically adds a signature 3604 of the ejbFindMethod construct 3602 to the EJB Home Interface 2418 to save a developer programming time. By invoking the added ejbFindMethod construct 3602 via the EJB Home Interface 2418, a client may indicate to the EJB EntityBean 2402 to Find record(s) in the database that match the ejbFindMethod request 2904.

Figure 37:
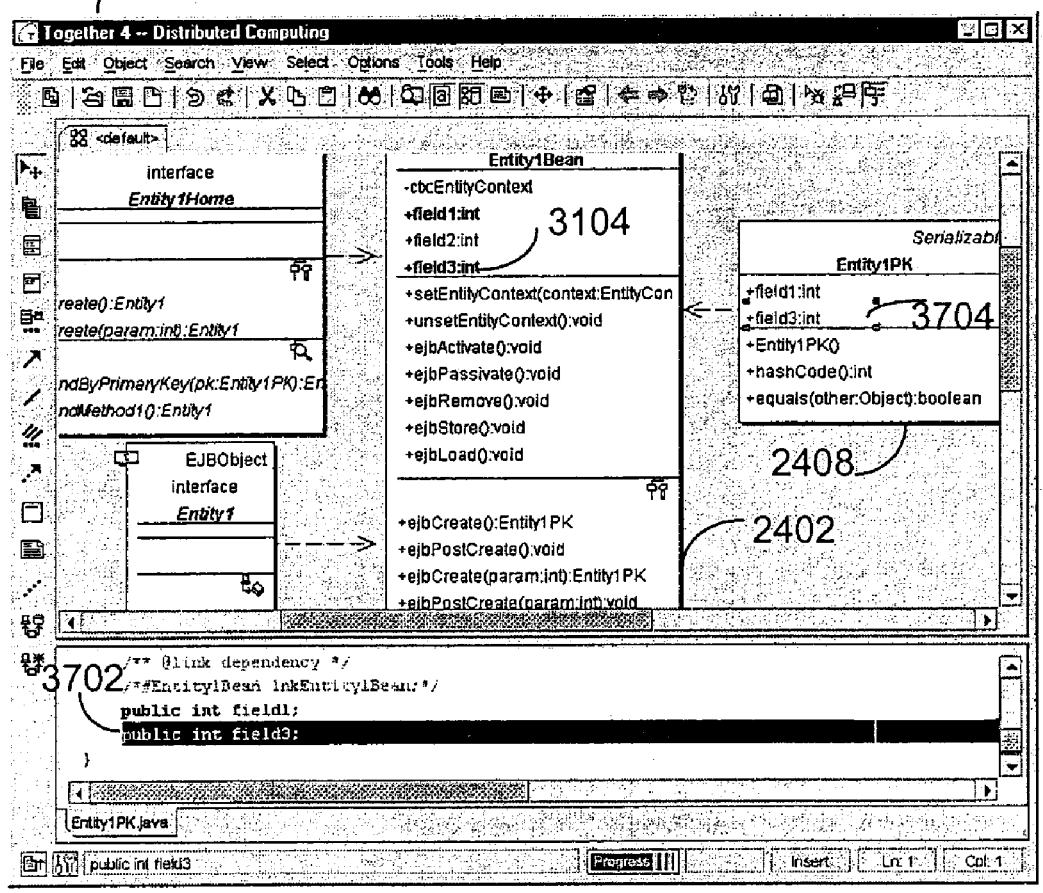
FIG. 37 depicts an exemplary user interface displayed by the software development tool in FIG. 2, where the user interface displays the code element for the primary key field added to the Primary Key class by the software development tool.

If the requested code element is not a method as previously determined in step 2216, the software development tool determines whether the requested code element is a primary key field (step 2224). If the requested code element is the primary key field, the software development tool adds a primary key field to the EJB Primary Key Class (step 2226). The software development tool then modifies the graphical representation of code corresponding to the EJB primary class (step 2232). FIG. 37 depicts an exemplary user interface 3700 displayed by the software development tool, where the user interface 3700 displays the primary key field 3702 added to the Primary Key Class 2408 by the software development tool. The primary key field 3702 corresponds to the primary key field 3702 added by the software development tool to the code corresponding to the EJB EntityBean 2402. If the requested code element is not a primary key field as previously described in step 2216, the software development tool has no further steps to perform and ends processing for the generation of the EJB.

Compiling, Deploying and Debugging an Enterprise Java-Bean™

As previously described, the project comprises a group of object-oriented elements. An object-oriented element may be a class or an interface. The project may also include a group of packages. Each package corresponds to a directory in the project where a respective portion of the object-oriented elements is stored. An EJB in the project may be an EntityBean that is comprised of four object-oriented elements: two classes (i.e., an implementation class and a primary key class) and two interfaces (i.e., a home interface and a remote interface). An EJB may also be a SessionBean that is comprised of three object-oriented elements: one class (i.e., an implementation class) and two interfaces (i.e., a home interface and a remote interface).

After generating an EJB or after an EJB developed using another tool is provided to the software development tool by a programmer, the software development tool allows the programmer to deploy and test the EJB. FIGS. 38A through 38F depict a flowchart illustrating an exemplary process performed by the software development tool to compile, deploy, and debug an EJB. In general, an EJB deployed by the software development tool accesses business logic data stored in a database (i.e., database 2158 on computer 2108) in response to a Client Application 2152 invoking a business method associated with the EJB. Initially, the software development tool receives an indication of an EJB that is to be deployed (step 3802). As shown in FIG. 39, the software development tool receives the indication of the EJB (i.e., depicted as diagram 3902) via a mouse click by a programmer while the mouse cursor is over the diagram 3902 that graphically represents code corresponding to the EJB. As known to one skilled in the art, the programmer may indicate the EJB to the software development tool using any known data input technique associated with the I/O device 606. Note for clarity, the identified EJB is referenced as EJB 3902 in the following discussion.

In another implementation, the software development tool may receive die indication of an EJB to be deployed as all EJBs in the project. In still another implementation, the software development tool may receive the indication of an EJB to be deployed as a portion of EJBs in the project that are displayed graphically on pane 3904. The portion of EJBs in the project that is displayed graphically on pane 3904 may be among the respective portions of object-oriented elements stored in a package of the project. In this implementation, the software development tool may invoke TMM 200 for the portion of EJBs in the project that are displayed graphically on pane 3904, as TMM 200 tracks a display status for each object-oriented element in the project. Note that the software development tool stores in a graphical view file in the project, the name and display coordinates of each symbol or diagram that may be displayed in the graphical pane 3904. When the project is opened, the software development tool parses the graphical view file into TMM 200, which then correlates the name and display coordinates of each symbol to a respective file corresponding to each object-oriented element in the project as discussed in reference to FIGS. 10A and 10B above. Thus. TMM 200 may subsequently track the display status for each object-oriented element in the project.

Next, the software development tool also receives a request to deploy the EJB (step 3804). As shown in FIG. 39, the software development tool may receive the request to deploy the EJB via a programmer selecting a deployment option 3906 from a pull-down menu on user interface 3900. The software development tool, however, may receive the request to deploy the EJB via any known data input technique, such as an actuation button on the user interface 3900 or via a keyboard input.

Figure 40:
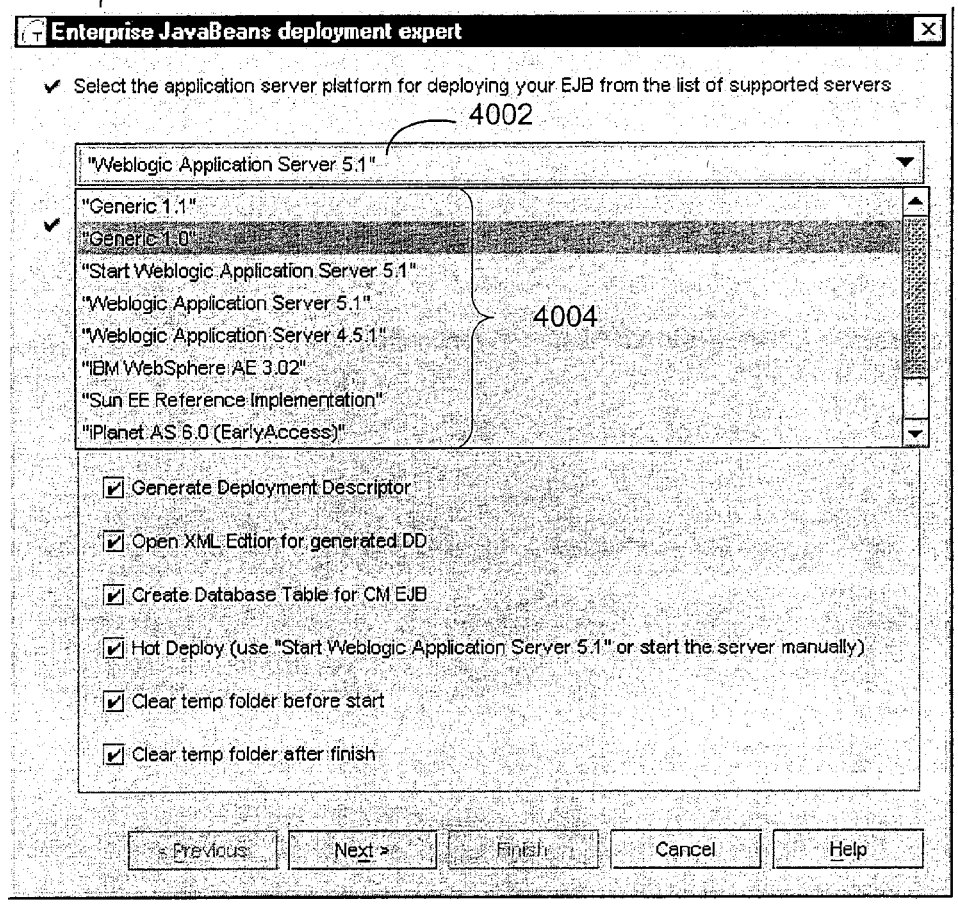
FIG. 40 depicts an exemplary user interface displayed by the software development tool for receiving an indication of an EJB target application server.

After receiving the request to deploy the EJB, the software development tool receives an indication of an EJB target application server (step 3806). As illustrated in FIG. 40, the programmer may indicate the EJB target application server 4002 to the software development tool from a list of application servers 4004 that are retrieved from a configuration file and displayed by the software development tool in response to the request to deploy the EJB or in response to the programmer selecting a pull-down menu on a user interface 4000. The identified EJB target application server may be any known application server that complies with JAVA 2 Enterprise Edition (J2EE) specification, such as generic 1.1 or 1.0, Weblogic Server, or IBM WebSphere Server. For the discussion to follow, it is assumed that the EJB target application server 4002 corresponds to EJB Application Server 2148 that resides on computer 2104.

The software development tool then determines whether to hot deploy the EJB (step 3808). The software development tool may hot deploy EJB 3902 by starting the EJB target application server 4002 on the computer 2104 before deploying EJB 3902. By hot deploying EJB 3902, the software development tool saves development time as the programmer no longer has to manually start the EJB target application server 4002 to test or debug the EJB 3902. In addition, by hot deploying the software development tool is able to re-deploy the EJB without having re-start the EJB target application server 4002, saving the programmer significant time and effort. The manual effort to start the EJB target application server 4002 on computer 2104 is significant where computer 2104 is remotely located. As discussed below, the software development tool is able to "cold deploy" to facilitate testing of the EJB. In this situation, the software development tool deploys the EJB to the EJB target application server and then starts restarts the EJB target application server so that the EJB target application server will recognize and support the deployed EJB. Each time the software development tool "cold deploys" the EJB (e.g., re-deploys the EJB after a modification of the EJB is made and the EJB is recompiled), the software development tool restarts the EJB target application server.

In one implementation, the software development tool may hot deploy by first sending a known ping message via network 2110 to the EJB target application server 4002 on computer 2104 to identify if the EJB target application server 4002 is already started. Thus, even if the EJB target application server 4002 is an application server that cannot be remotely started by the software development tool, the software development tool still may save the programmer development time by pinging the EJB target application server 4002 to determine if a hot deployment is possible. A programmer may indicate to hot deploy EJB 3902 via actuation of a button on user interface 4000 or any other known programming data input technique. In one implementation shown in FIG. 41, a programmer may indicate to the software development tool to hot deploy EJB 3902 by selecting an application server from the list of application servers 4004 that is pre-defined to be started by the software development tool. For example, the selection for EJB target application server 4102 has a prefix of "Start" to visually indicate that this server is to be started by the software development tool in preparation for a hot deployment of EJB 3902.

If the EJB 3902 is to be hot deployed, the software development tool receives an operation mode for starting the EJB target application server (step 3810). The operation mode may be normal mode 4104 for testing EJB 3902 after deployment with the Client Application 2152, or the operation mode may be debug mode 4106 for debugging EJB 3902 after deployment to the EJB target application server 4002. In addition, the software development tool receives access information to start EJB target application server (step 3812). FIG. 42 depicts an exemplary user interface 4200 showing access information 4202 received by the software development tool for the EJB target application server 4002. The access information 4202 may be default access information the software development tool retrieves from a configuration file (not shown) associated with identified EJB target application server 4002, or may be entered by the programmer. As illustrated in FIG. 42, in one implementation in which the EJB Application Server 2148 (which corresponds to EJB target application server 4002 as previously indicated) is stored locally with the software development tool on computer 2102, access information may include a location 4202 that identifies the local directory on computer 2102 where the EJB target application server 4002 is stored. In another implementation (not shown in figures) in which the EJB Application Server 2148 is located remotely on computer 2104, access information may include: the identification of the computer 2104; the location of the EJB Application Server 2148 on the computer 2104; and access privileges, such as a username and password for the programmer, which are authorized by the computer 2104 before the software development tool is able to proceed with the hot deployment of EJB 3902. As shown in FIG. 43, the access information received by the software development tool may also include a port address 4302 that is assigned to the EJB Application Server 2148 via any known network protocol application, such as WinSock™, for communicating with the software development tool on computer 2102 via network 2110. The port address 4302 of the EJB Application Server 2148 allows the software development tool to transmit a communication, such as a start command, via a message packet (i.e., TCP/IP message) to the EJB Application Server 2148 on network 2110.

Having received the access information for the EJB target application server 4002, the software development tool starts target application server (step 3814). To start the EJB target application server 4002, the software development tool sends a start command created from a known application program interface (API) for the EJB target application server 4002. In another implementation, the software development tool sends a pre-defined batch file that contains instructions recognizable by the EJB target application server 4002 for starting the EJB target application server 4002. The pre-defined batch file (not shown in figures) may be stored in secondary storage device 2120.

The software development tool also receives an address port to listen for communications between the EJB target application server and the Client Application (step 3816). FIG. 44 depicts an exemplary response 4400 received by the software development tool from the EJB target application server 4002 in response to the software development tool sending a command to start EJB target application server 4002. As part of the response 4400, the software development tool receives a listening port address 4402 assigned to the EJB Application Server 2148 via any known network protocol application, such as WinSock™, for communicating with the Client Application 2152 via network 2110. As described below, the software development tool uses the listening port address 4402 to listen for communications between the Client Application 2152 and the EJB Application Server 2148 (i.e., the EJB target application server 4002). By listening for communications between these two servers 2152 and 2148, the software development tool is able to test and debug the operation of EJB 3902 after it is deployed as further explained below. In addition, as shown in FIG. 44, the software development tool receives a confirmation 4404 that the EJB target application server 4002 has been started. As discussed above, in one implementation, the software development tool may receive the confirmation 4404 that the EJB target application server 4002 has been started in response to the software development tool sending a known ping message to the EJB target application server 4002 on port address 4302, in FIG. 43. Thus, the software development tool has readied the EJB target application server 4002 for a hot deployment of EJB 3902.

Figure 38A:
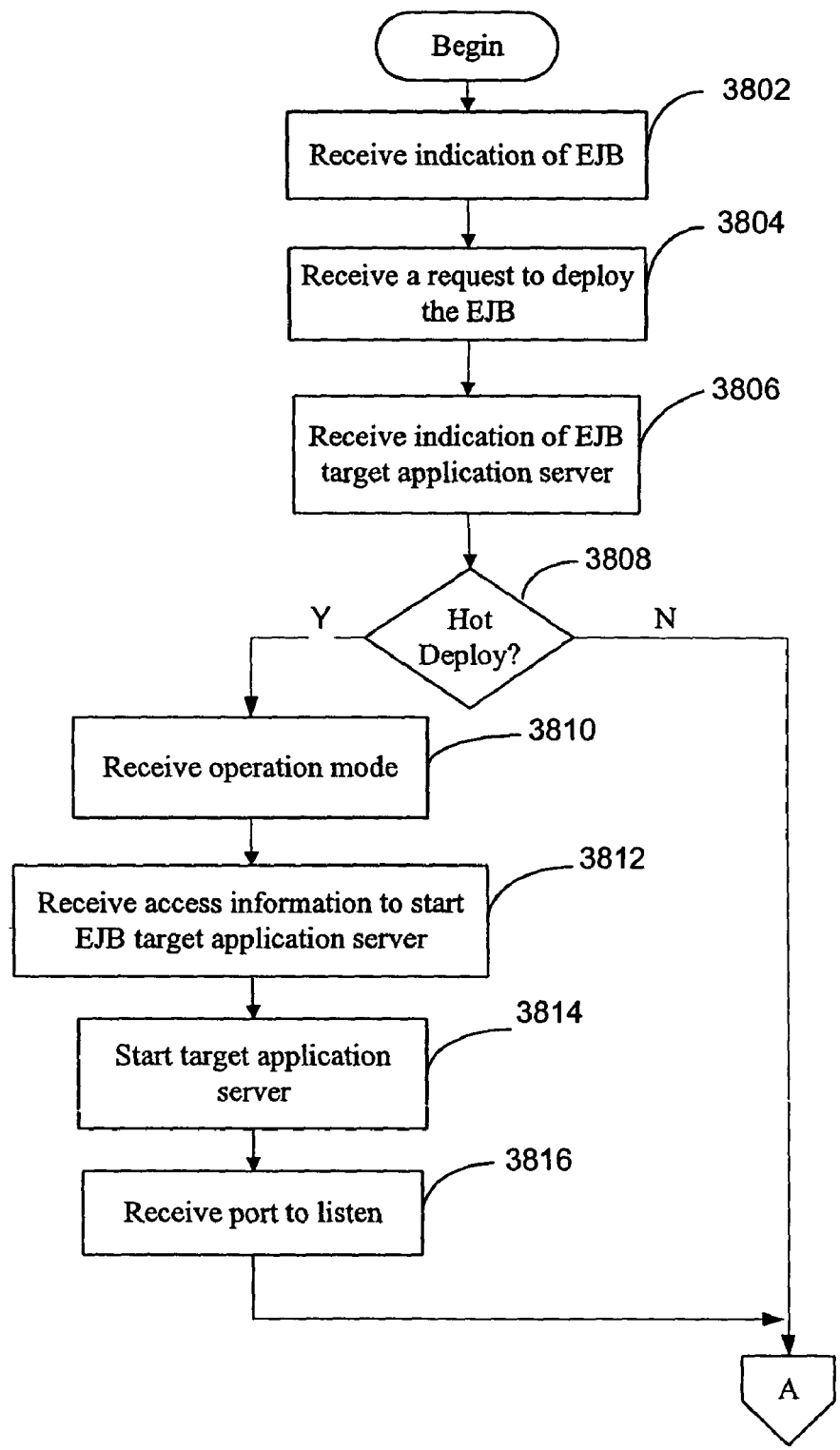
FIGS. 38A-F depict a flowchart illustrating an exemplary process performed by the software development tool in FIG. 2 to compile, deploy, and debug an Enterprise JavaBean™.
Figure 38B:
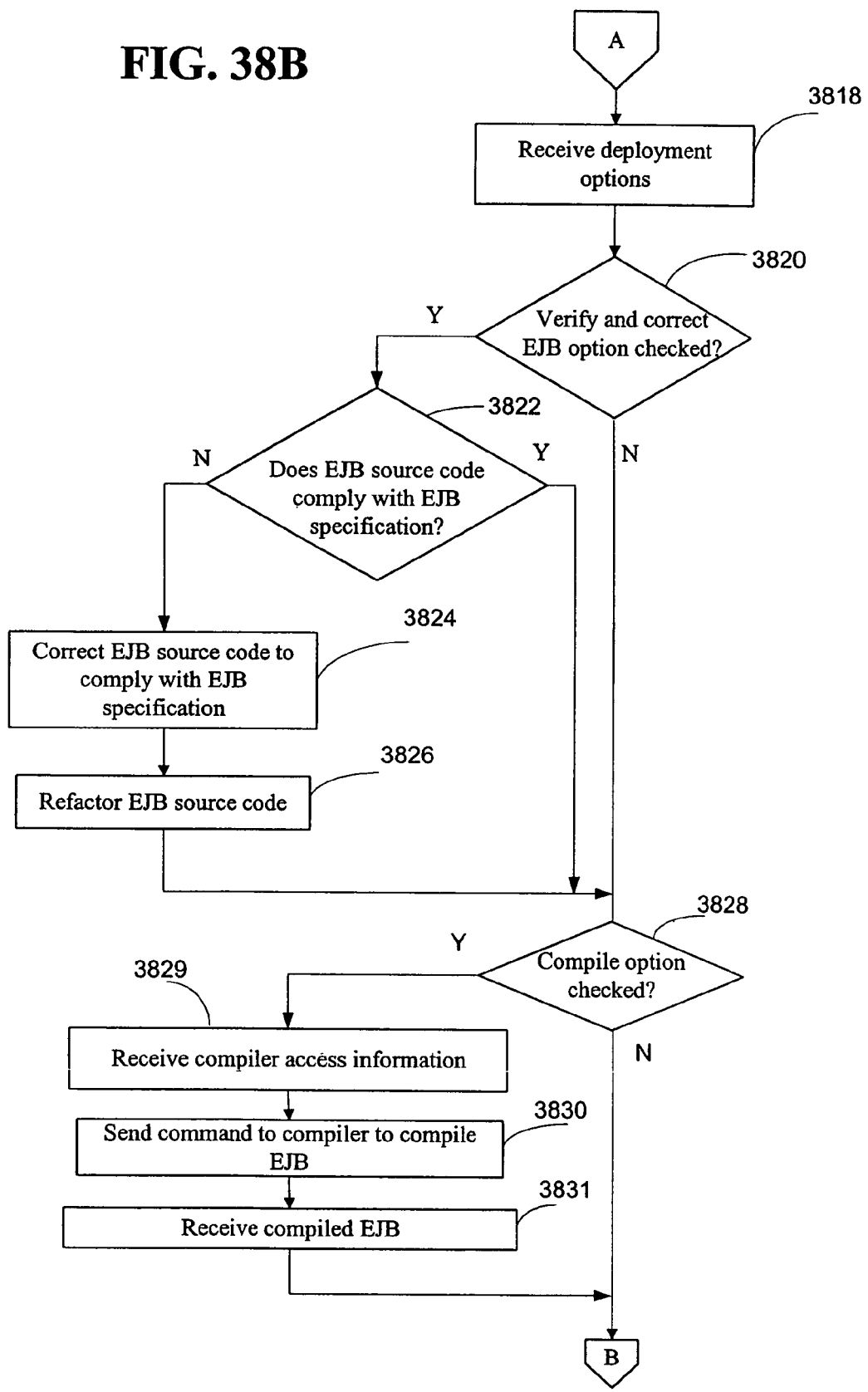
Figure 39:
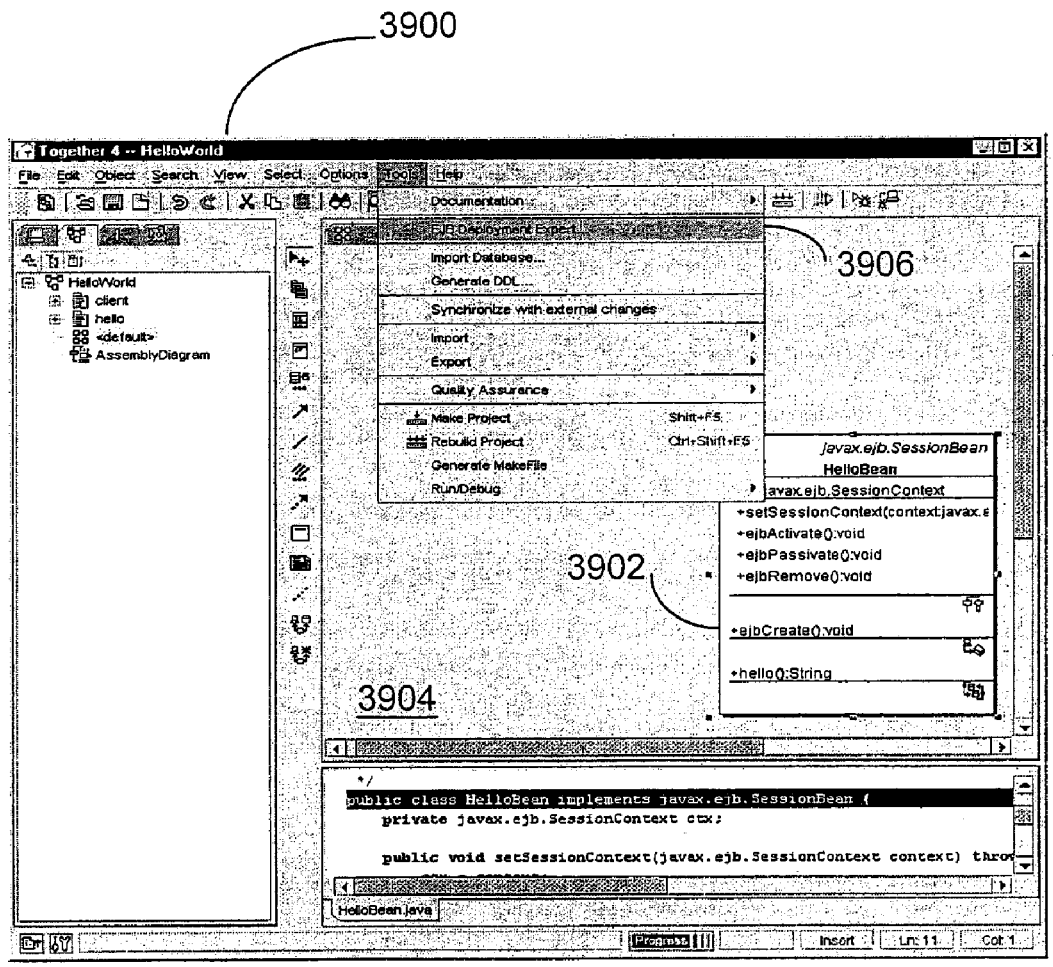
FIG. 39 depicts an exemplary user interface displayed by the software development tool in FIG. 2, for requesting the deployment of an EJB.
Figure 45:
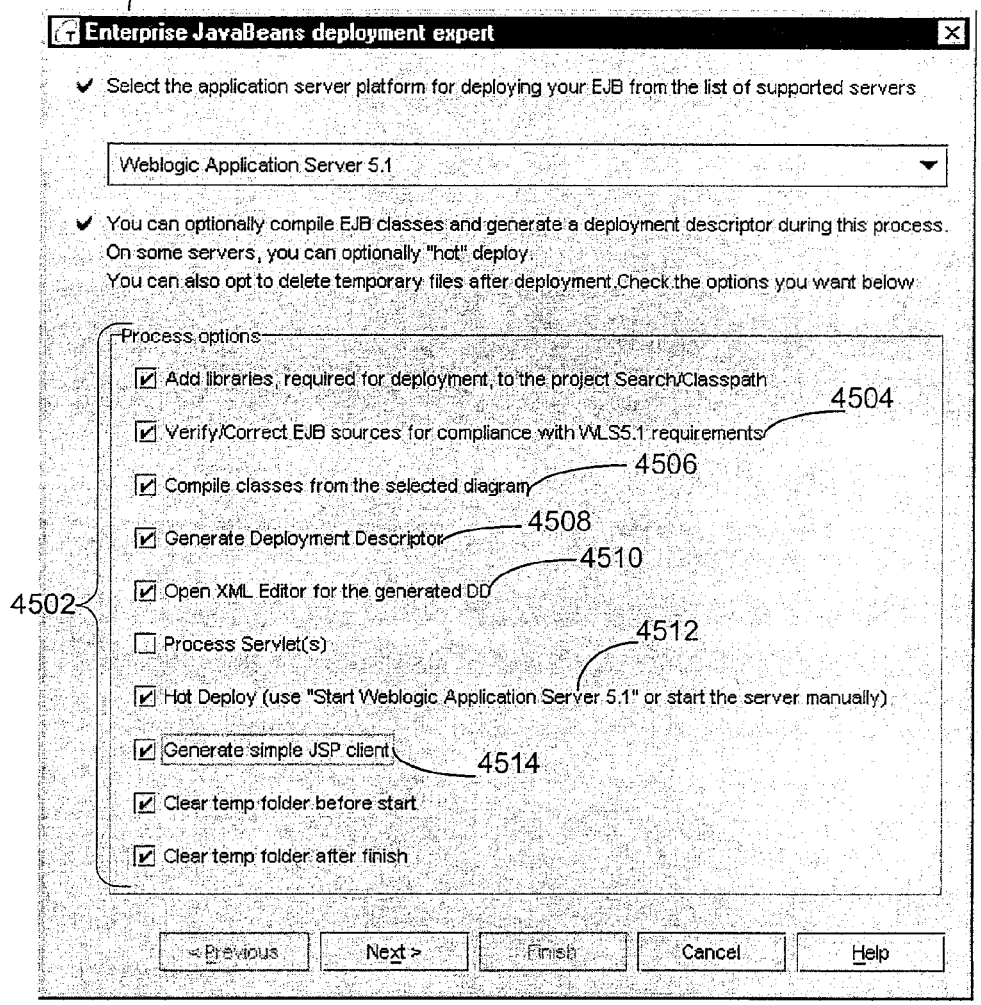
FIG. 45 depicts an exemplary user interface displayed by the software development tool in FIG. 2, where the user interface displays a list of deployment options.

If the EJB 3902 is not to be hot deployed or if the software development tool has readied the EJB target application server 4002 for a hot deployment of the EJB 3902, the software development tool receives deployment options (step 3818 in FIG. 38B). FIG. 45 depicts an exemplary user interface 4500 displayed by the software development tool, where the user interface 4500 displays a list of deployment options 4502 that a programmer may select to be performed by the software development tool in conjunction with deploying the EJB 3902. The list of deployment options is discussed below in reference to further processing performed by the software development tool.

The software development tool also determines whether a verify and correct compliance option from among the list of deployment options is selected (step 3820). If the verify and correct compliance option 4504 in FIG. 45 is selected, the software development tool determines whether code corresponding to the EJB complies with an EJB specification (step 3822). To determine or verify that code corresponding to the EJB is compliant, the software development tool parses a configuration file (not shown in figures) associated with the EJB target application server 4002 for an identification of the EJB specification that the EJB target application server 4002 supports. For example, a configuration file associated with Weblogic Server V5.1 may include a compliance specification identification that identifies EJB specification v1.1 as the latest specification that the Weblogic Server V5.1 supports. In one implementation, the software development tool may use the identification to parse a file containing a corresponding known EJB specification v1.1 to obtain a group of compliant method constructs and compliant transaction attributes that the software development tool may compare to the code corresponding to EJB 3902. For example, the software development tool may use Sun Microsystems' EJB specification v1.1 previously incorporated by reference to search for and identify that the compliant method construct for an "ejbCreate( )" method has a return type of "primary key" as opposed to having a "void" return type as specified in the Sun Microsystems' EJB specification v1.0. Thus, if code corresponding to EJB 3902 has a "ejbCreate( )" construct defined according to EJB specification v1.0, the software development tool may isolate this portion of the code corresponding to EJB 3902 as being non-compliant. In another implementation, the configuration file associated with the EJB target application server 4002 may identify a group of compliant verification/correction steps that the software development tool may take to verify and correct code corresponding to EJB 3902 rather than parsing a known EJB specification. The compliant verification/correction steps may be written in a script language that the software development tool can read to identify the group of compliant constructs (i.e., "ejbCreate( )" with return type of primary key) to search for in the code corresponding to EJB 3902.

Figure 46:
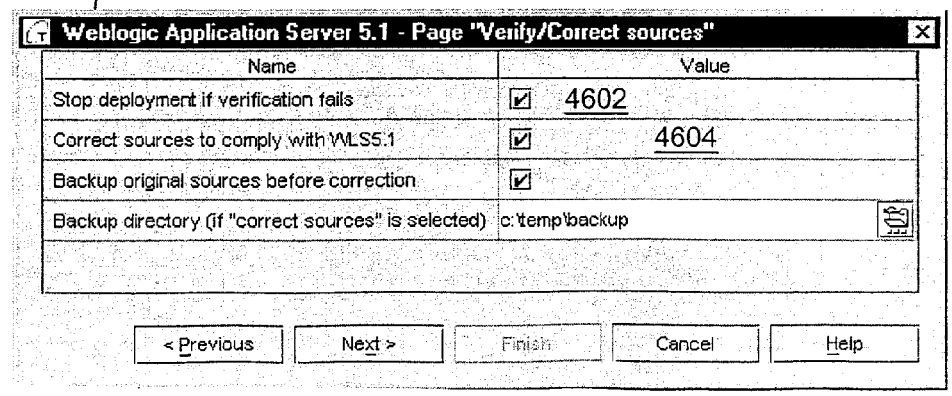
FIG. 46 depicts an exemplary user interface displayed by the software development tool in FIG. 2, where the software user interface displays an option to verify and correct EJB source code to comply with a specification.

As shown in FIG. 46, the software development tool in performing step 3826 may display verify/correct compliance options 4602 and 4604 that a programmer may select for the software development tool to perform. Verify/correct compliance option 4602 may indicate to the software development tool to stop if verification fails. Verify/correct compliance option 4604 may indicate to proceed to correct code corresponding to EJB 3902 if the code does not comply with the identified specification.

If the software development tool determines that code corresponding to the EJB is not compliant with the EJB specification, the software development tool corrects the code corresponding to the EJB to comply with the EJB specification (step 3824). To correct the code, the software development tool replaces a non-compliant portion of the code corresponding to EJB 3902 in a respective file in the project with a compliant portion identified by the EJB specification. For example, if the software development tool found that a portion of code corresponding to EJB 3902 contained an "ejbCreate( )" with a "void" return type, the software development tool would identify, that portion as non-compliant and will replace the non-compliant portion with the compliant portion. In this example, the software development tool replaces the non-compliant "void" with the compliant return type of primary key. Note that the software development tool may identify the primary key type as an attribute in the implementation class of EJB 3902 based on "PK" being in the name of the primary key type.

After correcting the non-compliant portion, the software development tool also refactors code corresponding to the EJB (step 3826). The software development tool may refactor code corresponding to EJB 3902 by searching for code corresponding to each object-oriented element in the project for a reference to the non-compliant portion of EJB 3902. For example, when the non-compliant portion is "void ejbCreate( )" for EJB 3902, then the software development tool searches for any other class in the project that implements the home interface of EJB 3902 and references the method "void ejbCreate" for EJB 3902. The class may be a client test class for debugging EJB 3902. Assuming another class in the project that references the method "void ejbCreate" for EJB 3902 is identified, the software development tool replaces the identified reference with a reference that matches the compliant portion, such as replacing "void" with "a return type of primary key." As one skilled in the art may appreciate, the software development tool continues refactoring code corresponding to each object-oriented element in the project until the software development tool does not identify a reference to the non-compliant portion or any other reference to code corrected in the process of refactoring for the non-compliant portion.

As shown in FIG. 38B, the software development tool determines whether a compile option from among the list of deployment options is selected (step 3828). If the compile option is selected, the software development tool receives compiler access information (step 3829). As illustrated in FIG. 47, the compiler access information 4702 includes a location where the compiler resides on the network 2110 and a name of the compiler. As described above, the compiler may be located in secondary storage device 2120, 2122, 2124, or 2126 of computers 2102, 2104, 2106, or 2108, respectively. For example, as shown in FIG. 47, compiler access information 4702 identifies the location as secondary storage 2120 (e.g., a local drive "e:\") on the local computer 2102, and identifies the name of the compiler as "jdk1.2.2." In another implementation, when the software development tool accesses the compiler remotely via the network 2110, the compiler access information 4702 may include an identification of a remote computer (i.e., 2122, 2121, 2126, 2104, 2106 or 2108) where the compiler is located. In this implementation, the compiler access information 4702 may also include access privileges for communicating with the compiler on the identified computer. In performing the step of receiving compiler access information, the software development tool may determine whether the named compiler is compatible with the EJB target application server 4002 where the compiled EJB is to be deployed and run. If the software development tool determines that the named compiler is not compatible, the software development tool may display a compiler incompatibility error (not shown in figures), rather than attempt to use the named compiler to compile EJB 3902.

Next, the software development tool sends a command to the compiler to compile the EJB (step 3830). In one implementation, the software development tool may use a known script or batch file command that is recognizable to the compiler identified in compiler access information 4702. The script or batch file command sent by the software development tool also identifies the location of code corresponding to the EJB to be compiled. The software development tool then receives the compiled EJB (step 3831). Using the compiler access information 4702, the software development may receive the compiled EJB by monitoring for a compilation complete response from the compiler or by monitoring a directory that the compiler is to store the compiled EJB when compilation is complete, such as the directory that contains the source code corresponding to the EJB.

Figure 38C:
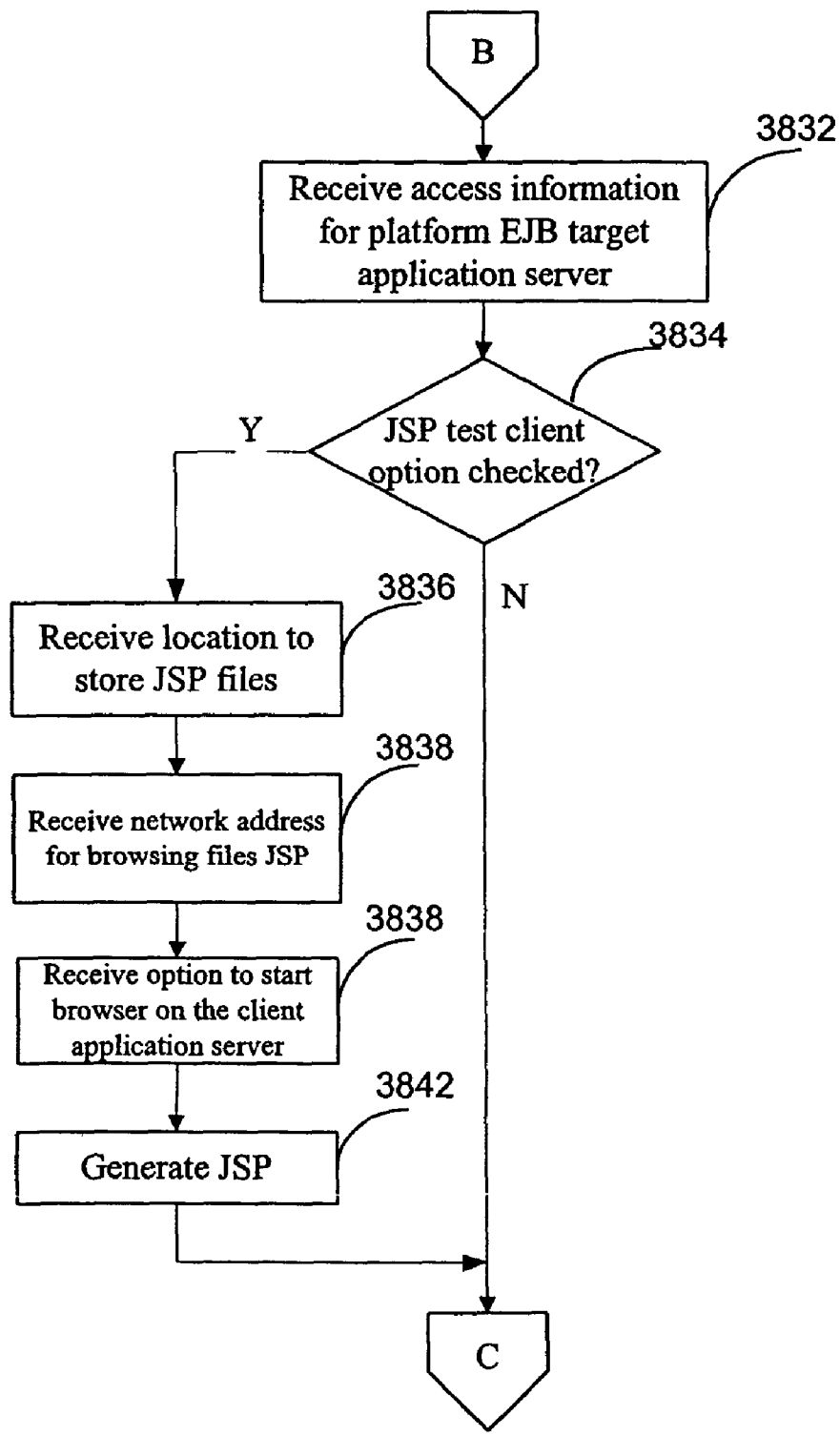

The software development tool also receives access information for a platform hosting the EJB target application server (step 3832 in FIG. 38C). In one implementation, the platform hosting the EJB target application server 4002 may be the local computer 2102 where the software development tool also resides. In another implementation, the platform hosting the EJB target application server 4002 may be the remote computer 2104. As shown in FIG. 48, the access information 4802 for the platform hosting the EJB target application server 4002 may include a system password 4804, a server port 4806, and a server host identification 4808. The system password 4804 may be provided to the software development tool to authorize the deployment of EJB 3902 to the EJB target application server 4002 hosted on the platform. The server port 4806 may correspond to the listening address port 4402, in FIG. 44, obtained in response to starting the EJB target application server 4002 for a hot deployment of the EJB 3902. The server host identification 4808 may correspond to the local computer 2102 or the remote computer 2104. Note that the system password 4804 may not be needed by the software development tool to start the EJB target application server 4002, but may be needed to deploy EJB 3902 to the EJB target application server 4002.

The software development tool also determines whether a Java Server Page (JSP) test client option from among the list of deployment options is selected (step 3834). A JSP is an extension of Sun Microsystems' Java servlet (i.e., an applet executed on a server) technology. A JSP allows the software development tool to incorporate code corresponding to method calls or signatures associated with the home and remote interfaces of EJB 3902 directly into an HTML page as a scripting language. JSPs are defined in Sun Microsystems' J2EE specification and are more clearly described in the following references, which are incorporated herein by reference: (1) Marty Hall, *Core Servlets and Java Server Pages (JSP)*, Prentice Hall PTR/Sun Microsystems Press (2000), and (2) Duane K. Fields and Mark A. Kolb, *Web Development With Java Server Pages*, Manning Publication Company (2000).

As illustrated in FIG. 49, if the JSP test client option is selected, the software development tool receives a public location 4902 for storing a JSP document definition file, such as an HTML file. The JSP document definition file to be stored at the public location 4902 identifies the data structure for a group of JSP files generated by the software development tool for use in testing EJB 3902 once it is deployed. Any application, such as the browser 2154 on the Client Application 2152, may access the JSP document definition file to interpret the group of JSP files. The public location 4902 may be any location on computer 2104 that is accessible to any application server remotely located to EJB Application Server 2148. The software development tool may also receive a private location 4904 to store the JSP files generated by the software development tool (step 3836). To avoid-disorder in public location 4902, the software development tool generates a subdirectory of the public location 4902 that corresponds to the private location 4904. The private location 4904 may not be accessible to the public without access privileges such as system password 4804 for computer 2104. The software development tool also receives a network address for browsing the JSP files (step 3838). As shown in FIG. 49, the network address 4906 includes the server port 4806, in FIG. 48. The server port 4806 corresponds to the listening address port 4402, in FIG. 44, which the software development tool uses to listen to communication between the Client Application 2152 and the EJB Application Server 2148. As discussed below, the software development tool provides the network address 4906 to the browser 2154 on the Client Application 2152 to facilitate testing EJB 3902.

Figure 50:
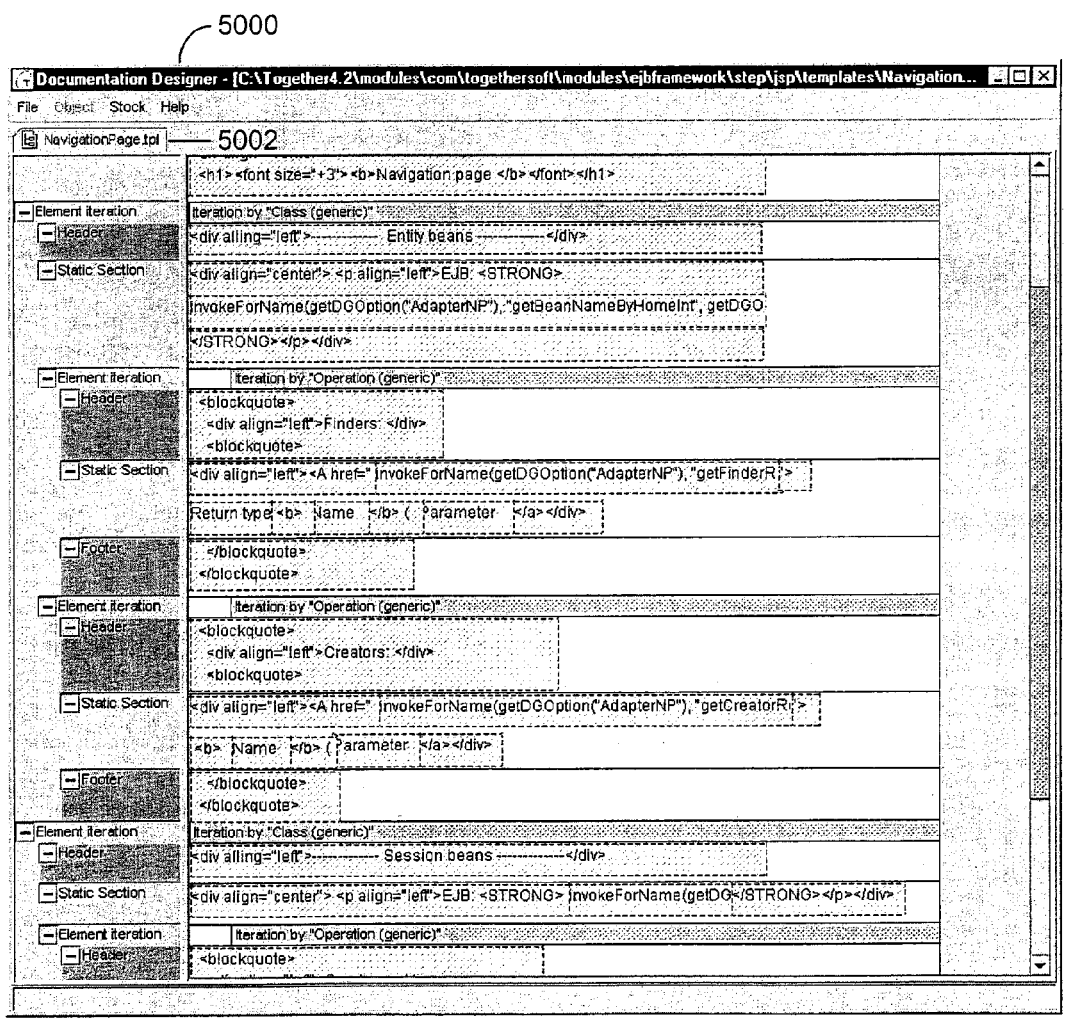
FIG. 50 depicts an exemplary JSP template used by the software development tool in FIG. 2 to generate a JSP file for testing the EJB.

Next, the software development tool generates the JSP files that may be used to test the EJB (step 3842). To generate the JSP files for testing the EJB, the software development parses a group of JSP templates stored on secondary storage device 2120 of computer 2102. Each group of JSP templates may contain HTML type tags that the software development tool parses to identify instructions for generating the group of JSP files. As shown in FIG. 50, one of the group of JSP templates includes a Navigation Page template 5002 that indicates to the software development tool that each EJB EntityBean and each EJB SessionBean in the project is to be identified and that the name of each EJB EntityBean and the name of each EJB SessionBean is to be shown in a JSP Navigation Page that is a first of the group of JSP files generated by the software development tool. The JSP Navigation Page is also the first of the group of JSP files that the Client Application 2152 may browse via browser 2154 when accessing the network address 4906 (i.e., the URL for browsing the JSP files). To identify each EJB EntityBean and each EJB SessionBean, the software development tool invokes TMM 200 for the respective name of each EJB EntityBean and each EJB SessionBean that is currently in TMM 200, and adds the respective names as indicated by the Navigation Page template to the JSP Navigation Page. The Navigation Page template 5002 also indicates to the software development tool to identify each ejbCreate( ) method associated with each EJB EntityBean and each EJB SessionBean in the project and provide an ejbCreate hyperlink in the JSP Navigation Page to allow a programmer to invoke each ejbCreate( ) method. As discussed below, when testing an EJB (i.e., EJB 3902) deployed by the software development tool, the programmer may actuate each ejbCreate hyperlink to invoke each ejbCreate( ) method to verify that an instance of the respective EJB is created.

In one implementation where the software development tool identifies a parameter for the ejbCreate( ) method (e.g., ejbCreate(String CustomerName)) in code corresponding to the EJB, the software development tool provides a default value in the respective JSP file to initialize the parameter when it is invoked via the JSP Navigation Page. The parameter (e.g., "CustomerName") corresponds to a field in the respective EJB EntityBean or EJB SessionBean that is mapped to an attribute field in a database (i.e., 2158 in FIG. 21). The field in the respective EJB (and thus the attribute field in the database table) is initialized to the default value when the instance of the EJB is created.

In another implementation, if the software development tool identifies that the ejbCreate( ) method has a parameter, the software development tool provides in the respective JSP file that the hyperlink for each ejbCreate( ) method in the JSP Navigation Page launch a JSP Creator Run Page. The JSP Creator Run Page is a second of the JSP files generated by the software development tool. The JSP Creator Run Page provides the programmer with the capability to provide an initial value for the parameter before the respective ejbCreate( ) method is invoked and run. To generate the JSP Creator Run Page, the software development tool parses a Creator Page template (not shown) that is a second of the group of JSP templates. The Creator Page template indicates to the software development tool to provide an entry box on the JSP Creator Page for accepting an initial value for the parameter, and to provide another hyperlink to invoke and run the respective ejbCreate( ) method with the parameter set to the initial value. In one implementation in which the Client Application 2152 is hosted with the software development tool on the local computer 2102, the software development tool may verify that an instance of the respective EJB was created and that the field of the respective EJB was initialized to the parameter by accessing and displaying the attribute field in the database (i.e., 2158).

The Navigation Page template 5002 also indicates to the software development tool to identify each finder method (e.g., a findByPrimaryKey( ) and ejbfind( ) methods) associated with each EJB EntityBean in the project. If the software development tool identifies a finder method, the software development tool provides a hyperlink in the JSP Navigation Page to launch a JSP Run Finder Page. The JSP Run Finder Page is a third of the group of JSP files generated by the software development tool. To generate the JSP Run Finder Page, the software development tool parses a Run Finder template (not shown) that is the third of the group of JSP templates. The software development tool provides a finder hyperlink in the JSP Run Finder Page for each finder method that is identified so that a programmer may invoke each finder method. The software development tool provides a finder entry box next to a respective finder hyperlink in the JSP Run Finder Page so that the programmer may enter a known value to pass as a parameter when the respective finder method is invoked.

In addition, the software development tool launches a JSP Bean Page, a fourth of the JSP files, when a return is received in response to completing the respective ejbCreate( ) method or in response to completing the respective finder method on the EJB deployed by the software development tool. Thus, the return from the respective method and the resulting launch of the JSP may confirm that an instance of the respective EJB was created by the ejbCreate( ) method or that the correct field was found for the finder method. The software development tool creates the JSP Bean Page in response to parsing a Bean Page template (not shown) that is the fourth of the JSP templates. The Bean Page template indicates to the software development tool to provide a business method hyperlink on the JSP Bean Page for invoking each business method that is identified in each EJB EntityBean or EJB SessionBean in the project. The programmer may invoke each business method hyperlink to test the operation of the respective business method. The software development tool also generates a JSP Operation Call Result Page that is the fifth of the JSP files. The software development tool provides a window on the JSP Operation Result Page for displaying an operation call result that corresponds to the return type of the respective business method that is invoked. Thus, the programmer is able to visually confirm the operation of the respective business method as further described below.

Figure 38D:
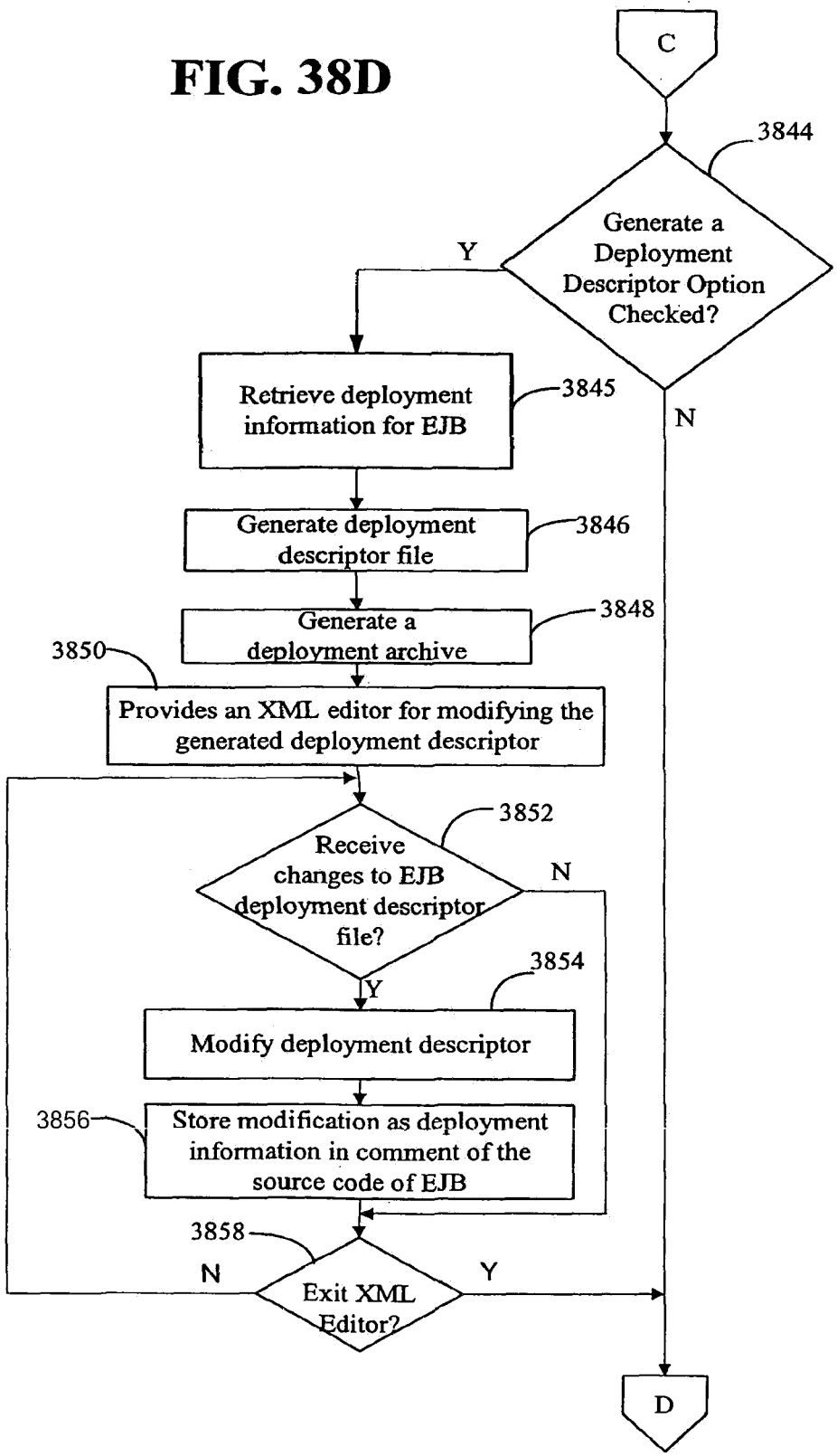

Turning to FIG. 38D, after generating the JSP files that may be used to test the EJB, the software development tool determines whether a generate deployment descriptor option from among the list of deployment options is selected (step 3844). If the deployment descriptor option is selected, the software development tool retrieves deployment information for the EJB (step 3845). As discussed below, deployment information may include a group of EJB properties needed to describe the EJB to the EJB Application Server 2148 where the EJB is to be deployed and run. The group of EJB properties may include a group of EJB specific properties and an EJB global assembly property. The group of EJB specific properties is associated with the respective EJB. The EJB global assembly property may apply to multiple elements (i.e., multiple methods for a respective EJB or multiple methods for multiple EJBs) that are described by the software development tool in a deployment descriptor file. As previously explained, a deployment descriptor file is a known file type for describing an EJB (i.e., the remote interface, the home interface, and the implementation class for EJB 3902) and any runtime properties for the EJB to the EJB Application Server 2148 where the EJB is to be deployed and run. The EJB group of properties is described below.

In one implementation, the software development tool may retrieve the EJB group of properties from a comment in code corresponding to the EJB. In this implementation, the group of EJB properties contained in the comment may initially have been received by the software development tool via an EJB property configuration file (not shown in figures) or via a programmer during the generation of the respective, EJB. For instance, as shown in FIG. 39, when EJB 3902 is selected on the graphical pane 3904, the programmer may use a pull-down menu (not shown in FIG. 41) to request that the software development tool display the group of EJB properties for the implementation class of EJB 3902. Upon receiving the request, the software development tool recognizes that the implementation class of EJB 3902 is an EJB SessionBean and then displays a session-type as one of the group of EJB properties for EJB 3902. The software development tool may allow the programmer to specify that the session-type have one of two values, stateful or stateless. An EJB SessionBean implementation class that has a stateful property maintains a conversational state. The conversational state is kept as long as a client is using the respective EJB SessionBean, allowing the client to carry on a "conversation" or continuing transaction with the respective EJB SessionBean. An EJB Session-Bean implementation class that has a stateless property does not maintain any conversational state, but uses data passed in parameters of an associated method call from a client to conduct a transaction for the client. Assuming the programmer has selected that EJB 3902 have a stateful property, the software development tool may store the following group of EJB properties as exemplary deployment information in a comment of code Java code JAVA™ corresponding to the implementation class of EJB 3902 (shown here as Java.™. code)

```
/**
 * @ejbHome <{hello.HelloHome}>
 * @ejbRemote <{hello.Hello}>
 * @ejbStateful Stateful
 */
``` public class HelloBean implements javax.ejb.SessionBean

By storing the group of EJB properties in a comment of code corresponding to the EJB, the software development tool may later retrieve the group of EJB properties as deployment information for the respective EJB in step 3845. Thus, by storing deployment information for the respective EJB within a comment of code corresponding to the EJB, the software development tool allows one programmer to develop one EJB while a second programmer independently develops another EJB. Later, using the software development tool, the deployment information for the respective one EJB may be combined with the deployment information for the respective other EJB to generate a deployment descriptor file that jointly describes both EJBs for deployment to an EJB Application Server (e.g., 2148). In a traditional approach to development and deployment of EJBs, a respective EJB does not contain its own deployment information so all programmers must coordinate their development to produce EJBs using a single deployment descriptor file. Typically, just a single programmer at a time may access the single deployment descriptor file produced under the traditional approach.

After deployment information for the EJB is retrieved, the software development tool generates a deployment descriptor file (step 3846). FIG. 51 depicts an exemplary deployment descriptor file 5100 generated by the software development tool for deploying EJB 3902. As shown in FIG. 51, the software development tool specifies a language type 5102 as "xml version ="1.0"" for the deployment descriptor file 5100 so that the EJB Application Server 2148 is able to recognize the language type in which the deployment descriptor is written. In one implementation, the software development tool parses a deployment descriptor configuration file (not shown) associated with the EJB target application server 4002 to identify the language type 5102 for generating the deployment descriptor file 5100.

The software development tool also specifies within the deployment descriptor file 5100 a Document Type Definition (DTD) file 5104 and a URL 5106 for locating the DTD 5104. The DTD 5104 is used by the EJB target application server 4002 to ensure that the deployment descriptor file 5100 adheres to the correct convention for describing EJB 3902. To adhere to the correct convention implies that a deployment descriptor file is organized with the right tags defined in the DTD 5104 for identifying a SessionBean or an EntityBean. In one implementation, as shown in FIG. 51, the software development tool may parse the deployment descriptor configuration file to identify DTD 5104 and URL 5106 for the EJB target application server 4002.

Adhering to the convention identified in DTD 5104 to describe EJB 3902, the software development tool inserts a beginning and ending root element tag (e.g., <ejb-jar> 5108 and </ejb-jar>5110) within the deployment descriptor file 5100 so that the EJB target application server 4002 is able to find the respective data that describes EJB 3902. The software development tool also inserts a beginning and ending enterprise-beans tag (e.g., 5112 and 5114) within the deployment descriptor file 5100 so that the EJB target application server 4002 is able to find the description of EJB 3902 from amongst all EJBs that are to be deployed to the EJB target application server. In addition, to describe EJB 3902, the software development tool inserts a beginning and ending session tag (e.g., 5116 and 5118) within the deployment descriptor file 5100. If EJB 3902 were an EntityBean, then the software development tool would instead insert a beginning and ending entity tag. In one implementation, the software development tool may recognize that EJB 3902 is to be described as a Session-Bean by invoking TMM 200 for an indication that EJB 3902 is a SessionBean as opposed to an EntityBean. In another implementation, the software development tool may recognize that EJB 3902 is a SessionBean by determining that EJB 3902 does not have an associated EJB Primary Key Class, which is required for an EntityBean to be deployed. In yet another implementation, the software development tool may recognize that EJB 3902 is a SessionBean via the deployment information written in the comment of the remote interface, home interface, or implementation class for EJB 3902. To describe EJB 3902, the software development tool also identifies specific properties from the retrieved group of EJB properties for EJB 3902 and then inserts the specific properties between respective beginning and ending tags as defined in DTD 5104. For example, EJB name 5120, a home interface name 5122, a remote interface name 5124, and an implementation class name 5126 are each a specific property within the group of EJB properties for EJB 3902 that the software development tool has retrieved from a respective comment of code corresponding to the home interface, the remote interface, or the implementation class for EJB 3902. To fully describe an EntityBean, the software development tool may also insert a primary key class name (not shown) as one of the specific properties for the respective EJB. As shown in FIG. 51, the software development tool may also identify and insert a session-type 5126 and transaction-type 5128 as specific properties of the EJB 3902.

To identify an EJB global property from the retrieved group of EJB properties, the software development tool may also insert an assembly-descriptor identification 5130 that identifies to the EJB Application Server the EJB global property, such as a security role required by a client in order to access a method(s) of EJB 3902 (no security role shown in FIG. 51). In addition, the assembly-descriptor identification 5130 generated by the software development tool within the deployment descriptor file 5100 may also specify a business system transaction attribute 5132 as an EJB global property to be associated with a group of methods at runtime. For example, a programmer may use the software development tool to develop and deploy an EJB with business logic to represent data within the database 2158 as an automatic teller machine (ATM) to a client application. This ATM EJB (not shown in figures) may have a withdrawal method allowing the client to make a withdrawal from a client's account on the database 2158. The ATM EJB may also have an overdrawn method that is run with the withdrawal method to ensure that the client's account has sufficient funds for the withdrawal transaction. Thus, the programmer may indicate to the software development tool that the withdrawal method and the overdrawn method are to have a business system transaction attribute that indicates that these transactions are to be monitored so that they are completed together.

While the example shown in FIG. 51 indicates that EJB 3902 is not being deployed with any other EJBs, one skilled in the art will appreciate that the software development tool is able to describe multiple EJBs in a deployment descriptor file when multiple EJBs are to be deployed. Similarly, one skilled in the art will also appreciate that the software development tool is capable of identifying other EJB specific property tags of the group of EJB specific property tags to insert within a beginning and ending session (i.e., between session tags 5116 and 5118 for EJB 3902) or entity tags to fully describe a respective EJB. Finally, one skilled in the art will also appreciate that the software development tool is capable of identifying other EJB global properties within an assembly-descriptor identification to fully describe a respective EJB.

As depicted in FIG. 38D, the software development tool also generates a deployment archive (step 3848). In one implementation, the deployment archive includes a directory structure that is used by the software development tool to store a deployment descriptor file as well as compiled code (e.g., java executable code with ".class" extension) for all EJBs identified within the deployment descriptor file that are to be deployed to the EJB Application Server 2148. In this implementation, the deployment archive may be compressed by the software development tool, using a known compression tool such as the "Java™ Archive (JAR)" tool or the "WinZip" tool, to form a compressed archive file (e.g., Java™ archive (JAR) file). In this implementation, the software development tool, as described below, deploys or transfers the compressed archive file to EJB Application Server 2148. In another implementation, the software development tool may transfer a path to the deployment archive so that the EJB Application Server 2148 is able to retrieve the files with the directory archive after creating a corresponding directory structure in memory or secondary storage of the EJB Application Server 2148. Thus, the deployment archive for deploying EJB 3902 includes the deployment descriptor 5100 and code compiled for file EJB 3902.

Figure 52:
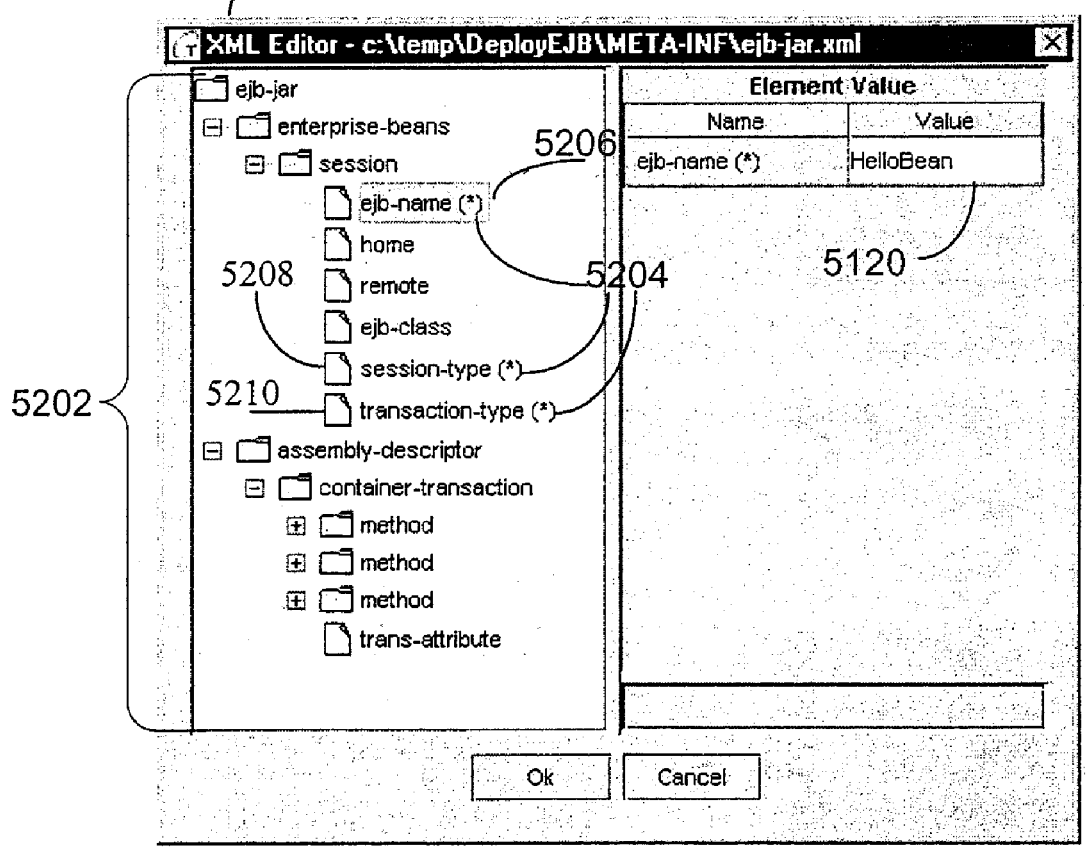
FIG. 52 depicts an exemplary user interface displayed by the software development tool in FIG. 2, where the user interface displays the deployment descriptor archive file for the EJB in an XML editor provided by the software development tool.

Next, the software development tool provides an XML editor for viewing and modifying the generated deployment descriptor (step 3850). As shown in FIG. 52, the software development tool provides an XML editor 5200 that the programmer may use to indicate a deployment descriptor modification to the software development tool. When providing the XML editor in step 3850, the software development tool also automatically displays the structure of the deployment descriptor file 5100 as stored in the directory archive (graphically depicted as 5202). The software development tool provides an edit cue 5204, such as an asterisk (i.e., "*"), next to an element within the deployment descriptor file 5100 that the programmer may modify and have a change stored back in the source code of EJB 3902 as discussed below. For example, as shown in FIG. 52, the programmer may select ejb-name 5206, session-type 5208, or transaction-type 5210 to indicate a change to the respective value that the software development tool is to store in the deployment descriptor file 5100. As shown in FIG. 52, after selecting ejb-name 5206, the software development tool allows the programmer to view and change EJB name 5120, one of the specific properties of EJB 3902. Thus, the software development tool provides the programmer with an opportunity to inspect and modify elements of the deployment descriptor file 5100 before the deployment archive is transferred to the EJB Application Server 2148 and before EJB 3902 is subsequently deployed and run.

Figure 53:
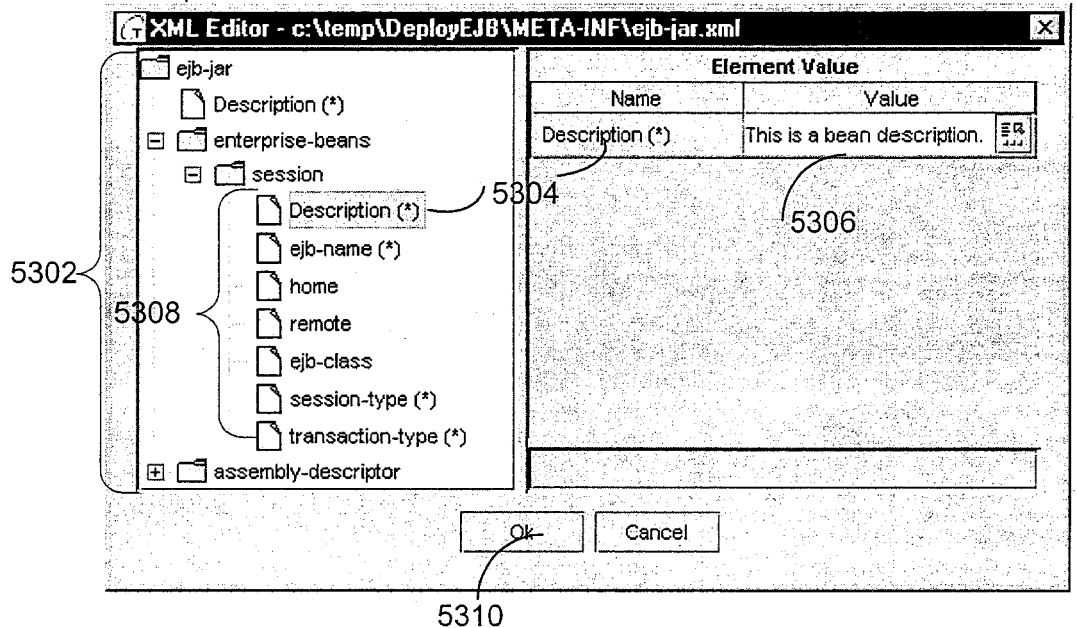
FIG. 53 depicts an exemplary user interface displayed by the software development tool in FIG. 2, where the user interface displays a modification to the deployment descriptor archive file received by the software development tool.

Having provided the XML editor for modifying the generated deployment descriptor, the software development tool determines whether a change to the EJB deployment descriptor file 5100 has been received (step 3852). If the software development tool has received a change, the software development tool modifies the EJB deployment descriptor file 5100 to reflect the change (step 3854). Assuming that the software development tool identifies a description property as one of the retrieved group of EJB properties retrieved in step 3845, the software development tool displays, in FIG. 53, the description property 5304 as one of the elements in the deployment descriptor file (graphically depicted as 5302) that may be modified by the programmer. The description property 5304 may be used to convey the description and behavior of the respective EJB to a programmer or administrator that may be using a tool other than the software development tool to view the deployment descriptor. As shown in FIG. 53, the software development tool allows the programmer to indicate that the description property 5304 be changed to the value 5306, "This is a bean description." In one implementation, the software development tool searches the deployment descriptor file after the beginning session tag 5116 for defined description tags, such as <description>. . . </description>, and replaces the description property between those tags with the changed value 5306, "This is a bean description."

Figure 54:
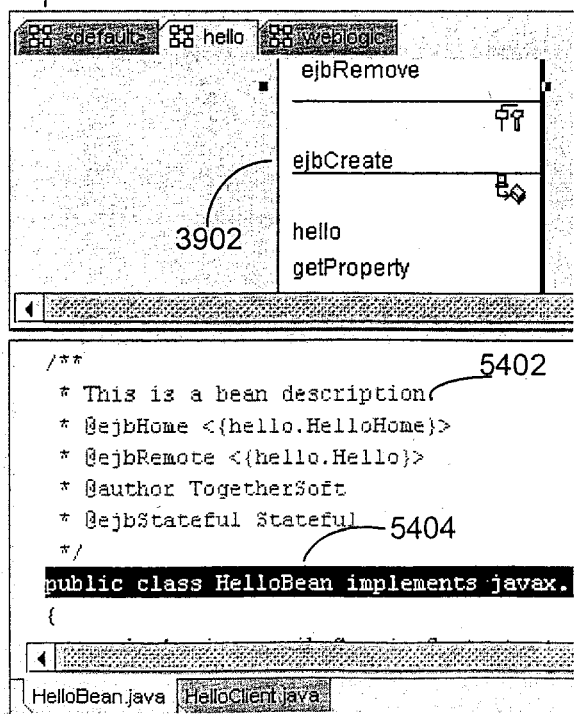
FIG. 54 depicts an exemplary user interface displayed by the software development tool in FIG. 2, where the user interface displays the modification to the deployment descriptor archive file as an addition generated by die software development tool to the source code of the EJB.

The software development tool also stores the change to the deployment descriptor file as deployment information in a comment of code corresponding to the EJB (step 3856). Thus, the software development tool is able to associate a change to a deployment descriptor file with a change to the deployment information for a respective EJB. For example, as shown in FIG. 53, die software development tool allows the programmer to change the description property 5304 in the deployment descriptor file (graphically depicted as 5302) to reflect the value 5306, "This is a bean description." As shown in FIG. 54, the software development that recognizes that the description property 5304 is also one of the group of EJB properties (graphically depicted as 5308) for EJB 3902, and stores the change to the description property 5304 as deployment information 5402 in a comment of code corresponding to the implementation class 5404 of EJB 3902. Thus, the software development tool is able to reflect a change to the deployment descriptor file as a change to the deployment information for a respective EJB to maintain accurate deployment information in the likely event that the software development tool is used to re-deploy the EJB.

If the software development tool does not receive a change to the EJB deployment descriptor file (step 3858), the software development tool determines whether to exit the XML editor. As shown in FIG. 53, the programmer may indicate to the software development tool to exit the XML editor by actuating a button 5310 on the XML editor screen 5300.

Figure 38E:
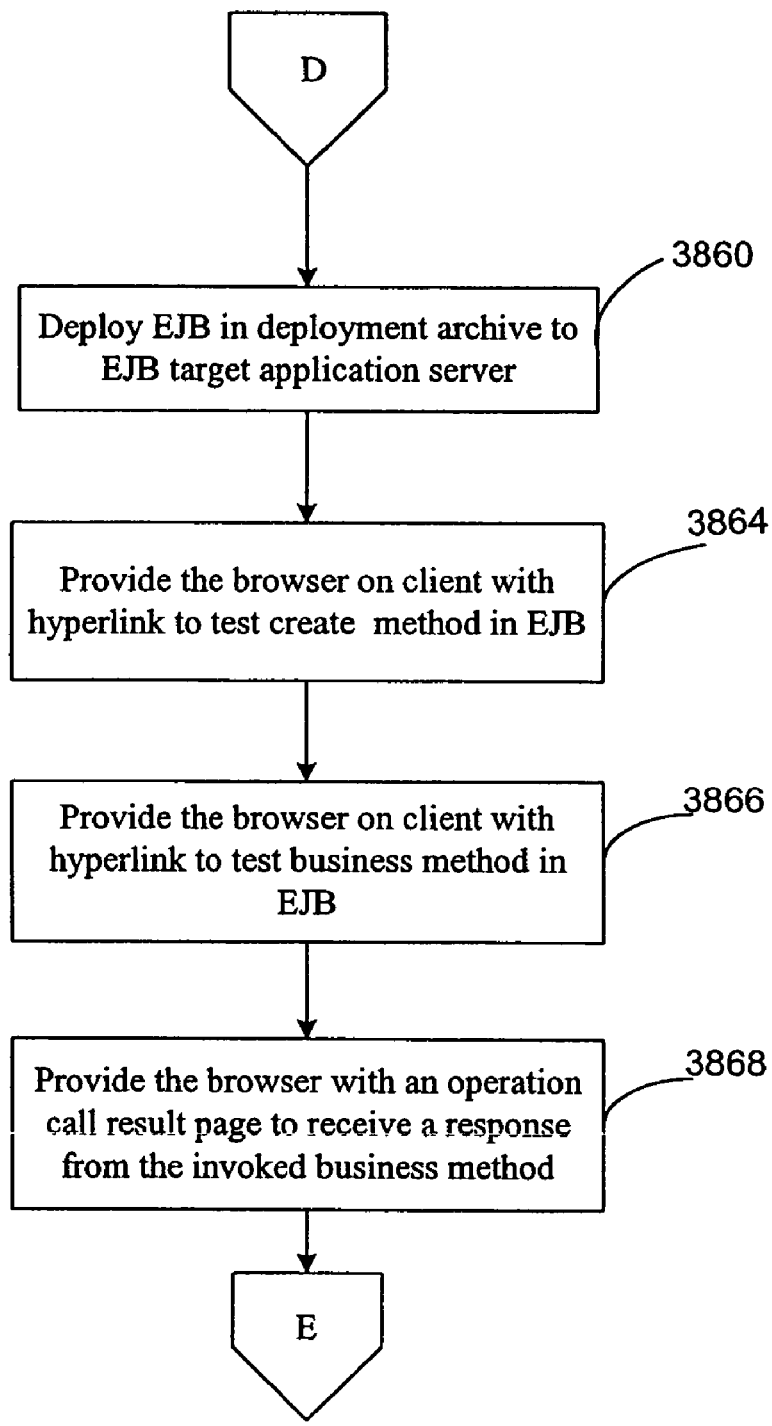

The software development tool deploys the EJB in the deployment archive to the EJB target application server (step 3860 in FIG. 38E). In one implementation for deploying the EJB in the deployment archive, the software development tool transfers the deployment archive to the EJB Application Server 2148 via a pre-defined message on network 2110. If the EJB is to be hot deployed, the pre-defined message may be transferred by the software development tool to the address port 4302 of the EJB Application Server 2148. If the EJB is not to be hot deployed or the server host identification 4808 indicates that the EJB Application Server 2148 is on a remote computer requiring access authorization, the software development tool may use access information 4802, in FIG. 48, to transfer a system password 4804 with the pre-defined message to a pre-authorized address port (not shown in figures) that the programmer has identified to the software development tool. The pre-authorized port is one where a privilege has been granted by the remote computer for the software development to write and store the deployment archive. In this implementation, the EJB Application Server 2148 or another application is attached to the pre-authorized port and is configured to respond to the pre-defined message. Once the pre-defined message is received, the EJB Application Server 2148 may decompress the deployment archive and access the deployment descriptor file 5100 packaged within the deployment archive.

In another implementation where the server host identification 4808 indicates that the EJB Application Server 2148 is hosted locally with the software development tool, the software development tool may indicate to the EJB Application Server 2148 where the deployment archive is located on the local computer without using a system password 4804. In this implementation, the EJB Application Server 2148 may then access the deployment descriptor file 5100 contained within the deployment archive.

The EJB Application Server 2148, when accessing the deployment descriptor file 5100, identifies that the DTD 5104 located at the URL 5106 is to be used to interpret the deployment descriptor file 5100. By using the DTD 5104 to interpret the deployment descriptor file 5100, the EJB Application Server 2148 learns about EJB 3902 (e.g., EJB 3902 is a SessionBean with properties as shown in FIG. 51) and how it is to be managed at runtime (e.g., session-type indicates EJB 3902 has stateful transaction state). The EJB Application Server 2148 finds within the deployment archive compiled code that correlates to the home interface, the remote interface, and the implementation class of the EJB 3902 identified in the deployment descriptor file 5100. In addition, the EJB Application Server 2148 has the container 2150 implement the home interface and the remote interface for EJB 3902 so that the container 2150 may respond to invocation of a method from the Client Application 2152. Next, the software development tool provides the browser on the Client Application with a hyperlink to test a create method for the EJB 3902 (step 3864). In one implementation where the browser resides locally with the software development tool on computer 2102, the software development tool provides the browser (i.e., browser 2154 in FIG. 21) with the hyperlink to test the create method by informing the browser of the network address 4906 (or URL) for browsing the JSP files generated by the software development tool in performing step 3842 of the process shown in FIG. 38C. In this implementation, the software development tool may inform the browser 2154 of the network address 4906 by writing the network address 4906 in a script within a browser startup configuration file. The script is written by the software development tool in a form that is consistent with the application program interface (API) of the browser, such as the known API for Netscape Navigator™ browser.

In another implementation where browser 2154 resides on remote computer 2106, the software development tool may inform the browser 2154 of the network address 4906 for browsing the JSP files by sending a pre-defined message containing the network address 4906 to a pre-defined e-mail address on remote computer 2106. Adhering to standard e-mail protocols, another programmer or a customer using the remote computer 2106 may then be informed of the network address 4906 in response to the pre-defined message being delivered to the pre-defined e-mail address on remote computer 2106. Thus, the other programmer or the customer is then able to manually enter the network address 4906 into the browser 2154 in order to remotely test EJB 3902 or click on the address in typical e-mail clients to automatically invoke the JSP page.

Figure 55:
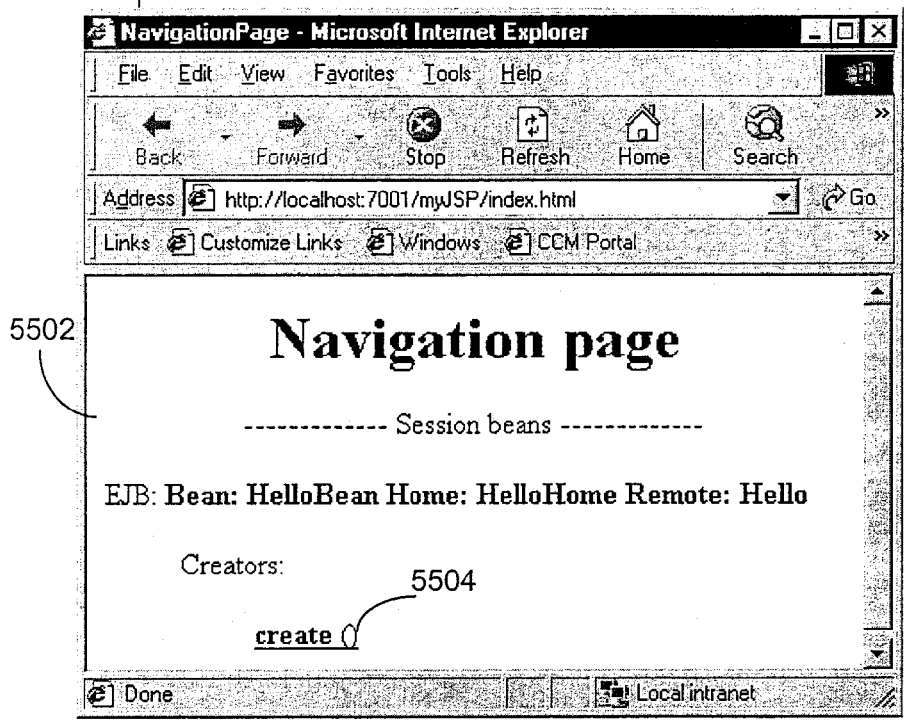
FIG. 55 depicts an exemplary JAVA™ Server Page generated by the software development tool for interfacing to the EJB from a Client Application.

For example, as shown in FIG. 55, when the browser 2154 accesses the network address 4906, the browser 2154 is provided with the JSP Navigation Page 5502 as identified in the first of the group of JSP files ("the JSP Navigation file") generated by the software development tool to test EJB 3902. The JSP Navigation Page 5502 has a hyperlink 5504 that invokes the create method for the EJB 3902. In response to a programmer selecting the create method hyperlink 5504, the browser sends a message via network 2110 to the network address 4906 to invoke the respective create method for EJB 3902. In this situation, code within the JSP Navigation file that corresponds to the create method is executed, causing the EJB Application Server 2148 to create an instance of EJB 3902 in container 2150. In one implementation, the software development tool may provide that the browser 2154 is to be linked to the next file in the group of JSP files if a response is received by the JSP Navigation file that indicates that the EJB Application Server 2148 has completed the create method. In this implementation, the programmer is able to confirm that the instance of EJB 3902 has been created in container 2150.

Figure 56:
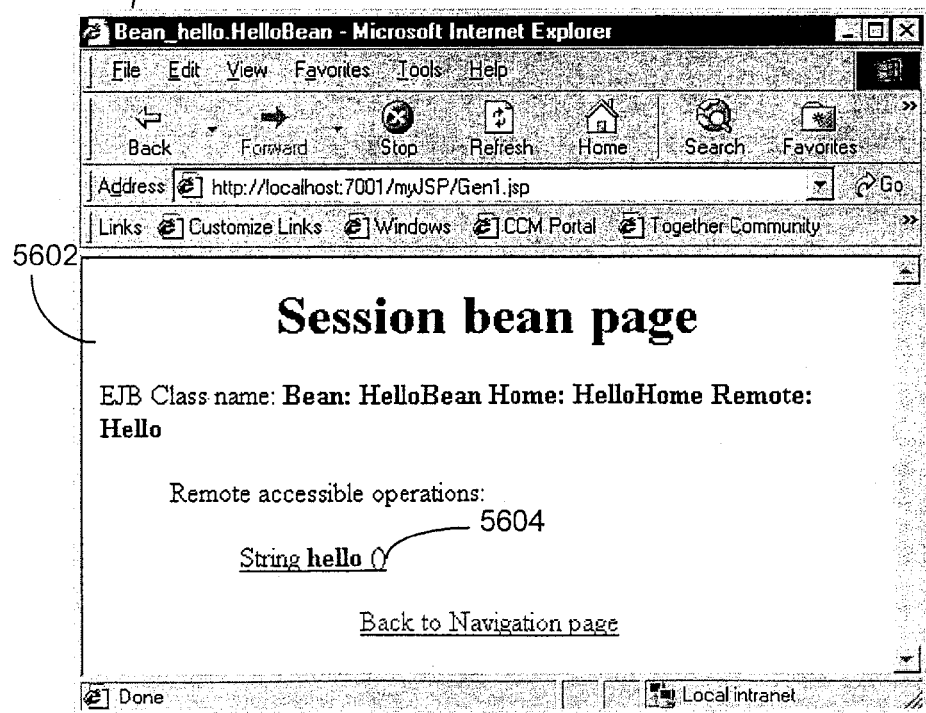
FIG. 56 depicts an exemplary JAVA™ Server Page generated by the software development tool for invoking the EJB to perform a business method from a client server application.

As shown in FIG. 38E, software development tool provides the browser on the Client Application 2152 with a hyperlink to test a business method in the EJB (step 3866). FIG. 56 depicts a JSP bean page (i.e., Session bean page 5602) that is displayed on screen 5600 by the browser 2154 in response to a programmer invoking the create method hyperlink 5504 in FIG. 55. The Session bean page 5602 is associated with another of the group of JSP files ("the JSP Session bean file") generated by the software development tool to test EJB 3902. The Session bean page 5602 has a hyperlink 5604 that invokes the business method "String hello ( )" in EJB 3902. In response to a programmer selecting the business method hyperlink 5604, the browser 2154 sends a message via network 2110 to the network address 4906 to invoke the respective business method for EJB 3902. In this situation, code within the JSP Session bean file that corresponds to the business method is executed, causing the EJB Application Server 2148 via container 2150 to invoke the respective business method in the EJB 3902.

Figure 57:
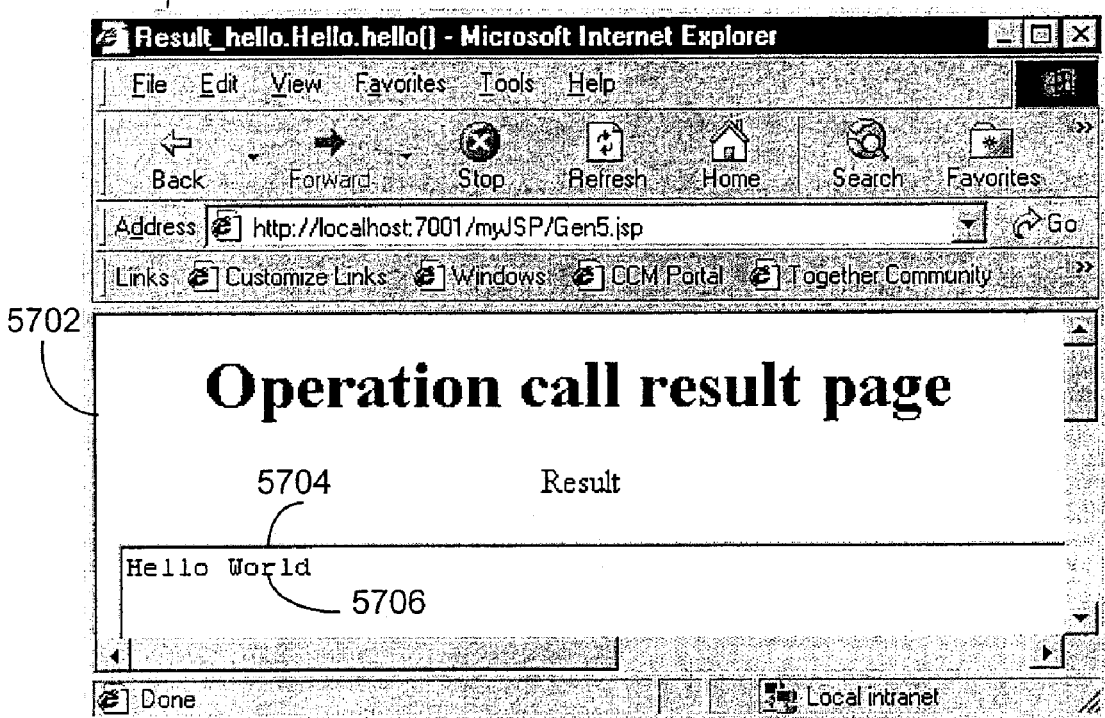
FIG. 57 depicts an exemplary JAVA™ Server Page generated by the software development tool to reflect a result from the EJB performing the business method.

As shown in FIG. 38E, software development tool provides the browser 2154 on the Client Application 2152 with an Operation call result page to receive a response from the invoked business method (step 3868). FIG. 57 depicts an Operation call result page 5702 that is displayed on screen 5700 by the browser 2154 in response to a programmer invoking the business method hyperlink 5604 in FIG. 56. The Operation call result page 5902 is associated with another of the group of JSP files ("the JSP result File") generated by the software development tool to test EJB 3902. The Operation call result page 5702 has a window 6004 where the response from the invoked business method hyperlink 5604 (i.e., "String hello ( )") in EJB 3902 may be displayed. In the example depicted in FIG. 57, the programmer is able to confirm that the instance of EJB 3902 has correctly performed the invoked business method hyperlink 5604 as the response "Hello World" 5706 is displayed in the window 5704 as expected.

Figure 38F:
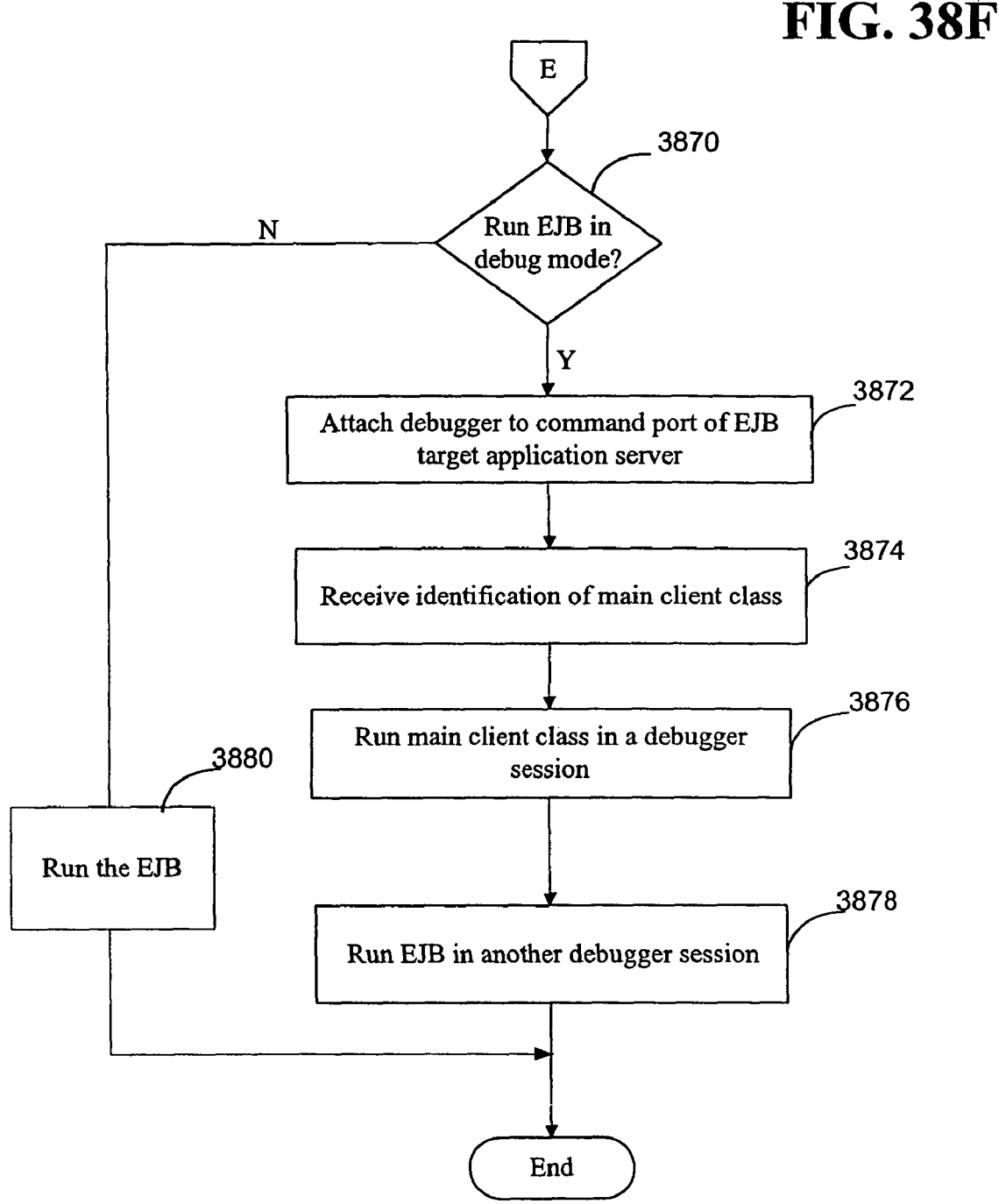
Figure 41:
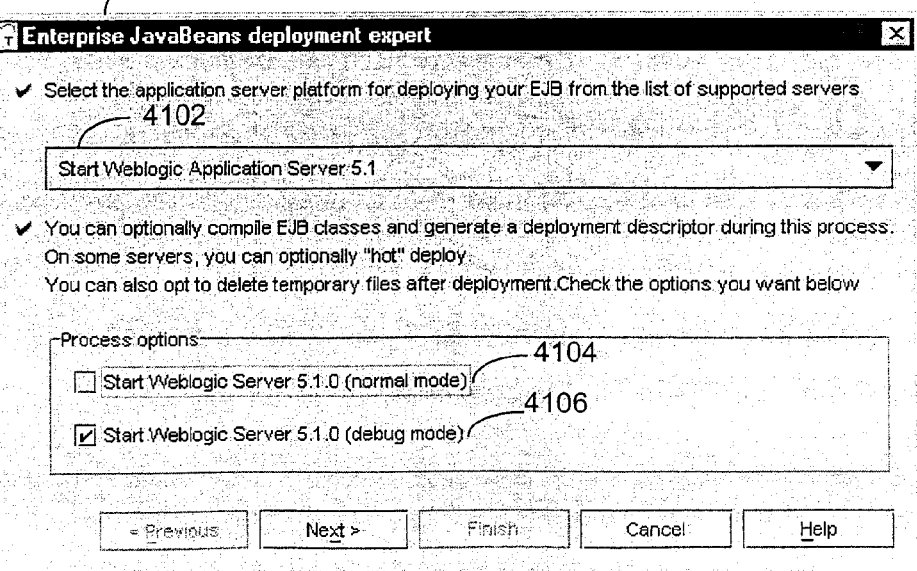
FIG. 41 depicts an exemplary user interface displayed by the software development tool in FIG. 2, where the user interface displays a hot deployment request received by the software development tool.

Turning to FIG. 38F, the software development tool also determines whether to run the EJB in debug mode (step 3870). In one implementation, the software development tool determines that the EJB is to be run in debug mode when the EJB has been hot deployed and when the EJB Application Server 2148 operational mode is set to debug mode 4106 as illustrated in FIG. 41. In another implementation, the software development tool may determine that the EJB is to be run in debug mode in response to receiving a debug request (not shown in figures). For example, once EJB 3902 is deployed by the software development tool, the programmer may indicate the debug request to the software development tool by making a respective selection from a pull-down menu, actuating a pre-defined button on a user interface displayed by the software development tool, or by any other known data input technique.

Figure 58:
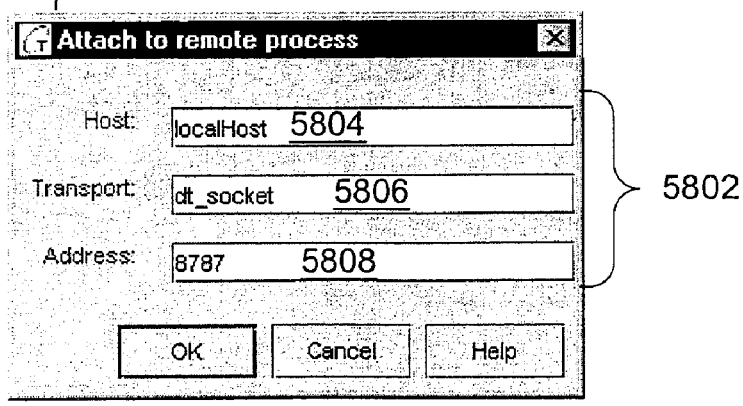
FIG. 58 depicts an exemplary user interface displayed by the software development tool in FIG. 2, where the user interface displays a communication protocol and network address for a debugger controlled by the software development tool to communicate with the EJB target application server.

If the EJB is to be run in debug mode, the software development tool attaches a debugger module to the command port of EJB target application server (step 3872). The debugger module ("debugger") is one of the modules 704 in FIG. 7 that are included in the software development tool. The debugger of the software development tool allows a programmer to set breakpoints in source code corresponding to the deployed EJB as well as set breakpoints in a client test program that resides with the software development tool in memory 2112 of computer 2102. By setting breakpoints, the software development tool enables the programmer to stop the execution of the deployed EJB or the client program at any line of source code corresponding to the deployed EJB or the client program, respectively. In addition, the programmer, by using the debugger of the software development tool, may execute one of a group of commands that control the execution of the deployed EJB or the client program. The group of execution control commands includes "Run", "Pause," "Continue", or "Stop." The debugger may automatically complete an execution control command (e.g., "Stop") to support trapping on a breakpoint specified by the programmer. In one implementation, the debugger of the software development tool may implement the Java™ Platform Debugger Architecture (JPDA) to enable the debugger to support the functionality described above and to run portably across platforms and across different implementations of the JAVA™ Virtual Machine. The software development tool attaches the debugger to the command port of the EJB target application server 4002 to enable the debugger to complete an execution control command to "Run," "Pause," "Continue," or "Stop" the deployed EJB. As shown in FIG. 58, to attach the debugger to the command port of the EJB Application Server 2148, the software development tool receives attachment information 5802 that includes a host identification 5804, a transport protocol 5806, and a remote process port address 5808. The host identification 5804 indicates to the software development tool if the process that is to be attached to the debugger (e.g., the EJB Application Server 2148) resides locally with the software development tool on computer 2102 or remotely oil computer 2104, 2106, or 2108. The transport protocol 5806 identifies to the software development tool which standard communication transport protocol the debugger is to use to format and send an execution control command to the EJB Application Server 2148. The remote process address port 5808 indicates to the software development tool the command port address to send an execution control command. In one implementation in which EJB 3902 is hot deployed, the software development tool receives the address port 4302, in FIG. 45, as a default for the remote process address port 5808. As previously described, the address port 4302 is the command port for the EJB Application Server 2148 specified by the programmer.

Figure 59:
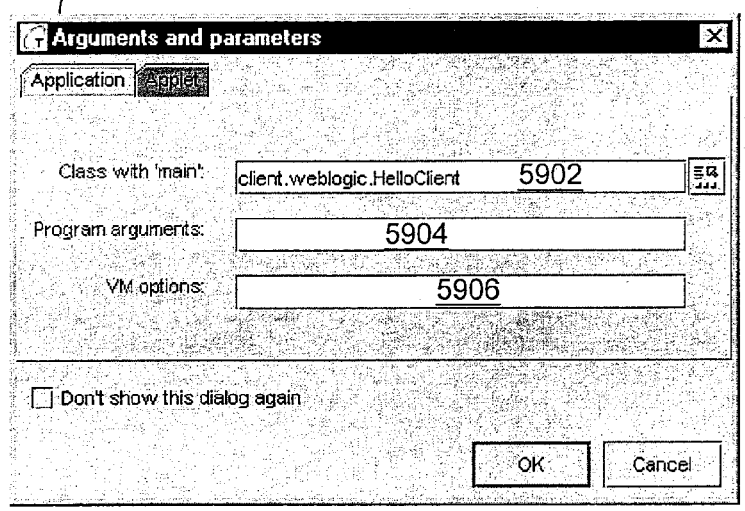
FIG. 59 depicts an exemplary user interface displayed by the software development where the user interface displays a client application to be run by the software development tool in debug mode.

Returning to FIG. 38F, the software development tool receives an identification of a main client class (step 3874). FIG. 59 depicts an exemplary user interface 5900 displayed by the software development tool for receiving the identification of the main client class 5902. As shown in FIG. 59, the software development tool may also receive via user interface 5900 a client test program argument 5904 and a JAVA™ Virtual Machine option 5906. The identification of the main client class indicates to the software development tool the starting point for a client test program to be used by the debugger for testing the deployed EJB (i.e., EJB 3902). The client test program argument 5904 indicates to the software development tool a parameter, such as "username," that is required to run the main client class 5902. The JAVA™ Virtual Machine option 5906 indicates to the software development tool a configuration parameter to be passed to the JAVA™ Virtual Machine to support executing the client test program. For example, the configuration parameter may indicate a size of memory that the JAVA™ Virtual Machine should allocate to support executing the client test program.

In one implementation, the main client class 5902 is identified to the software development tool via a client test program default. The software development tool may receive the client test program default by searching each source code file in the project for a class that implements the home interface and the remote interface for the deployed EJB (i.e., EJB 3902). In addition, if a class is found that implements the home interface and the remote interface for the deployed EJB (i.e., EJB 3902), the software development tool searches the class for a method called "main." In another implementation, the programmer may indicate to the software development tool the identification of the main test class 5902.

In one implementation, the client test program corresponding to the main test class 5902, "client.weblogic.HelloClient," implements the home interface and the remote interface for EJB 3902 so that the client test program may test a method in EJB 3902 by invoking the respective signature for the method.

Figure 60:
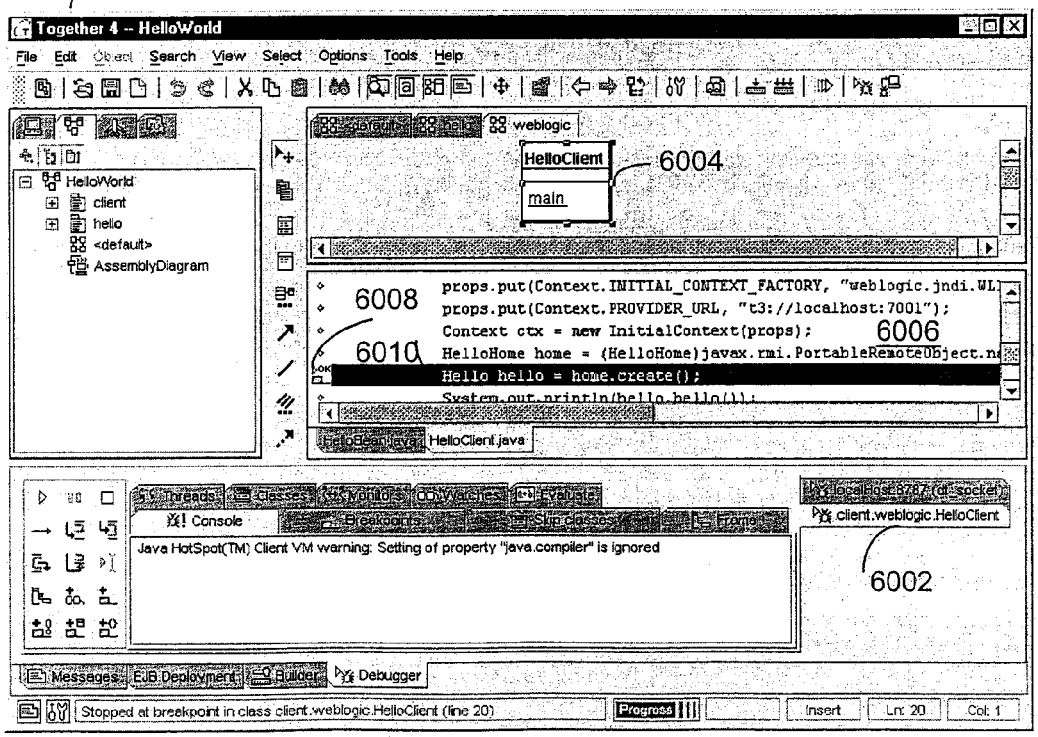
FIG. 60 depicts an exemplary user interface displayed by the software development tool for debugging the client application.

Next, the software development tool runs the main client class in a debugger session (step 3876). The debugger of the software development tool may support multiple debugger sessions. In general, a debugger session corresponds to the debugger controlling the execution of one program independently from another program that may be executing under the control of the debugger in another session. As explained below, one program executing in one debugger session may impact another program executing in another debugger session. The impact may or may not be expected by the programmer. Thus, to assess the impact of the one program on the other program, the software development tool allows the programmer to set one or more breakpoints in the one program associated with the one debugger session and to set one or more different breakpoints in the other program associated with the other debugger session. By providing simultaneous debugging of program logic that spans from the Client Application code (1$^{st}$ tier) to the EJB code on the EJB Application Server, the software development tool saves the programmer the time and effort of testing the same code using conventional, manual techniques. For example, FIG. 60 depicts an exemplary user interface 6000 displayed by the software development tool in response to receiving the identification of the main client class 5902, where the user interface 6000 displays the client test program under the control of the debugger in one debugger session. As shown in FIG. 60, the software development tool identifies that the one debugger session displayed is associated with the main client class via a first debugger session indicator 6002. In this example, the client test program contains just the main client class (graphically depicted as 6004). Source code corresponding to the main client class 6004 is displayed by the software development tool in the textual pane 6006. Using any known data input technique, the programmer may indicate to the debugger that a breakpoint (e.g., 6008) be set on a respective line of source code (e.g., 6010) corresponding to the main client class 6004. In the example shown in FIG. 60, the line of source code 6010 corresponds to a create method invocation for the EJB 3902 that the software development tool has deployed to EJB Application Server 2148. The programmer may then indicate to the debugger to execute a command to run the main client class in the one debugger session to test the operation of the client application program.

Figure 61:
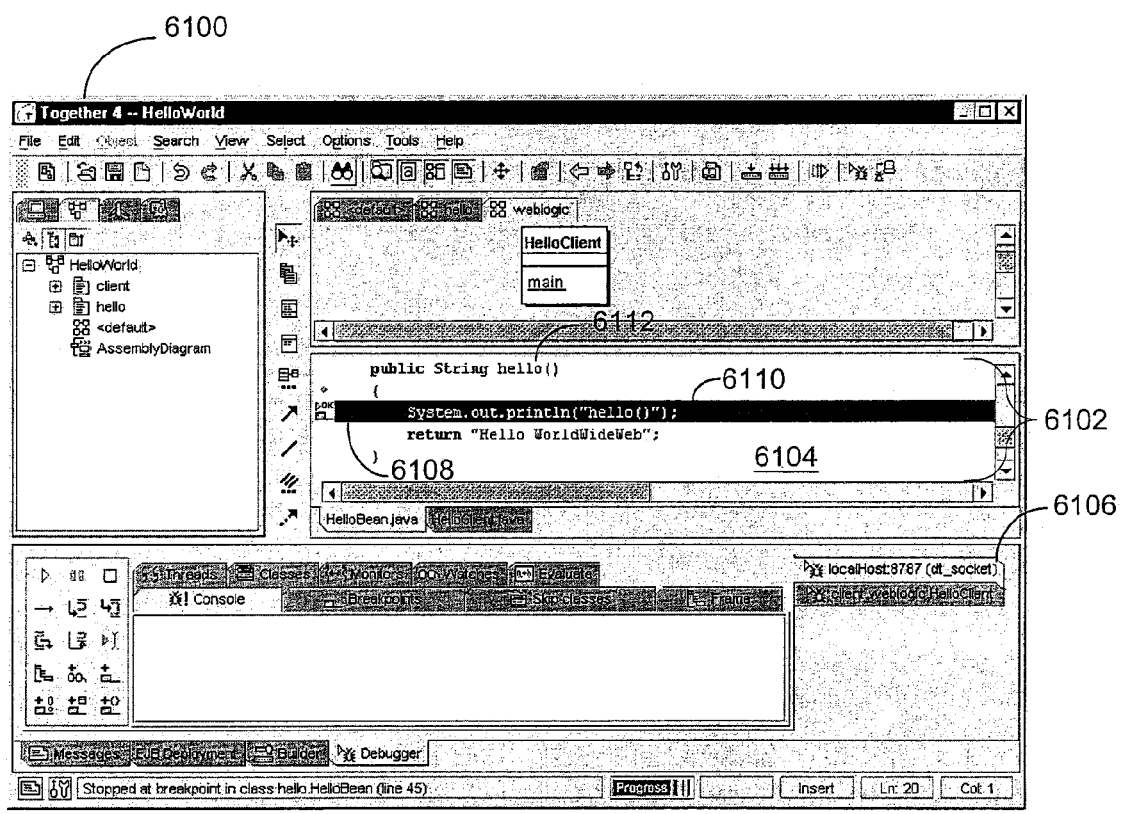
FIG. 61 depicts an exemplary user interface displayed by the software development tool in FIG. 2 for debugging the EJB on the target application server.

After initiating execution of the client test program in one debugger session, the software development tool also runs the EJB in another debugger session (step 3878). FIG. 61 depicts an exemplary user interface 6100 displayed by the software development tool, where the user interface 6100 displays source code 6102 corresponding to EJB 3902 in the textual pane 6104. As shown in FIG. 61, the software development tool identifies that the other debugger session displayed in user interface 6100 is associated with EJB 3902 via a second debugger session indicator 6106. In this example, the programmer may indicate to the debugger that a breakpoint (e.g., 6108) be set on a respective line of source code (e.g., 6110) corresponding to EJB 3902. In the example shown in FIG. 61, the line of source code 6110 corresponds to a business method "String hello ( )" 6112 in EJB 3902. The programmer may then indicate to the debugger to execute a command to run EJB 3902 in the other debugger session to test the operation of EJB 3902. The software development tool via the debugger allows the programmer to transfer between the one debugger session associated with the main client class and the other debugger session associated with EJB 2104. Thus, the software development tool allows the programmer to independently control the operation of the main test client and EJB 3902 in order to assess the impact of one on the operation of the other and, ultimately, to confirm the operation of both programs.

If the EJB is not to run in debug mode, the software development tool initiates execution of the EJB in normal mode (step 3880). The software development tool may initiate execution of the EJB in normal mode by sending a start command to the EJB Target Application Server at a predefined network address, such as network address 4302 in FIG. 43. As one skilled in the art will appreciate, the software development tool is able to store, retrieve, and send a start command that is recognizable by the EJB Target Application Server specified by the programmer. Thus, in this situation, the programmer is able to test code for a client application against one or more deployed EJBs without running the EJB Target Application Server in debug mode. The EJBs may have previously been developed and tested by the programmer using the software development tool or may have been provided by a known vendor so additional debugging of the EJBs may not be required.

While various embodiments of the present invention have been described, it will be apparent to those of ordinary skill in the art that many more embodiments and implementations are possible that are within the scope of this invention. Accordingly, the invention is not to be restricted except in light of the attached claims and their equivalents.

What is claimed is:

1. A computer-readable medium containing instructions for controlling a data processing system to perform a method, the method comprising receiving a request to generate a distributed computing component;

generating code corresponding to the distributed computing component at a computer, the code containing a method having one type of a plurality of available types;

displaying a diagrammatic graphical representation of the code corresponding to an EntityBean associated with the distributed computing component, the diagrammatic graphical representation including a first set of separately delineated display areas, wherein the first set of separately delineated display areas includes a delineated display area for each of the plurality of available types associated with the EntityBean; and displaying another diagrammatic graphical representation of the code corresponding to a SessionBean associated with the distributed computing component, the another diagrammatic graphical representation including a second set of separately delineated display areas, wherein the second set of separately delineated display areas includes a delineated display area for each of the plurality of available types associated with the SessionBean, wherein the diagrammatic graphical representation and the another diagrammatic graphical representation are displayed simultaneously.

2. The computer-readable medium of claim 1, wherein the method further comprises:

displaying a symbol in the separately delineated display area, wherein the symbol indicates the one type displayed in the display area.

3. The computer-readable medium of claim 1, wherein the diagrammatic graphical representation of the code includes another separately delineated display area for a reference type in the code.

4. The computer-readable medium of claim 1, wherein the one type is a create method type.

5. The computer-readable medium of claim 1, wherein the one type is a finder method type.

6. The computer-readable medium of claim 1, wherein the one type is a business method type.

7. The computer-readable medium of claim 1, wherein the distributed computing component is a SessionBean.

8. The computer-readable medium of claim 1, wherein the distributed computing component is an EntityBean.

9. A data processing system comprising:

a memory device further comprising a program that receives a request to generate a distributed computing component, that generates code corresponding to the distributed computing component, wherein the code contains a method having one type of a plurality of available types, that displays a diagrammatic graphical representation of the code corresponding to an EntityBean associated with the distributed computing component, the diagrammatical representation including a first set of separately delineated display areas, wherein the first set of separately delineated display areas includes a delineated display area for each of the plurality of available types associated with the EntityBean, and that displays a diagrammatic graphical representation of code corresponding to a SessionBean associated with the distributed computing component, the another diagrammatic graphical representation including a second set of separately delineated display areas, wherein the second set of separately delineated display areas includes a delineated display area for each of the plurality of available types associated with the SessionBean, wherein the diagrammatic graphical representation and the another diagrammatic graphical representation are displayed simultaneously; and a processor configured to execute instructions constituting the program.

10. The data processing system of claim 9, wherein the program displays a symbol in the separately delineated display area, wherein the symbol indicates the one type displayed in the display area.

11. The data processing system of claim 9, wherein the diagrammatic graphical representation of the code includes another separately delineated display area for a reference type in the code.

12. The data processing system of claim 9, wherein the one type is a create method type.

13. The data processing system of claim 9, wherein the one type is a finder method type.

14. The data processing system of claim 9, wherein the one type is a business method type.

15. The data processing system of claim 9, wherein the distributed computing component is a SessionBean.

16. The data processing system of claim 9, wherein the distributed computing component is a EntityBean.

17. The data processing system of claim 9, wherein when the program is configured to generate:

code corresponding to the distributed computing component, code corresponding to an implementation class, code corresponding to a home interface that is related to the implementation class, and code corresponding to a remote interface that is related to the implementation class.

18. The data processing system of claim 17, wherein the code corresponding to the implementation class includes the method, and the code corresponding to the home interface includes a signature of the method.

19. The data processing system of claim 18, wherein the program is configured to display a symbol indicating the type of the method with a graphical representation of the signature.

20. The data processing system of claim 17, wherein the code corresponding to the implementation class contains the method and the code corresponding to the remote interface contains a signature of the method.

21. The data processing system of claim 20, wherein the program is configured to display a symbol indicating the type of the method with a graphical representation of the signature.

22. The data processing system of claim 17, wherein the program is configured to display the diagrammatic graphical representation of the code corresponding to the implementation class to include:

a first separately delineated display area for a create method type, a second separately delineated display area for a finder method type, and a third separately delineated display area for a business method type.

23. The data processing system of claim 17, wherein when the program displays a graphical representation of the code corresponding to the home interface that includes a separately delineated display area for a create method type and a finder method type.

24. The data processing system of claim 17, wherein when the program displays a graphical representation of the code corresponding to the remote interface that includes a separately delineated display area for a business method type.

25. The computer-readable medium of claim 1, wherein the diagrammatic graphical representation of the code presents one or more interrelationships among portions of the code.

26. The data processing system of claim 9, wherein the diagrammatic graphical representation of the code presents one or more interrelationships among portions of the code.

* * * * *